US011677588B2

(12) United States Patent
Fulton

(10) Patent No.: US 11,677,588 B2
(45) Date of Patent: *Jun. 13, 2023

(54) NETWORK CONTROL APPARATUS AND METHOD FOR CREATING AND MODIFYING LOGICAL SWITCHING ELEMENTS

(71) Applicant: Nicira, Inc., Palo Alto, CA (US)

(72) Inventor: Bryan J. Fulton, San Francisco, CA (US)

(73) Assignee: NICIRA, INC., Palo Alto, CA (US)

( * ) Notice: Subject to any disclaimer, the term of this patent is extended or adjusted under 35 U.S.C. 154(b) by 405 days.

This patent is subject to a terminal disclaimer.

(21) Appl. No.: 16/435,522

(22) Filed: Jun. 9, 2019

(65) Prior Publication Data
US 2020/0014558 A1 Jan. 9, 2020

Related U.S. Application Data

(63) Continuation of application No. 15/358,644, filed on Nov. 22, 2016, now Pat. No. 10,320,585, which is a
(Continued)

(51) Int. Cl.
*H04L 41/0893* (2022.01)
*H04L 41/0896* (2022.01)
(Continued)

(52) U.S. Cl.
CPC ......... *H04L 12/56* (2013.01); *H04L 41/0893* (2013.01); *H04L 45/42* (2013.01);
(Continued)

(58) Field of Classification Search
CPC ..... H04L 12/56; H04L 41/0893; H04L 45/42; H04L 47/50; H04L 49/254; H04L 49/70; H04L 61/6068
See application file for complete search history.

(56) References Cited

U.S. PATENT DOCUMENTS 4,750,113 A   6/1988  Buggert
4,961,139 A   10/1990 Hong et al.
(Continued)

FOREIGN PATENT DOCUMENTS

EP   0737921 A2   10/1996
EP   1443423 A1   8/2004
(Continued)

OTHER PUBLICATIONS

Anderson, Thomas, et al., "Overcoming the Internet Impasse through Virtualization," Apr. 2005, 8 pages, IEEE Computer Society.
(Continued)

*Primary Examiner* — Alpus Hsu
(74) *Attorney, Agent, or Firm* — Adeli LLP

(57) ABSTRACT

Some embodiments of the invention provide a method for implementing a logical switching element that includes multiple logical ports through which the logical switching element receives and sends data packets. The method configures multiple managed forwarding elements to implement the logical switching element. The method also determines that port isolation has been enabled for the logical switching element. The method further provides a set of data directing the managed forwarding elements to drop a particular data packet received through a first logical port when the particular data packet is addressed to a second logical port different than the first logical port to implement the port isolation.

20 Claims, 37 Drawing Sheets

Related U.S. Application Data continuation of application No. 13/269,543, filed on Oct. 7, 2011, now Pat. No. 9,525,647, which is a continuation-in-part of application No. 13/177,536, filed on Jul. 6, 2011, now Pat. No. 8,959,215, and a continuation of application No. 13/177,532, filed on Jul. 6, 2011, now Pat. No. 8,743,888, and a continuation-in-part of application No. 13/177,538, filed on Jul. 6, 2011, now Pat. No. 8,830,823.

(60) Provisional application No. 61/505,100, filed on Jul. 6, 2011, provisional application No. 61/505,103, filed on Jul. 6, 2011, provisional application No. 61/505,102, filed on Jul. 6, 2011, provisional application No. 61/501,785, filed on Jun. 28, 2011, provisional application No. 61/501,743, filed on Jun. 27, 2011, provisional application No. 61/482,615, filed on May 4, 2011, provisional application No. 61/482,616, filed on May 4, 2011, provisional application No. 61/482,205, filed on May 3, 2011, provisional application No. 61/466,453, filed on Mar. 22, 2011, provisional application No. 61/429,753, filed on Jan. 4, 2011, provisional application No. 61/429,754, filed on Jan. 4, 2011, provisional application No. 61/361,913, filed on Jul. 6, 2010, provisional application No. 61/361,912, filed on Jul. 6, 2010.

(51) Int. Cl.

| | |
|---|---|
| *G06F 15/173* | (2006.01) |
| *H04L 12/54* | (2022.01) |
| *H04L 49/253* | (2022.01) |
| *H04L 45/42* | (2022.01) |
| *H04L 49/00* | (2022.01) |
| *H04L 47/50* | (2022.01) |
| *H04L 101/668* | (2022.01) |

(52) U.S. Cl.
CPC ............ *H04L 47/50* (2013.01); *H04L 49/254* (2013.01); *H04L 49/70* (2013.01); *H04L 2101/668* (2022.05)

(56) References Cited

U.S. PATENT DOCUMENTS

| | | | |
|---|---|---|---|
| 5,049,873 A | 9/1991 | Robins et al. | |
| 5,265,092 A | 11/1993 | Soloway et al. | |
| 5,504,921 A | 4/1996 | Dev et al. | |
| 5,550,816 A | 8/1996 | Hardwick et al. | |
| 5,729,685 A | 3/1998 | Chatwani et al. | |
| 5,751,967 A | 5/1998 | Raab et al. | |
| 5,774,640 A | 6/1998 | Kurio | |
| 5,796,936 A | 8/1998 | Watabe et al. | |
| 5,805,791 A | 9/1998 | Grossman et al. | |
| 5,832,222 A | 11/1998 | Dziadosz et al. | |
| 5,854,906 A | 12/1998 | Loo | |
| 5,926,463 A | 7/1999 | Ahearn et al. | |
| 5,949,754 A | 9/1999 | Takahashi | |
| 6,006,275 A | 12/1999 | Picazo et al. | |
| 6,055,243 A | 4/2000 | Vincent et al. | |
| 6,088,694 A | 7/2000 | Burns et al. | |
| 6,092,121 A | 7/2000 | Bennett et al. | |
| 6,104,699 A | 8/2000 | Holender et al. | |
| 6,104,700 A | 8/2000 | Haddock et al. | |
| 6,208,616 B1 | 3/2001 | Mahalingam et al. | |
| 6,219,699 B1 | 4/2001 | McCloghrie et al. | |
| 6,324,275 B1 | 11/2001 | Yagel et al. | |
| 6,363,453 B1 | 3/2002 | Esposito et al. | |
| 6,363,495 B1 | 3/2002 | MacKenzie et al. | |
| 6,366,582 B1 | 4/2002 | Nishikado et al. | |
| 6,366,657 B1 | 4/2002 | Yagel et al. | |
| 6,385,197 B1* | 5/2002 | Sugihara | H04L 49/351 370/380 |
| 6,414,958 B1* | 7/2002 | Specht | G06Q 20/202 370/395.53 |
| 6,512,745 B1 | 1/2003 | Abe et al. | |
| 6,539,432 B1 | 3/2003 | Taguchi et al. | |
| 6,615,223 B1 | 9/2003 | Shih et al. | |
| 6,680,934 B1 | 1/2004 | Cain | |
| 6,697,338 B1 | 2/2004 | Breitbart et al. | |
| 6,735,602 B2 | 5/2004 | Childress et al. | |
| 6,741,552 B1 | 5/2004 | McCrosky et al. | |
| 6,768,740 B1 | 7/2004 | Perlman et al. | |
| 6,785,843 B1 | 8/2004 | McRae et al. | |
| 6,888,792 B2* | 5/2005 | Gronke | H04L 45/00 370/227 |
| 6,894,983 B1 | 5/2005 | Lederman et al. | |
| 6,912,221 B1 | 6/2005 | Zadikian et al. | |
| 6,941,487 B1 | 9/2005 | Balakrishnan et al. | |
| 6,959,002 B2 | 10/2005 | Wynne et al. | |
| 6,963,585 B1 | 11/2005 | Pennec et al. | |
| 6,985,447 B2 | 1/2006 | Gibson et al. | |
| 6,996,058 B2* | 2/2006 | Foster | H04L 49/357 370/228 |
| 6,999,454 B1 | 2/2006 | Crump | |
| 7,042,912 B2 | 5/2006 | Smith et al. | |
| 7,046,630 B2 | 5/2006 | Abe et al. | |
| 7,055,171 B1* | 5/2006 | Martin | H04L 12/4641 370/352 |
| 7,096,228 B2 | 8/2006 | Theimer et al. | |
| 7,103,807 B2* | 9/2006 | Bosa | H04L 41/0618 714/43 |
| 7,120,690 B1 | 10/2006 | Krishnan et al. | |
| 7,120,728 B2 | 10/2006 | Krakirian et al. | |
| 7,120,819 B1 | 10/2006 | Gurer et al. | |
| 7,126,923 B1 | 10/2006 | Yang et al. | |
| 7,145,866 B1* | 12/2006 | Ting | G06F 11/2005 370/225 |
| 7,151,744 B2* | 12/2006 | Sarkinen | H04L 45/00 370/230 |
| 7,158,972 B2 | 1/2007 | Marsland | |
| 7,197,561 B1 | 3/2007 | Lovy et al. | |
| 7,197,572 B2 | 3/2007 | Matters et al. | |
| 7,209,439 B2 | 4/2007 | Rawlins et al. | |
| 7,233,991 B2* | 6/2007 | Adhikari | H04L 69/40 370/256 |
| 7,263,290 B2 | 8/2007 | Fortin et al. | |
| 7,266,556 B1 | 9/2007 | Coates | |
| 7,283,473 B2 | 10/2007 | Arndt et al. | |
| 7,286,490 B2 | 10/2007 | Saleh et al. | |
| 7,289,456 B2 | 10/2007 | Gupta et al. | |
| 7,292,575 B2 | 11/2007 | Lemieux et al. | |
| 7,333,491 B2 | 2/2008 | Chen et al. | |
| 7,336,675 B2 | 2/2008 | Naik et al. | |
| 7,342,916 B2 | 3/2008 | Das et al. | |
| 7,343,410 B2 | 3/2008 | Mercier et al. | |
| 7,359,971 B2 | 4/2008 | Jorgensen | |
| 7,370,108 B1 | 5/2008 | Goldszmidt et al. | |
| 7,406,401 B2 | 7/2008 | Ota et al. | |
| 7,450,598 B2 | 11/2008 | Chen et al. | |
| 7,460,482 B2 | 12/2008 | Pike | |
| 7,463,579 B2 | 12/2008 | Lapuh et al. | |
| 7,478,173 B1 | 1/2009 | Delco | |
| 7,480,283 B1 | 1/2009 | Sylvain et al. | |
| 7,483,370 B1 | 1/2009 | Dayal et al. | |
| 7,512,589 B2 | 3/2009 | Stokkan et al. | |
| 7,512,744 B2 | 3/2009 | Banga et al. | |
| 7,545,829 B2 | 6/2009 | Shimazaki et al. | |
| 7,555,002 B2 | 6/2009 | Arndt et al. | |
| 7,587,492 B2 | 9/2009 | Dyck et al. | |
| 7,590,669 B2 | 9/2009 | Yip et al. | |
| 7,593,324 B2* | 9/2009 | Jain | H04L 49/552 370/227 |
| 7,606,260 B2 | 10/2009 | Oguchi et al. | |
| 7,626,979 B1 | 12/2009 | Bugenhagen et al. | |
| 7,627,692 B2 | 12/2009 | Pessi | |
| 7,630,358 B1 | 12/2009 | Lakhani et al. | |
| 7,643,488 B2 | 1/2010 | Khanna et al. | |

(56) References Cited

U.S. PATENT DOCUMENTS

| | | | |
|---|---|---|---|
| 7,649,851 B2 | 1/2010 | Takashige et al. | |
| 7,707,309 B2 * | 4/2010 | Shanbhag | H04L 49/357 |
| | | | 709/244 |
| 7,710,874 B2 | 5/2010 | Balakrishnan et al. | |
| 7,764,599 B2 | 7/2010 | Doi et al. | |
| 7,769,037 B2 | 8/2010 | Booth, III et al. | |
| 7,778,996 B2 | 8/2010 | Burger | |
| 7,783,856 B2 | 8/2010 | Hashimoto et al. | |
| 7,792,987 B1 | 9/2010 | Vohra et al. | |
| 7,801,155 B2 | 9/2010 | Wang | |
| 7,802,251 B2 | 9/2010 | Kitamura | |
| 7,805,407 B1 | 9/2010 | Verbeke et al. | |
| 7,808,929 B2 | 10/2010 | Wong et al. | |
| 7,817,541 B2 | 10/2010 | Gray et al. | |
| 7,818,452 B2 | 10/2010 | Matthews et al. | |
| 7,826,482 B1 | 11/2010 | Minei et al. | |
| 7,839,847 B2 | 11/2010 | Nadeau et al. | |
| 7,844,733 B2 | 11/2010 | Betts et al. | |
| 7,847,801 B2 | 12/2010 | Qi | |
| 7,856,549 B2 | 12/2010 | Wheeler | |
| 7,873,650 B1 | 1/2011 | Chapman et al. | |
| 7,881,281 B1 | 2/2011 | Bugenhagen et al. | |
| 7,885,276 B1 | 2/2011 | Lin | |
| 7,898,383 B2 * | 3/2011 | Royalty | H04L 63/10 |
| | | | 340/5.2 |
| 7,912,955 B1 | 3/2011 | Machiraju et al. | |
| 7,925,661 B2 | 4/2011 | Broussard et al. | |
| 7,936,770 B1 | 5/2011 | Frattura et al. | |
| 7,937,438 B1 | 5/2011 | Miller et al. | |
| 7,944,817 B1 | 5/2011 | Sylvain | |
| 7,945,658 B1 | 5/2011 | Nucci et al. | |
| 7,948,986 B1 | 5/2011 | Ghosh et al. | |
| 7,953,865 B1 | 5/2011 | Miller et al. | |
| 7,958,255 B1 | 6/2011 | Karighattam et al. | |
| 7,970,917 B2 | 6/2011 | Nakano et al. | |
| 7,974,272 B2 | 7/2011 | Chang et al. | |
| 7,991,859 B1 | 8/2011 | Miller et al. | |
| 7,995,483 B1 | 8/2011 | Bayar et al. | |
| 8,004,998 B2 * | 8/2011 | Levy | H04L 49/70 |
| | | | 370/250 |
| 8,010,696 B2 | 8/2011 | Sankaran et al. | |
| 8,027,354 B1 | 9/2011 | Portolani et al. | |
| 8,031,633 B2 | 10/2011 | Bueno et al. | |
| 8,032,899 B2 | 10/2011 | Archer et al. | |
| 8,046,456 B1 | 10/2011 | Miller et al. | |
| 8,054,832 B1 | 11/2011 | Shukla et al. | |
| 8,055,745 B2 | 11/2011 | Atluri | |
| 8,055,789 B2 | 11/2011 | Richardson et al. | |
| 8,059,532 B2 | 11/2011 | Riddle et al. | |
| 8,060,779 B2 | 11/2011 | Beardsley et al. | |
| 8,060,875 B1 | 11/2011 | Lambeth | |
| 8,089,871 B2 | 1/2012 | Iloglu et al. | |
| 8,090,698 B2 | 1/2012 | Billingsley et al. | |
| 8,098,656 B2 | 1/2012 | Lapuh et al. | |
| 8,130,648 B2 | 3/2012 | Kwan et al. | |
| 8,131,852 B1 | 3/2012 | Miller et al. | |
| 8,144,630 B1 | 3/2012 | Orr | |
| 8,149,737 B2 | 4/2012 | Metke et al. | |
| 8,155,028 B2 | 4/2012 | Abu-Hamdeh et al. | |
| 8,161,152 B2 | 4/2012 | Ogielski et al. | |
| 8,166,201 B2 | 4/2012 | Richardson et al. | |
| 8,196,144 B2 | 6/2012 | Kagan et al. | |
| 8,199,750 B1 | 6/2012 | Schultz et al. | |
| 8,223,668 B2 | 7/2012 | Allan et al. | |
| 8,224,931 B1 | 7/2012 | Brandwine et al. | |
| 8,224,971 B1 | 7/2012 | Miller et al. | |
| 8,230,050 B1 | 7/2012 | Brandwine et al. | |
| 8,239,572 B1 | 8/2012 | Brandwine et al. | |
| 8,239,655 B2 | 8/2012 | Goggin et al. | |
| 8,265,071 B2 | 9/2012 | Sindhu et al. | |
| 8,265,075 B2 | 9/2012 | Pandey | |
| 8,281,067 B2 | 10/2012 | Stolowitz | |
| 8,312,129 B1 | 11/2012 | Miller et al. | |
| 8,320,388 B2 | 11/2012 | Louati et al. | |
| 8,339,959 B1 | 12/2012 | Moisand et al. | |
| 8,339,994 B2 | 12/2012 | Gnanasekaran et al. | |
| 8,345,558 B2 | 1/2013 | Nicholson et al. | |
| 8,351,418 B2 | 1/2013 | Zhao et al. | |
| 8,352,941 B1 | 1/2013 | Protopopov et al. | |
| 8,413,216 B2 | 4/2013 | Hughes et al. | |
| 8,422,359 B2 | 4/2013 | Nakajima | |
| 8,456,984 B2 | 6/2013 | Ranganathan et al. | |
| 8,504,718 B2 | 8/2013 | Wang et al. | |
| 8,565,108 B1 | 10/2013 | Marshall et al. | |
| 8,565,597 B2 | 10/2013 | Zheng | |
| 8,578,003 B2 | 11/2013 | Brandwine et al. | |
| 8,590,033 B2 | 11/2013 | Schleiss et al. | |
| 8,612,627 B1 | 12/2013 | Brandwine | |
| 8,621,058 B2 | 12/2013 | Eswaran et al. | |
| 8,644,188 B1 | 2/2014 | Brandwine et al. | |
| 8,650,618 B2 | 2/2014 | Asati et al. | |
| 8,661,216 B2 | 2/2014 | Kavuri et al. | |
| 8,705,513 B2 | 4/2014 | Merwe et al. | |
| 8,717,895 B2 | 5/2014 | Koponen et al. | |
| 8,718,070 B2 | 5/2014 | Koponen et al. | |
| 8,743,888 B2 | 6/2014 | Casado et al. | |
| 8,743,889 B2 | 6/2014 | Koponen et al. | |
| 8,750,119 B2 | 6/2014 | Lambeth et al. | |
| 8,750,164 B2 | 6/2014 | Casado et al. | |
| 8,761,036 B2 | 6/2014 | Fulton et al. | |
| 8,775,594 B2 | 7/2014 | Koponen et al. | |
| 8,780,911 B2 | 7/2014 | Narasimhan | |
| 8,817,620 B2 | 8/2014 | Koponen et al. | |
| 8,817,621 B2 | 8/2014 | Casado et al. | |
| 8,830,823 B2 | 9/2014 | Koponen et al. | |
| 8,837,493 B2 | 9/2014 | Casado et al. | |
| 8,842,679 B2 | 9/2014 | Koponen et al. | |
| 8,867,349 B2 | 10/2014 | Martini et al. | |
| 8,880,468 B2 | 11/2014 | Koponen et al. | |
| 8,913,483 B2 | 12/2014 | Pfaff et al. | |
| 8,958,292 B2 | 2/2015 | Fulton et al. | |
| 8,959,215 B2 | 2/2015 | Koponen et al. | |
| 8,964,528 B2 | 2/2015 | Casado et al. | |
| 8,964,598 B2 | 2/2015 | Casado et al. | |
| 8,966,035 B2 | 2/2015 | Casado et al. | |
| 8,966,040 B2 | 2/2015 | Koponen et al. | |
| 8,989,186 B2 * | 3/2015 | Koganti | H04L 41/0893 |
| | | | 370/392 |
| 9,007,903 B2 | 4/2015 | Koponen et al. | |
| 9,008,087 B2 | 4/2015 | Lambeth et al. | |
| 9,043,452 B2 | 5/2015 | Fulton | |
| 9,043,463 B1 | 5/2015 | Cohn et al. | |
| 9,049,153 B2 | 6/2015 | Casado et al. | |
| 9,077,664 B2 | 7/2015 | Casado et al. | |
| 9,083,609 B2 | 7/2015 | Casado et al. | |
| 9,106,587 B2 | 8/2015 | Koponen et al. | |
| 9,112,811 B2 | 8/2015 | Casado et al. | |
| 9,172,663 B2 | 10/2015 | Casado et al. | |
| 9,270,580 B1 * | 2/2016 | Abraham | H04L 45/22 |
| 9,363,210 B2 | 6/2016 | Lambeth et al. | |
| 9,391,928 B2 | 7/2016 | Koponen et al. | |
| 9,426,095 B2 * | 8/2016 | Pandey | H04L 49/00 |
| 9,525,647 B2 | 12/2016 | Koponen et al. | |
| 10,021,019 B2 | 7/2018 | Koponen et al. | |
| 10,038,597 B2 | 7/2018 | Casado et al. | |
| 10,103,939 B2 | 10/2018 | Koponen et al. | |
| 10,320,585 B2 | 6/2019 | Koponen et al. | |
| 10,326,660 B2 | 6/2019 | Koponen et al. | |
| 2001/0043614 A1 | 11/2001 | Viswanadham et al. | |
| 2002/0034189 A1 | 3/2002 | Haddock et al. | |
| 2002/0093952 A1 | 7/2002 | Gonda | |
| 2002/0161867 A1 | 10/2002 | Cochran et al. | |
| 2002/0194369 A1 | 12/2002 | Rawlins et al. | |
| 2003/0009552 A1 | 1/2003 | Benfield et al. | |
| 2003/0041170 A1 | 2/2003 | Suzuki | |
| 2003/0058850 A1 | 3/2003 | Rangarajan et al. | |
| 2003/0069972 A1 | 4/2003 | Yoshimura et al. | |
| 2003/0145086 A1 | 7/2003 | O'Reilly | |
| 2003/0204768 A1 | 10/2003 | Fee | |
| 2004/0044773 A1 | 3/2004 | Bayus et al. | |
| 2004/0047286 A1 | 3/2004 | Larsen et al. | |
| 2004/0047300 A1 | 3/2004 | Enomoto et al. | |
| 2004/0054680 A1 | 3/2004 | Kelley et al. | |
| 2004/0054793 A1 | 3/2004 | Coleman | |

(56) References Cited

U.S. PATENT DOCUMENTS

| | | |
|---|---|---|
| 2004/0073659 A1 | 4/2004 | Rajsic et al. |
| 2004/0098505 A1 | 5/2004 | Clemmensen |
| 2004/0193677 A1* | 9/2004 | Dar .................. H04L 29/12433 709/203 |
| 2004/0210889 A1 | 10/2004 | Childress et al. |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0021683 A1 | 1/2005 | Newton et al. |
| 2005/0027881 A1 | 2/2005 | Figueira et al. |
| 2005/0050377 A1 | 3/2005 | Chan et al. |
| 2005/0083953 A1 | 4/2005 | May |
| 2005/0120160 A1 | 6/2005 | Plouffe et al. |
| 2005/0132044 A1 | 6/2005 | Guingo et al. |
| 2005/0201398 A1 | 9/2005 | Naik et al. |
| 2005/0228952 A1 | 10/2005 | Mayhew et al. |
| 2005/0228971 A1 | 10/2005 | Samra et al. |
| 2005/0232230 A1 | 10/2005 | Nagami et al. |
| 2006/0026225 A1 | 2/2006 | Canali et al. |
| 2006/0028999 A1 | 2/2006 | Iakobashvili et al. |
| 2006/0037075 A1 | 2/2006 | Frattura et al. |
| 2006/0092940 A1 | 5/2006 | Ansari et al. |
| 2006/0092976 A1 | 5/2006 | Lakshman et al. |
| 2006/0105764 A1 | 5/2006 | Krishnaswamy et al. |
| 2006/0174087 A1 | 8/2006 | Hashimoto et al. |
| 2006/0178898 A1 | 8/2006 | Habibi |
| 2006/0182033 A1 | 8/2006 | Chen et al. |
| 2006/0182037 A1 | 8/2006 | Chen et al. |
| 2006/0184653 A1 | 8/2006 | Riel |
| 2006/0184937 A1 | 8/2006 | Abels et al. |
| 2006/0187908 A1 | 8/2006 | Shimozono et al. |
| 2006/0190243 A1 | 8/2006 | Barkai et al. |
| 2006/0193266 A1 | 8/2006 | Siddha et al. |
| 2006/0221961 A1 | 10/2006 | Basso et al. |
| 2006/0248179 A1 | 11/2006 | Short et al. |
| 2006/0282895 A1 | 12/2006 | Rentzis et al. |
| 2007/0028239 A1 | 2/2007 | Dyck et al. |
| 2007/0043860 A1 | 2/2007 | Pabar |
| 2007/0050763 A1 | 3/2007 | Kagan et al. |
| 2007/0055789 A1 | 3/2007 | Claise et al. |
| 2007/0064673 A1 | 3/2007 | Bhandaru et al. |
| 2007/0140128 A1 | 6/2007 | Klinker et al. |
| 2007/0156919 A1 | 7/2007 | Potti et al. |
| 2007/0174429 A1 | 7/2007 | Mazzaferr et al. |
| 2007/0192325 A1 | 8/2007 | Morris |
| 2007/0201434 A1 | 8/2007 | Nakamura et al. |
| 2007/0217409 A1 | 9/2007 | Mann |
| 2007/0220059 A1 | 9/2007 | Lu et al. |
| 2007/0220358 A1 | 9/2007 | Goodill et al. |
| 2007/0234302 A1 | 10/2007 | Suzuki et al. |
| 2007/0239987 A1 | 10/2007 | Hoole et al. |
| 2007/0240160 A1 | 10/2007 | Paterson-Jones et al. |
| 2007/0245082 A1 | 10/2007 | Margolus et al. |
| 2007/0250608 A1 | 10/2007 | Watt |
| 2007/0260721 A1 | 11/2007 | Bose et al. |
| 2007/0266433 A1 | 11/2007 | Moore |
| 2007/0280243 A1 | 12/2007 | Wray et al. |
| 2007/0286137 A1 | 12/2007 | Narasimhan et al. |
| 2007/0286185 A1 | 12/2007 | Eriksson et al. |
| 2007/0294421 A1 | 12/2007 | Octaviano et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0005334 A1 | 1/2008 | Utard et al. |
| 2008/0034249 A1 | 2/2008 | Husain et al. |
| 2008/0040467 A1 | 2/2008 | Mendiratta et al. |
| 2008/0049614 A1 | 2/2008 | Briscoe et al. |
| 2008/0049621 A1 | 2/2008 | McGuire et al. |
| 2008/0052206 A1 | 2/2008 | Edwards et al. |
| 2008/0059556 A1 | 3/2008 | Greenspan et al. |
| 2008/0071900 A1 | 3/2008 | Hecker et al. |
| 2008/0163207 A1 | 7/2008 | Reumann et al. |
| 2008/0165704 A1 | 7/2008 | Marchetti et al. |
| 2008/0189769 A1 | 8/2008 | Casado et al. |
| 2008/0196100 A1 | 8/2008 | Madhavan et al. |
| 2008/0212963 A1 | 9/2008 | Fortin et al. |
| 2008/0225780 A1 | 9/2008 | McCormick et al. |
| 2008/0225853 A1 | 9/2008 | Melman et al. |
| 2008/0240122 A1 | 10/2008 | Richardson et al. |
| 2008/0244569 A1 | 10/2008 | Challener et al. |
| 2008/0279196 A1 | 11/2008 | Friskney et al. |
| 2008/0291910 A1 | 11/2008 | Fadimeti et al. |
| 2008/0301303 A1 | 12/2008 | Matsuoka |
| 2009/0031041 A1 | 1/2009 | Clemmensen |
| 2009/0043823 A1 | 2/2009 | Iftode et al. |
| 2009/0049241 A1 | 2/2009 | Ohno et al. |
| 2009/0083445 A1 | 3/2009 | Ganga |
| 2009/0089625 A1 | 4/2009 | Kannappan et al. |
| 2009/0097495 A1 | 4/2009 | Palacharla et al. |
| 2009/0113031 A1 | 4/2009 | Ruan et al. |
| 2009/0122710 A1 | 5/2009 | Bar-Tor et al. |
| 2009/0138577 A1* | 5/2009 | Casado ............... H04L 41/0859 709/220 |
| 2009/0141729 A1 | 6/2009 | Fan |
| 2009/0144220 A1 | 6/2009 | Feng et al. |
| 2009/0150521 A1 | 6/2009 | Tripathi |
| 2009/0150527 A1 | 6/2009 | Tripathi et al. |
| 2009/0161547 A1 | 6/2009 | Riddle et al. |
| 2009/0222924 A1 | 9/2009 | Droz et al. |
| 2009/0235325 A1 | 9/2009 | Dimitrakos et al. |
| 2009/0249473 A1 | 10/2009 | Cohn |
| 2009/0257420 A1 | 10/2009 | Kore et al. |
| 2009/0276661 A1 | 11/2009 | Deguchi et al. |
| 2009/0279536 A1 | 11/2009 | Unbehagen et al. |
| 2009/0292858 A1 | 11/2009 | Lambeth et al. |
| 2009/0296726 A1 | 12/2009 | Snively et al. |
| 2009/0303880 A1 | 12/2009 | Maltz et al. |
| 2010/0046531 A1 | 2/2010 | Louati et al. |
| 2010/0054260 A1 | 3/2010 | Pandey et al. |
| 2010/0061231 A1 | 3/2010 | Harmatos et al. |
| 2010/0082799 A1 | 4/2010 | DeHaan et al. |
| 2010/0115101 A1 | 5/2010 | Lain et al. |
| 2010/0125667 A1 | 5/2010 | Soundararajan |
| 2010/0131636 A1 | 5/2010 | Suri et al. |
| 2010/0138830 A1 | 6/2010 | Astete et al. |
| 2010/0138840 A1 | 6/2010 | Kagan et al. |
| 2010/0153554 A1 | 6/2010 | Anschutz et al. |
| 2010/0162036 A1 | 6/2010 | Linden et al. |
| 2010/0165874 A1 | 7/2010 | Brown et al. |
| 2010/0165877 A1 | 7/2010 | Shukla et al. |
| 2010/0169452 A1 | 7/2010 | Atluri et al. |
| 2010/0169467 A1 | 7/2010 | Shukla et al. |
| 2010/0169587 A1 | 7/2010 | Atluri et al. |
| 2010/0191612 A1 | 7/2010 | Raleigh |
| 2010/0191846 A1 | 7/2010 | Raleigh |
| 2010/0192207 A1 | 7/2010 | Raleigh |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0250784 A1 | 9/2010 | Henry et al. |
| 2010/0254385 A1 | 10/2010 | Sharma et al. |
| 2010/0257263 A1 | 10/2010 | Casado et al. |
| 2010/0275017 A1 | 10/2010 | Iyer et al. |
| 2010/0275199 A1 | 10/2010 | Smith et al. |
| 2010/0284402 A1 | 11/2010 | Narayanan |
| 2010/0290485 A1 | 11/2010 | Martini et al. |
| 2010/0302935 A1 | 12/2010 | Zhang et al. |
| 2010/0322255 A1 | 12/2010 | Hao et al. |
| 2011/0004878 A1 | 1/2011 | Divoux |
| 2011/0004913 A1 | 1/2011 | Nagarajan et al. |
| 2011/0010578 A1 | 1/2011 | Dominguez et al. |
| 2011/0016215 A1 | 1/2011 | Wang |
| 2011/0026521 A1 | 2/2011 | Gamage et al. |
| 2011/0032830 A1 | 2/2011 | Merwe et al. |
| 2011/0032844 A1 | 2/2011 | Patel et al. |
| 2011/0075552 A1 | 3/2011 | Mitsumor |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0103259 A1 | 5/2011 | Aybay et al. |
| 2011/0103391 A1 | 5/2011 | Davis et al. |
| 2011/0119748 A1 | 5/2011 | Edwards et al. |
| 2011/0134931 A1 | 6/2011 | Merwe et al. |

(56) References Cited

U.S. PATENT DOCUMENTS

| | | |
|---|---|---|
| 2011/0142053 A1 | 6/2011 | Merwe et al. |
| 2011/0194567 A1 | 8/2011 | Shen |
| 2011/0225167 A1 | 9/2011 | Bhattacharjee et al. |
| 2011/0261825 A1 | 10/2011 | Ichino |
| 2011/0271007 A1 | 11/2011 | Wang et al. |
| 2011/0292949 A1 | 12/2011 | Hayashi et al. |
| 2011/0296052 A1 | 12/2011 | Guo et al. |
| 2011/0299534 A1 | 12/2011 | Koganti et al. |
| 2011/0299537 A1 | 12/2011 | Saraiya et al. |
| 2011/0310899 A1 | 12/2011 | Alkhatib et al. |
| 2011/0317559 A1 | 12/2011 | Kem et al. |
| 2011/0318011 A1 | 12/2011 | Brassil |
| 2012/0014386 A1 | 1/2012 | Xiong et al. |
| 2012/0044943 A1 | 2/2012 | Hinz et al. |
| 2012/0096192 A1 | 4/2012 | Tanaka et al. |
| 2012/0096211 A1 | 4/2012 | Davis et al. |
| 2012/0099602 A1 | 4/2012 | Nagapudi et al. |
| 2012/0120964 A1 | 5/2012 | Koponen et al. |
| 2012/0131643 A1 | 5/2012 | Cheriton |
| 2012/0147894 A1 | 6/2012 | Mulligan et al. |
| 2012/0147898 A1 | 6/2012 | Koponen et al. |
| 2012/0151550 A1 | 6/2012 | Zhang |
| 2012/0185553 A1 | 7/2012 | Nelson |
| 2012/0207018 A1 | 8/2012 | Goldenberg et al. |
| 2012/0236734 A1 | 9/2012 | Sampath et al. |
| 2012/0239790 A1 | 9/2012 | Doane et al. |
| 2013/0058208 A1 | 3/2013 | Pfaff et al. |
| 2013/0058215 A1 | 3/2013 | Koponen et al. |
| 2013/0058225 A1 | 3/2013 | Casado et al. |
| 2013/0058226 A1 | 3/2013 | Casado et al. |
| 2013/0058228 A1 | 3/2013 | Koponen et al. |
| 2013/0058229 A1 | 3/2013 | Casado et al. |
| 2013/0058250 A1 | 3/2013 | Casado et al. |
| 2013/0058251 A1 | 3/2013 | Koponen et al. |
| 2013/0058252 A1 | 3/2013 | Casado et al. |
| 2013/0058255 A1 | 3/2013 | Casado et al. |
| 2013/0058334 A1 | 3/2013 | Koponen et al. |
| 2013/0058335 A1 | 3/2013 | Koponen et al. |
| 2013/0058339 A1 | 3/2013 | Casado et al. |
| 2013/0058340 A1 | 3/2013 | Lambeth et al. |
| 2013/0058341 A1 | 3/2013 | Fulton et al. |
| 2013/0058342 A1 | 3/2013 | Casado et al. |
| 2013/0058343 A1 | 3/2013 | Casado et al. |
| 2013/0058344 A1 | 3/2013 | Casado et al. |
| 2013/0058348 A1 | 3/2013 | Koponen et al. |
| 2013/0058350 A1 | 3/2013 | Fulton |
| 2013/0058351 A1 | 3/2013 | Casado et al. |
| 2013/0058353 A1 | 3/2013 | Koponen et al. |
| 2013/0058354 A1 | 3/2013 | Casado et al. |
| 2013/0058356 A1 | 3/2013 | Koponen et al. |
| 2013/0058357 A1 | 3/2013 | Koponen et al. |
| 2013/0058358 A1 | 3/2013 | Fulton et al. |
| 2013/0060736 A1 | 3/2013 | Casado et al. |
| 2013/0060737 A1 | 3/2013 | Koponen et al. |
| 2013/0060738 A1 | 3/2013 | Koponen et al. |
| 2013/0060817 A1 | 3/2013 | Koponen et al. |
| 2013/0060818 A1 | 3/2013 | Lambeth et al. |
| 2013/0060819 A1 | 3/2013 | Lambeth et al. |
| 2013/0060922 A1 | 3/2013 | Koponen et al. |
| 2013/0060929 A1 | 3/2013 | Koponen et al. |
| 2013/0060940 A1 | 3/2013 | Koponen et al. |
| 2013/0250958 A1 | 9/2013 | Watanabe |
| 2015/0180801 A1 | 6/2015 | Casado et al. |
| 2016/0127274 A1 | 5/2016 | Casado et al. |
| 2016/0294627 A1 | 10/2016 | Koponen et al. |
| 2016/0359674 A1 | 12/2016 | Koponen et al. |
| 2017/0085395 A1 | 3/2017 | Koponen et al. |
| 2019/0104018 A1 | 4/2019 | Casado et al. |
| 2020/0014598 A1 | 1/2020 | Lambeth et al. |

FOREIGN PATENT DOCUMENTS

| | | | |
|---|---|---|---|
| EP | 1653688 A1 | 5/2006 | |
| JP | 2002141905 A | 5/2002 | |
| JP | 2003069609 A | 3/2003 | |
| JP | 2003124976 A | 4/2003 | |
| JP | 2003318949 A | 11/2003 | |
| JP | 2006229967 A | 8/2006 | |
| WO | 9506989 A1 | 3/1995 | |
| WO | 2005112390 A1 | 11/2005 | |
| WO | 2008095010 A1 | 8/2008 | |
| WO | 2009042919 A2 | 4/2009 | |
| WO | 2010103909 A1 | 9/2010 | |
| WO | 2010115060 A2 | 10/2010 | |
| WO | 2012093429 A1 | 7/2012 | |

OTHER PUBLICATIONS

Anhalt, Fabienne, et al., "Analysis and Evaluation of a XEN based Virtual Router," Sep. 2008, 63 pages, Unite de recherché INRA Phone-Alpes, Montbonnot Saint-Ismier, France.

Anwer, Muhammad Bilal, et al., "Building a Fast, Virtualized Data Plane with Programmable Hardware," Aug. 17, 2009, 8 pages, VISA'09, ACM, Barcelona, Spain.

Author Unknown, "Cisco VN-Link: Virtual Machine-Aware Networking," Apr. 2009, 2 pages, Cisco Systems, Inc.

Author Unknown, "Cisco VN-Link: Virtualization-Aware Networking," Mar. 2009, 10 pages, Cisco Systems, Inc.

Author Unknown, "OpenFlow Switch Specification, Version 0.9.0 (Wire Protocol 0x98)," Jul. 20, 2009, 36 pages, Open Networking Foundation.

Author Unknown, OpenFlow Switch Specification, Version 1.0.0 (Wire Protocol 0x01), Dec. 31, 2009, 42 pages, Open Networking Foundation.

Author Unknown, "OpenFlow Switch Specification, Version 1.1.0 Implemented (Wire Protocol 0x02)," Feb. 28, 2011, 56 pages, Open Networking Foundation.

Bavier, Andy, et al., "In VINI Veritas: Realistic and Controlled Network Experimentation," SIGCOMM'06, Sep. 2006, 14 pages, Pisa, Italy.

Bhatia, Sapan, et al., "Trellis: A Platform for Building Flexible, Fast Virtual Networks on Commodity Hardware," Roads'08, Dec. 9, 2008, 6 pages, Madrid, Spain, ACM.

Caesar, Matthew, et al., "Design and Implementation of a Routing Control Platform," NSDI '05:2nd Symposium on Networked Systems Design & Implementation , Apr. 2005, 14 pages, Usenix Association.

Cai, Zheng, et al., "The Preliminary Design and Implementation of the Maestro Network Control Platform," Oct. 1, 2008, 17 pages, NSF.

Casado, Martin, et al. "Ethane: Taking Control of the Enterprise," SIGCOMM'07, Aug. 27-31, 2007, 12 pages, ACM, Kyoto, Japan.

Casado, Martin, et al., "Rethinking Packet Forwarding Hardware," Seventh ACM SIGCOMM' HotNets Workshop, Nov. 2008, 6 pages, ACM.

Casado, Martin, et al., "Sane: A Protection Architecture for Enterprise Networks," Proceedings of the 15th USENIX Security Symposium, Jul. 31-Aug. 4, 2006, 15 pages, USENIX, Vancouver, Canada.

Casado, Martin, et al., "Scaling Out: Network Virtualization Revisited," Month Unknown 2010, 8 pages.

Casado, Martin, et al., "Virtualizing the Network Forwarding Plane," Dec. 2010, 6 pages.

Das, Saurav, et al., "Unifying Packet and Circuit Switched Networks with OpenFlow," Dec. 7, 2009, 10 pages, available at http://OpenFlowSwitch.org/downloads/technicalreports/openflow-tr-2009-4-unification.pdf.

Fernandes, Natalia C., et al., "Virtual Networks: Isolation, Performance, and Trends," Annals of Telecommunications, Oct. 7, 2010, 17 pages, vol. 66, Institut Télécom and Springer-Verlag, Paris.

Greenberg, Albert, et al., "VL2: A Scalable and Flexible Data Center Network," SIGCOMM '09, Aug. 17-21, 2009, 12 pages, ACM, Barcelona, Spain.

Greenhalgh, Adam, et al., "Flow Processing and the Rise of Commodity Network Hardware," ACM SIGCOMM Computer Communication Review, Apr. 2009, 6 pages, vol. 39, No. 2.

(56) References Cited

OTHER PUBLICATIONS

Gude, Natasha, et al., "NOX: Towards an Operating System for Networks," ACM SIGCOMM Computer Communication Review, Jul. 2008, 6 pages. vol. 38, No. 3, ACM.
Hamilton, James, et al., "Datacenter Networks Are in My Way," Principals of Amazon Series, Oct. 28, 2010, 14 pages.
Hinrichs, Timothy L., et al., "Practical Declarative Network Management," Wren'09, Aug. 21, 2009, 10 pages, Barcelona, Spain.
Hunt, Patrick, et al., "ZooKeeper: Wait-free Coordination for Internet-Scale Systems," USENIXATC'10 Proc. of the 2010 USENIX Annual Technical Conference, Jun. 23-25, 2010, 14 pages, USENIX Association, Berkeley, USA.
Keller, Eric, et al., "The 'Platform as a Service' Model for Networking," Month Unknown 2010, 6 pages.
Koponen, Teemu, et al., "Onix: A Distributed Control Platform for Large-scale Production Networks," In Proc. OSDI, Oct. 2010, 14 pages.
Loo, Boon Thau, et al., "Declarative Routing: Extensible Routing with Declarative Queries," In Proc. of SIGCOMM, Aug. 21-26, 2005, 12 pages, Philadelphia, PA, USA.
Loo, Boon Thau, et al., "Implementing Declarative Overiays," In Proc. of SOSP, Oct. 2005, 16 pages, Brighton, UK.
Luo, Jianying, et al., "Prototyping Fast, Simple, Secure Switches for Ethane," Month Unknown 2007, 6 pages.
McKeown, Nick, et al., "OpenFlow: Enabling Innovation in Campus Networks," ACM SIGCOMM Computer Communication Review, Apr. 2008, 6 pages, vol. 38, No. 2, ACM.
Mogul, Jeffrey C., et al., "API Design Challenges for Open Router Platforms on Proprietary Hardware," Oct. 2008, 6 pages.
Mysore, Radhka Niranjan, et al., "PortLand: A Scalable Fault-Tolerant Layer 2 Data Center Network Fabric," Proc. of SIGCOMM, Aug. 17-21, 2009, 12 pages.
Pettit, Justin, et al., "Virtual Switching in an Era of Advanced Edges," In Proc. 2nd Workshop on Data Center-Converged and Virtual Ethernet Switching (DCCAVES), Sep. 2010, 7 pages, vol. 22. ITC.
Pfaff, Ben., et al., "Extending Networking into the Virtualization Layer," Proc. of HotNets, Oct. 2009, 6 pages.
Sherwood, Rob, et al., "Can the Production Network Be the Testbed?," Month Unknown 2010, 14 pages.
Sherwood, Rob, et al., "Carving Research Slices Out of Your Production Networks with OpenFlow," ACM SIGCOMM Computer Communications Review, Jan. 2010, 2 pages, vol. 40, No. 1.
Sherwood, Rob, et al., "FlowVisor: A Network Virtualization Layer," Oct. 14, 2009, 15 pages, OPENFLOW-TR-2009-1.
Tavakoli, Arsalan, et al., "Applying NOX to the Datacenter," Proc. HotNets, Month Unknown 2009, 6 pages.
Wang, Wei-Ming, et al., "Analysis and Implementation of an Open Programmable Router Based on Forwarding and Control Element Separation," Journal of Computer Science and Technology, Sep. 2008, 11 pages, vol. 23, No. 5.
Yang, L., et al., "Forwarding and Control Element Separation (ForCES) Framework," Apr. 2004, 41 pages, The Internet Society.
Yu, Minlan, et al., "Scalable Flow-Based Networking with DIFANE," in Proc. SIGCOMM, Aug. 2010, 16 pages.
Shimonishi, Hideyuki, et al., "Virtualized Network Infrastructure using OpenFlow," 2010 IEEE/IFIP Network Operations and Management Symposium Workshops, Apr. 19, 2010, 6 pages, IEEE.

* cited by examiner

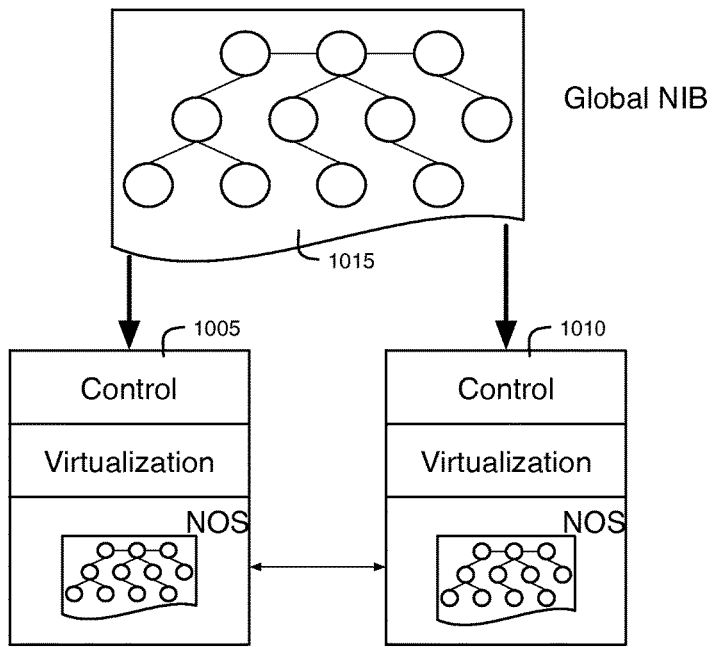
*Figure 10*
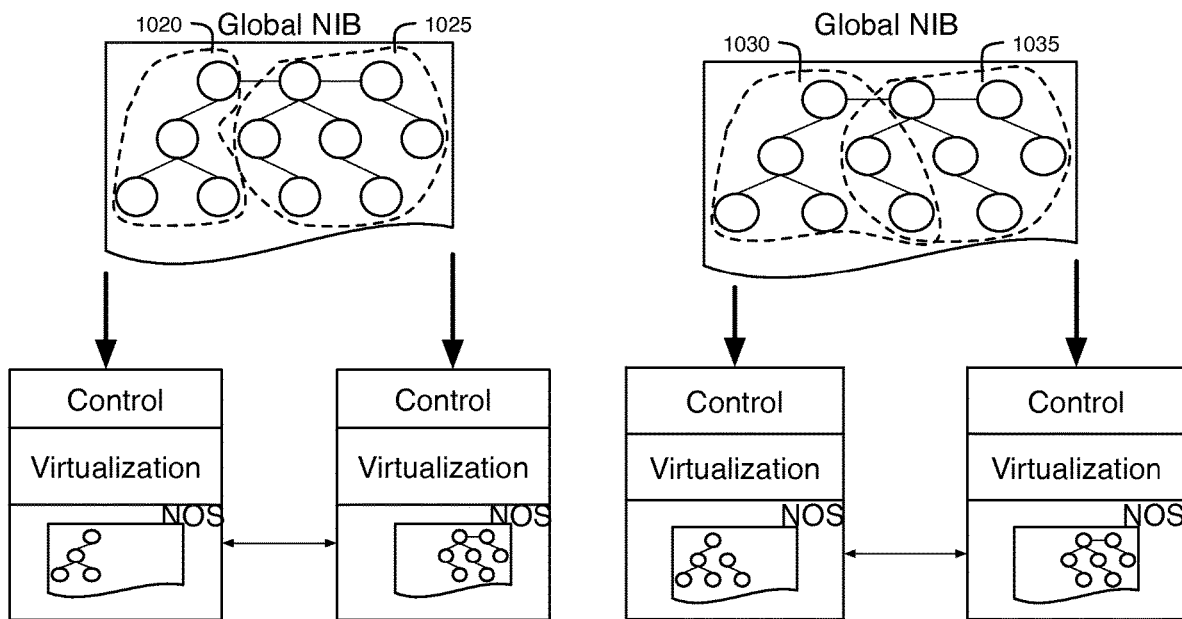
*Figure 11*
*Figure 12*

| Figure 29 | *Figure 29A* |
| --- | --- |
| | *Figure 29B* |

NETWORK CONTROL APPARATUS AND METHOD FOR CREATING AND MODIFYING LOGICAL SWITCHING ELEMENTS

CLAIM OF BENEFIT TO PRIOR APPLICATIONS

This application is a continuation application of U.S. patent application Ser. No. 15/358,644, filed Nov. 22, 2016, now published as U.S. Patent Publication 2017/0085395. U.S. patent application Ser. No. 15/358,644 is a continuation application of U.S. patent application Ser. No. 13/269,543, filed Oct. 7, 2011, now issued as U.S. Pat. No. 9,525,647. U.S. patent application Ser. No. 13/269,543 is a continuation application of U.S. patent application Ser. No. 13/177,532, filed Jul. 6, 2011, now issued as U.S. Pat. No. 8,743,888. U.S. patent application Ser. No. 13/177,532 claims the benefit of U.S. Provisional Patent Application 61/361,912, filed Jul. 6, 2010; U.S. Provisional Patent Application 61/361,913, filed Jul. 6, 2010; U.S. Provisional Patent Application 61/429,753, filed Jan. 4, 2011; U.S. Provisional Patent Application 61/429,754, filed Jan. 4, 2011; U.S. Provisional Patent Application 61/466,453, filed Mar. 22, 2011; U.S. Provisional Patent Application 61/482,205, filed May 3, 2011; U.S. Provisional Patent Application 61/482,615, filed May 4, 2011; U.S. Provisional Patent Application 61/482,616, filed May 4, 2011; U.S. Provisional Patent Application 61/501,743, filed Jun. 27, 2011; and U.S. Provisional Patent Application 61/501,785, filed Jun. 28, 2011. U.S. patent application Ser. No. 13/269,543 is a continuation-in-part application of U.S. patent application Ser. No. 13/177,538, filed on Jul. 6, 2011, now issued as U.S. Pat. No. 8,830,823. U.S. patent application Ser. No. 13/269,543 is also a continuation-in-part application of U.S. patent application Ser. No. 13/177,536, filed on Jul. 6, 2011, now issued as U.S. Pat. No. 8,959,215. U.S. patent application Ser. Nos. 13/177,536 and 13/177,538 claim the benefit of U.S. Provisional Patent Application 61/361,912, filed on Jul. 6, 2010; U.S. Provisional Patent Application 61/361,913, filed on Jul. 6, 2010; U.S. Provisional Patent Application 61/429,753, filed on Jan. 4, 2011; U.S. Provisional Patent Application 61/429,754, filed on Jan. 4, 2011; U.S. Provisional Patent Application 61/466,453, filed on Mar. 22, 2011; U.S. Provisional Patent Application 61/482,205, filed on May 3, 2011; U.S. Provisional Patent Application 61/482,615, filed on May 4, 2011; U.S. Provisional Patent Application 61/482,616, filed on May 4, 2011; U.S. Provisional Patent Application 61/501,743, filed on Jun. 27, 2011; and U.S. Provisional Patent Application 61/501,785, filed on Jun. 28, 2011. U.S. patent application Ser. No. 13/269,543 claims the benefit of U.S. Provisional Patent Application 61/505,100, filed on Jul. 6, 2011; U.S. Provisional Patent Application 61/505,103, filed on Jul. 6, 2011; and U.S. Provisional Patent Application 61/505,102, filed on Jul. 6, 2011. U.S. patent application Ser. No. 13/269,543, now issued as U.S. Pat. No. 9,525,647; Ser. No. 13/177,536, now issued as U.S. Pat. No. 8,959,215; Ser. No. 13/177,538, now issued as U.S. Pat. No. 8,830,823; Se. Ser. No. 15/358,644, now published as U.S. Patent Publication 2017/0083595; and U.S. Provisional Patent Applications 61/361,912, 61/361,913, 61/429,753, 61/429,754, 61/466,453, 61/482,205, 61/482,615, 61/482,616, 61/501,743, 61/501,785, and 61/505,102 are incorporated herein by reference.

BACKGROUND

Many current enterprises have large and sophisticated networks comprising switches, hubs, routers, servers, workstations and other networked devices, which support a variety of connections, applications and systems. The increased sophistication of computer networking, including virtual machine migration, dynamic workloads, multi-tenancy, and customer specific quality of service and security configurations require a better paradigm for network control. Networks have traditionally been managed through low-level configuration of individual components. Network configurations often depend on the underlying network: for example, blocking a user's access with an access control list ("ACL") entry requires knowing the user's current IP address. More complicated tasks require more extensive network knowledge: forcing guest users' port 80 traffic to traverse an HTTP proxy requires knowing the current network topology and the location of each guest. This process is of increased difficulty where the network switching elements are shared across multiple users.

In response, there is a growing movement, driven by both industry and academia, towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. Making network management decisions often requires knowledge of the network state. To facilitate management decision making, the network controller creates and maintains a view of the network state and provides an application programming interface upon which management applications may access a view of the network state.

Three of the many challenges of large networks (including datacenters and the enterprise) are scalability, mobility, and multi-tenancy and often the approaches taken to address one hamper the other. For instance, one can easily provide network mobility for virtual machines (VMs) within an L2 domain, but L2 domains cannot scale to large sizes. Also, retaining tenant isolation greatly complicates mobility. Despite the high-level interest in SDN, no existing products have been able to satisfy all of these requirements.

BRIEF SUMMARY

Some embodiments of the invention provide a system that allows several different logical datapath sets to be specified for several different users through one or more shared network infrastructure switching elements (referred to as "switching elements" below). In some embodiments, the system includes a set of software tools that allows the system to accept logical datapath sets from users and to configure the switching elements to implement these logical datapath sets. These software tools allow the system to virtualize control of the shared switching elements and the network that is defined by the connections between these shared switching elements, in a manner that prevents the different users from viewing or controlling each other's logical datapath sets (i.e., each other's switching logic) while sharing the same switching elements.

In some embodiments, one of the software tools that allows the system to virtualize control of a set of switching elements (i.e., to allow several users to share the same switching elements without viewing or controlling each other's logical datapath sets) is an intermediate data storage structure that (1) stores the state of the network, (2) receives and records modifications to different parts of the network from different users, and (3), in some embodiments, provides different views of the state of the network to different users. For instance, in some embodiments, the intermediate data storage structure is a network information base (NIB) data structure that stores the state of the network that is defined by one or more switching elements. The system uses this NIB data structure as an intermediate storage structure for reading the state of the network and writing modifications to the state of the network. In some embodiments, the NIB also stores the logical configuration and the logical state for each user specified logical datapath set. In these embodiments, the information in the NIB that represents the state of the actual switching elements accounts for only a subset of the total information stored in the NIB.

In some embodiments, the system has (1) a network operating system (NOS) to create and maintain the NIB storage structure, and (2) one or more applications that run on top of the NOS to specify logic for reading values from and writing values to the NIB. When the NIB is modified in order to effectuate a change in the switching logic of a switching element, the NOS of some embodiments also propagates the modification to the switching element.

The system of different embodiments uses the NIB differently to virtualize access to the shared switching elements and network. In some embodiments, the system provides different views of the NIB to different users in order to ensure that different users do not have direct view and control over each other's switching logic. For instance, in some embodiments, the NIB is a hierarchical data structure that represents different attributes of different switching elements as elements (e.g., different nodes) in a hierarchy. The NIB in some of these embodiments is a multi-layer hierarchical data structure, with each layer having a hierarchical structure and one or more elements (e.g., nodes) on each layer linked to one or more elements (e.g., nodes) on another layer. In some embodiments, the lowest layer elements correspond to the actual switching elements and their attributes, while each of the higher layer elements serves as abstractions of the actual switching elements and their attributes. As further described below, some of these higher layer elements are used in some embodiments to show different abstract switching elements and/or switching element attributes to different users in a virtualized control system.

In some embodiments, the definition of different NIB elements at different hierarchical levels in the NIB and the definition of the links between these elements are used by the developers of the applications that run on top of the NOS in order to define the operations of these applications. For instance, in some embodiments, the developer of an application running on top of the NOS uses these definitions to enumerate how the application is to map the logical datapath sets of the user to the physical switching elements of the control system. Under this approach, the developer would have to enumerate all different scenarios that the control system may encounter and the mapping operation of the application for each scenario. This type of network virtualization (in which different views of the NIB are provided to different users) is referred to below as Type I network virtualization.

Another type of network virtualization, which is referred to below as Type II network virtualization, does not require the application developers to have intimate knowledge of the NIB elements and the links (if any) in the NIB between these elements. Instead, this type of virtualization allows the application to simply provide user specified, logical switching element attributes in the form of one or more tables, which are then mapped to NIB records by a table mapping engine. In other words, the Type II virtualized system of some embodiments accepts the logical switching element configurations (e.g., access control list table configurations, L2 table configurations, L3 table configurations, etc.) that the user defines without referencing any operational state of the switching elements in a particular network configuration. It then maps the logical switching element configurations to the switching element configurations stored in the NIB.

To perform this mapping, the system of some embodiments uses a database table mapping engine to map input tables, which are created from (1) logical switching configuration attributes, and (2) a set of properties associated with switching elements used by the system, to output tables. The content of these output tables are then transferred to the NIB elements. In some embodiments, the system uses a variation of the datalog database language, called nLog, to create the table mapping engine that maps input tables containing logical datapath data and switching element attributes to the output tables. Like datalog, nLog provides a few declaratory rules and operators that allow a developer to specify different operations that are to be performed upon the occurrence of different events. In some embodiments, nLog provides a limited subset of the operators that are provided by datalog in order to increase the operational speed of nLog. For instance, in some embodiments, nLog only allows the AND operator to be used in any of the declaratory rules.

The declaratory rules and operations that are specified through nLog are then compiled into a much larger set of rules by an nLog compiler. In some embodiments, this compiler translates each rule that is meant to address an event into several sets of database join operations. Collectively the larger set of rules forms the table mapping, rules engine that is referred to below as the nLog engine. In some embodiments, the nLog virtualization engine also provides feedback (e.g., from one or more of the output tables or from NIB records that are updated to reflect values stored in the output tables) to the user in order to provide the user with state information about the logical datapath set that he or she created. In this manner, the updates that the user gets are expressed in terms of the logical space that the user understands and not in terms of the underlying switching element states, which the user does not understand.

The use of nLog serves as a significant distinction between Type I virtualized control systems and Type II virtualized control systems, even for Type II systems that store user specified logical datapath sets in the NIB. This is because nLog provides a machine-generated rules engine that addresses the mapping between the logical and physical domains in a more robust, comprehensive manner than the hand-coded approach used for Type I virtualized control systems. In the Type I control systems, the application developers need to have a detailed understanding of the NIB structure and need to use this detailed understanding to write code that addresses all possible conditions that the control system would encounter at runtime. On the other hand, in Type II control systems, the application developers only need to produce applications that express the user-specified logical datapath sets in terms of one or more tables, which are then mapped in an automated manner to output tables and later transferred from the output tables to the NIB. This approach allows the Type II virtualized systems not to maintain the data regarding the logical datapath sets in the NIB. However, some embodiments maintain this data in the NIB in order to distribute this data among other NOS instances, as further described below.

As apparent from the above discussion, the applications that run on top of a NOS instance can perform several different sets of operations in several different embodiments of the invention. Examples of such operations include providing an interface to a user to access NIB data regarding the user's switching configuration, providing different layered NIB views to different users, providing control logic for modifying the provided NIB data, providing logic for propagating received modifications to the NIB, etc.

In some embodiments, the system embeds some or all such operations in the NOS instead of including them in an application operating on top of the NOS. Alternatively, in other embodiments, the system separates some or all of these operations into different subsets of operations and then has two or more applications that operate above the NOS perform the different subsets of operations. One such system runs two applications on top of the NOS, a control application and a virtualization application. In some embodiments, the control application allows a user to specify and populate logical datapath sets, while the virtualization application implements the specified logical datapath sets by mapping the logical datapath set to the physical switching infrastructure. In some embodiments, the virtualization application translates control application input into records that are written into the NIB, and from the NIB these records are then subsequently transferred to the switching infrastructure through the operation of the NOS. In some embodiments, the NIB stores both the logical datapath set input received through the control application and the NIB records that are produced by the virtualization application.

In some embodiments, the control application can receive switching infrastructure data from the NIB. In response to this data, the control application may modify record(s) associated with one or more logical datapath sets (LDPS). Any such modified LDPS record would then be translated to one or more physical switching infrastructure records by the virtualization application, which might then be transferred to the physical switching infrastructure by the NOS.

In some embodiments, the NIB stores data regarding each switching element within the network infrastructure of a system, while in other embodiments, the NIB stores state information about only switching elements at the edge of a network infrastructure. In some embodiments, edge switching elements are switching elements that have direct connections with the computing devices of the users, while non-edge switching elements only connect to edge switching elements and other non-edge switch elements.

The system of some embodiments only controls edge switches (i.e., only maintains data in the NIB regarding edge switches) for several reasons. Controlling edge switches provides the system with a sufficient mechanism for maintaining isolation between computing devices, which is needed, as opposed to maintaining isolation between all switch elements, which is not needed. The interior switches forward between switching elements. The edge switches forward between computing devices and other network elements. Thus, the system can maintain user isolation simply by controlling the edge switching elements because the edge switching elements are the last switches in line to forward packets to hosts.

Controlling only edge switches also allows the system to be deployed independent of concerns about the hardware vendor of the non-edge switches. Deploying at the edge allows the edge switches to treat the internal nodes of the network as simply a collection of elements that moves packets without considering the hardware makeup of these internal nodes. Also, controlling only edge switches makes distributing switching logic computationally easier. Controlling only edge switches also enables non-disruptive deployment of the system. Edge switching solutions can be added as top of rack switches without disrupting the configuration of the non-edge switches.

In addition to controlling edge switches, the network control system of some embodiments also utilizes and controls non-edge switches that are inserted in the switch network hierarchy to simplify and/or facilitate the operation of the controlled edge switches. For instance, in some embodiments, the control system requires the switches that it controls to be interconnected in a hierarchical switching architecture that has several edge switches as the leaf nodes in this switching architecture and one or more non-edge switches as the non-leaf nodes in this architecture. In some such embodiments, each edge switch connects to one or more of the non-leaf switches, and uses such non-leaf switches to facilitate its communication with other edge switches. Examples of functions that such non-leaf switches provide to facilitate such communications between edge switches in some embodiments include (1) routing of a packet with an unknown destination address (e.g., unknown MAC address) to the non-leaf switch so that this switch can route this packet to the appropriate edge switch, (2) routing a multicast or broadcast packet to the non-leaf switch so that this switch can convert this packet to a series of unicast packets to the desired destinations, (3) bridging remote managed networks that are separated by one or more networks, and (4) bridging a managed network with an unmanaged network.

Some embodiments employ one level of non-leaf (non-edge) switches that connect to edge switches and in some cases to other non-leaf switches. Other embodiments, on the other hand, employ multiple levels of non-leaf switches, with each level of non-leaf switch after the first level serving as a mechanism to facilitate communication between lower level non-leaf switches and leaf switches. In some embodiments, the non-leaf switches are software switches that are implemented by storing the switching tables in the memory of a standalone computer instead of an off the shelf switch. In some embodiments, the standalone computer may also be executing in some cases a hypervisor and one or more virtual machines on top of that hypervisor. Irrespective of the manner by which the leaf and non-leaf switches are implemented, the NIB of the control system of some embodiments stores switching state information regarding the leaf and non-leaf switches.

The above discussion relates to the control of edge switches and non-edge switches by a network control system of some embodiments. In some embodiments, edge switches and non-edge switches (leaf and non-leaf nodes) may be referred to as managed switches. This is because these switches are managed by the network control system (as opposed to unmanaged switches, which are not managed by the network control system, in the network) in order to implement logical datapath sets through the managed switches.

In addition to using the NIB to store switching-element data, the virtualized network-control system of some embodiments also stores other storage structures to store data regarding the switching elements of the network. These other storage structures are secondary storage structures that supplement the storage functions of the NIB, which is the primary storage structure of the system while the system operates. In some embodiments, the primary purpose for one or more of the secondary storage structures is to back up the data in the NIB. In these or other embodiments, one or more of the secondary storage structures serve a purpose other than backing up the data in the NIB (e.g., for storing data that are not in the NIB).

In some embodiments, the NIB is stored in system memory (e.g., RAM) while the system operates. This allows for fast access of the NIB records. In some embodiments, one or more of the secondary storage structures, on the other hand, are stored on disks, or other non-volatile memories, which can be slower to access. Such non-volatile disks or other non-volatile memories, however, improve the resiliency of the system as they allow the data to be stored in a persistent manner.

The system of some embodiments uses multiple types of storages in its pool of secondary storage structures. These different types of structures store different types of data, store data in different manners, and provide different query interfaces that handle different types of queries. For instance, in some embodiments, the system uses a persistent transactional database (PTD) and a hash table structure. The PTD in some embodiments is a database that is stored on disk or other non-volatile memory. In some embodiments, the PTD is a commonly available database, such as MySQL or SQLite. The PTD of some embodiments can handle complex transactional queries. As a transactional database, the PTD can undo a series of earlier query operations that it has performed as part of a transaction when one of the subsequent query operations of the transaction fails.

Moreover, some embodiments define a transactional guard processing (TGP) layer before the PTD in order to allow the PTD to execute conditional sets of database transactions. The TGP layer allows the PTD to avoid unnecessary later database operations when conditions of earlier operations are not met. The PTD in some embodiments stores the exact replica of the data that is stored in the NIB, while in other embodiments it stores only a subset of the data that is stored in the NIB. In some embodiments, some or all of the data in the NIB is stored in the PTD in order to ensure that the NIB data will not be lost in the event of a crash of the NOS or the NIB.

While the system is running, the hash table in some embodiments is not stored on a disk or other non-volatile memory. Instead, it is a storage structure that is stored in volatile system memory when the system is running. When the system is powered down, the content of the hash table is stored on disk. The hash table uses hashed indices that allow it to retrieve records in response to queries. This structure combined with the hash table's placement in the system's volatile memory allows the table to be accessed very quickly. To facilitate this quick access, a simplified query interface is used in some embodiments. For instance, in some embodiments, the hash table has just two queries, a Put query for writing values to the table and a Get query for retrieving values from the table. The system of some embodiments uses the hash table to store data that the NOS needs to retrieve very quickly. Examples of such data include network entity status, statistics, state, uptime, link arrangement, and packet handling information. Furthermore, in some embodiments, the NOS uses the hash tables as a cache to store information that is repeatedly queried, such as flow entries that will be written to multiple nodes.

Using a single NOS instance to control a network can lead to scaling and reliability issues. As the number of network elements increases, the processing power and/or memory capacity that are required by those elements will saturate a single node. Some embodiments further improve the resiliency of the control system by having multiple instances of NOS running on one or more computers, with each instance of NOS containing one or more of the secondary storage structures described above. Each instance in some embodiments not only includes a NOS instance, but also includes a virtualization application instance and/or a control application instance. In some of these embodiments, the control and/or virtualization applications partition the workload between the different instances in order to reduce each instance's control and/or virtualization workload. Also, in some embodiments, the multiple instances of NOS communicate the information stored in their secondary storage layers to enable each instance of NOS to cover for the others in the event of a NOS instance failing. Moreover, some embodiments use the secondary storage layer (i.e., one or more of the secondary storages) as a channel for communicating between the different instances.

The distributed, multi-instance control system of some embodiments maintains the same switch element data records in the NIB of each instance, while in other embodiments, the system allows NIBs of different instances to store different sets of switch element data records. Some embodiments that allow different instances to store different portions of the NIB, divide the NIB into N mutually exclusive portions and store each NIB portion in one NIB of one of N controller instances, where N is an integer value greater than 1. Other embodiments divide the NIB into N portions and store different NIB portions in different controller instances, but allow some or all of the portions to partially (but not completely) overlap with the other NIB portions.

The hash tables in the distributed control system of some embodiments form a distributed hash table (DHT), with each hash table serving as a DHT instance. In some embodiments, the DHT instances of all controller instances collectively store one set of records that is indexed based on hashed indices for quick access. These records are distributed across the different controller instances to minimize the size of the records within each instance and to allow for the size of the DHT to be increased by adding other DHT instances. According to this scheme, each DHT record is not stored in each controller instance. In fact, in some embodiments, each DHT record is stored in at most one controller instance. To improve the system's resiliency, some embodiments, however, allow one DHT record to be stored in more than one controller instance, so that in case one instance fails, the DHT records of that failed instance can be accessed from other instances. Some embodiments do not allow for replication of records across different DHT instances or allow only a small amount of such records to be replicated because these embodiments store in the DHT only the type of data that can be quickly re-generated.

The distributed control system of some embodiments replicates each NIB record in the secondary storage layer (e.g., in each PTD instance and/or in the DHT) in order to maintain the records in the NIB in a persistent manner. For instance, in some embodiments, all the NIB records are stored in the PTD storage layer. In other embodiments, only a portion of the NIB data is replicated in the PTD storage layer. For instance, some embodiments store a subset of the NIB records in another one of the secondary storage records, such as the DHT.

By allowing different NOS instances to store the same or overlapping NIB records, and/or secondary storage structure records, the system improves its overall resiliency by guarding against the loss of data due to the failure of any NOS or secondary storage structure instance. For instance, in some embodiments, the portion of NIB data that is replicated in the PTD (which is all of the NIB data in some embodiments or part of the NIB data in other embodiments) is replicated in the NIBs and PTDs of all controller instances, in order to protect against failures of individual controller instances (e.g., of an entire controller instance or a portion of the controller instance).

In some embodiments, each of the storages of the secondary storage layer uses a different distribution technique to improve the resiliency of a multiple NOS instance system. For instance, as mentioned above, the system of some embodiments replicates the PTD across NOS instances so that every NOS has a full copy of the PTD to enable a failed NOS instance to quickly reload its PTD from another instance. In some embodiments, the system distributes the DHT fully or with minimal overlap across multiple controller instances in order to maintain the DHT instance within each instance small. This approach also allows the size of the DHT to be increased by adding additional DHT instances, and this in turn allows the system to be more scalable.

For some or all of the communications between the distributed instances, the distributed system of some embodiments uses coordination managers (CM) in the controller instances to coordinate activities between the different controllers. Examples of such activities include writing to the NIB, writing to the PTD, writing to the DHT, controlling the switching elements, facilitating intra-controller communication related to fault tolerance of controller instances, etc.

To distribute the workload and to avoid conflicting operations from different controller instances, the distributed control system of some embodiments designates one controller instance within the system as the master of any particular NIB portion (e.g., as the master of a logical datapath set) and one controller instance within the system as the master of any given switching element. Even with one master controller, a different controller instance can request changes to different NIB portions and/or to different switching elements controlled by the master. If allowed, the master instance then effectuates this change and writes to the desired NIB portion and/or switching element. Otherwise, the master rejects the request.

The control application of some embodiments converts control data records (also called data tuples below) to forwarding plane data records (e.g., logical forwarding plane data) by performing conversion operations. In some embodiments, the generated logical forwarding plane data is transmitted to the virtualization application, which subsequently generate physical control plane data from the logical forwarding plane data. The physical control plane data is propagated to the managed switching elements, which in turn will produce forwarding plane data (e.g., flow entries) for defining forwarding behaviors of the switches.

The input event data may be logical data supplied by the user in some embodiments. As will be described further below, some embodiments provide the user with an interface that the user can use to specify input event data. An example of user-supplied data could be logical control plane data including access control list data for a logical switch that the user manages. The input event data may also be logical forwarding plane data that the control application generates in some embodiments from the logical control plane data. The input event data in some embodiments may also be physical forwarding plane data or physical control plane data received from the NIB. In some embodiments, the control application receives the physical forwarding data from a NIB monitor that monitors the NIB to detect a change in the NIB that reflects a change in one or more managed switching elements.

The control application performs a filtering operation to determine whether this instance of the control application is responsible for the input event data. As described above, several instances of the control application may operate in parallel to control multiple sets of logical datapaths in some embodiments. In these embodiments, each control application uses the filtering operation to filter out input data that does not relate to the control application's logical datapath set. To perform this filtering operation, the control application of some embodiments includes a filter module. This module in some embodiments is a standalone module, while in other embodiments it is implemented by a table mapping engine (e.g., implemented by the join operations performed by the table mapping engine) that maps records between input tables and output tables of the virtualization application.

The filtering operation fails in some embodiments when the input event data does not fall within one of the logical datapath sets that are the responsibility of the control application. When the filtering operation does not fail, a converter of the virtualization application generates one or more sets of data tuples based on the input event data. In some embodiments, the converter is a table mapping engine that performs a series of table mapping operations on the input event data to map the input event data to other data tuples. As mentioned above, this table mapping engine also performs the filtering operation in some embodiments. One example of such a table mapping engine is an nLog table-mapping engine. In some embodiments, the data tuples that the control application generates may include data (e.g., logical forwarding plane data) that the process has to push down to the NIB. The control application publishes to the NIB any data tuples that it generated if such publication is necessary.

The control application in some embodiments performs its mapping operations by using the nLog table mapping engine, which, as described above, is a custom variation of the datalog table mapping technique. Another custom design choice relates to the join operations performed by the nLog engine. Join operations are common database operations for creating association between records of different tables. In some embodiments, the nLog engine limits its join operations to inner join operations (also called as internal join operations) because performing outer join operations (also called as external join operations) can be time consuming and therefore impractical for real time operation of the engine.

Yet another custom design choice is to implement the nLog engine as a distributed table mapping engine that is executed by several different control applications. Some embodiments implement the nLog engine in a distributed manner by partitioning management of logical datapath sets. Each logical datapath set includes logical datapaths that are specified for a single user of the control system in some embodiments. Partitioning management of the logical datapath sets involves specifying for each particular logical datapath set only one controller instance as the instance responsible for specifying the NIB records associated with that particular logical datapath set. For instance, when the control system uses three switching elements to specify five logical datapath sets for five different users with two different controller instances, one controller instance can be the master for NIB records relating to two of the logical datapath sets while the other controller instance can be the master for the NIB records for the other three logical datapath sets. Partitioning management of logical datapath sets ensures that conflicting values for the same logical datapath sets are not written to the NIB by two different controller instances, and thereby alleviates the applications running on top of NOS from guarding against the writing of such conflicting values. Some embodiments refer the partitioning management of logical datapath sets as serializing management of logical datapaths.

Partitioning management of the LDPS' also assigns in some embodiments the table mapping operations for each LDPS to the nLog engine of the controller instance responsible for the LDPS. The distribution of the nLog table mapping operations across several nLog instances reduces the load on each nLog instance and thereby increases the speed by which each nLog instance can complete its mapping operations. Also, this distribution reduces the memory size requirement on each machine that executes a controller instance. As further described below, some embodiments partition the nLog table mapping operations across the different instances by designating the first join operation that is performed by each nLog instance to be based on the LDPS parameter. This designation ensures that each nLog instance's join operations fail and terminate immediately when the instance has started a set of join operations that relate to a LDPS that is not managed by the nLog instance.

In addition to creating and managing logical switching elements, the control application of some embodiments allows the user to enable a logical port of a logical switching element for port security. Port security in some embodiments is a technique to apply to a particular port of a logical switching element such that the network data entering and existing the logical switching element through the particular logical port have certain addresses that the switching element has restricted the logical port to use. For instance, a logical switching element may restrict a particular logical port to one or more certain network addresses (e.g., a MAC address and/or an IP address). That is, any network traffic coming in or going out through the particular logical port must have the restricted addresses as source or destination addresses. The logical switching element drops particular network traffic entering or exiting the logical switching element through the particular logical port when the particular network traffic does not include the specified set of network addresses.

To enable a logical port of a logical switch for port security, the control application of some embodiments receives user inputs that designate a particular logical port and a logical switch to which the particular logical port belongs. The control application in some embodiments formats the user inputs into logical control plane data specifying the designation. The control application in some embodiments then converts the logical control plane data into logical forwarding data that specify port security functions.

In some embodiments, the control application also allows the user to enable a logical switching element for Quality of Service (QoS). QoS in some embodiments is a technique to apply to a particular logical port of a logical switching element such that the switching element can guarantee a certain level of performance to network data that a machine sends through the particular logical port. For instance, by enabling QoS for a particular port of a switching element, the switch guarantees a minimum bitrate and/or a maximum bitrate to network data sent by a machine to the network through the switching element.

The control application of some embodiments receives user inputs that specify a particular logical switch to enable for QoS. The control application may additionally receive performance constraints data (e.g., minimum/maximum bitrates, etc.). The control application in some embodiments formats the user inputs into logical control plane data. The control application in some embodiments then converts the logical control plane data into logical forwarding data that specify QoS functions. In some embodiments, the control application performs several rounds of mapping operations to create and/or modify network constructs that are necessary to enable the logical switch for QoS.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 10 illustrates an approach of maintaining an entire global NIB data structure in each NOS instance.

FIG. 11 illustrates an alternative approach of dividing the global NIB into two separate portions, and storing each of these portions in a different NOS instance.

FIG. 12 illustrates another alternative approach of dividing the global NIB into two separate portions having overlapping portions.

DETAILED DESCRIPTION

Figure 1:
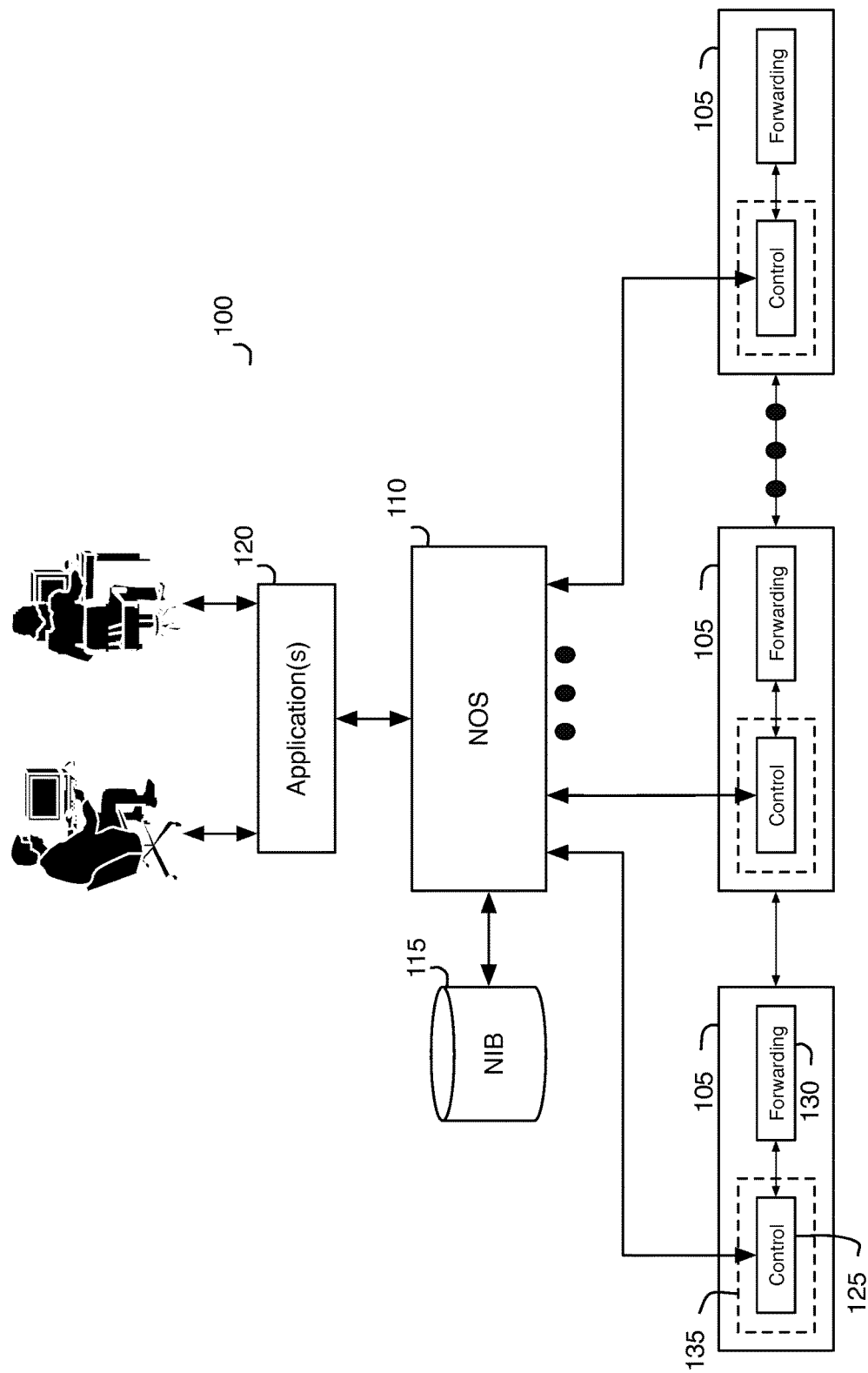
FIG. 1 illustrates a virtualized network system of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method that allows several different logical datapath sets to be specified for several different users through one or more shared switching elements without allowing the different users to control or even view each other's switching logic. In some embodiments, the method provides a set of software tools that allows the system to accept logical datapath sets from users and to configure the switching elements to implement these logical datapath sets. These software tools allow the method to virtualize control of the shared switching elements and the network that is defined by the connections between these shared switching elements, in a manner that prevents the different users from viewing or controlling each other's logical datapath sets while sharing the same switching elements.

In some embodiments, one of the software tools that the method provides that allows it to virtualize control of a set of switching elements (i.e., to enable the method to allow several users to share the same switching elements without viewing or controlling each other's logical datapath sets) is an intermediate data storage structure that (1) stores the state of the network, (2) receives modifications to different parts of the network from different users, and (3), in some embodiments, provide different views of the state of the network to different users. For instance, in some embodiments, the intermediate data storage structure is a network information base (NIB) data structure that stores the state of the network that is defined by one or more switching elements. In some embodiments, the NIB also stores the logical configuration and the logical state for each user specified logical datapath set. In these embodiments, the information in the NIB that represents the state of the actual switching elements accounts for only a subset of the total information stored in the NIB.

The method uses the NIB data structure to read the state of the network and to write modifications to the state of the network. When the data structure is modified in order to effectuate a change in the switching logic of a switching element, the method propagates the modification to the switching element.

In some embodiments, the method is employed by a virtualized network control system that (1) allows user to specify different logical datapath sets, (2) maps these logical datapath sets to a set of switching elements managed by the control system. In some embodiments, the network infrastructure switching elements includes virtual or physical network switches, routers, and/or other switching devices, as well as any other network elements (such as load balancers, etc.) that establish connections between these switches, routers, and/or other switching devices. Such switching elements (e.g., physical switching elements, such as physical switches or routers) are implemented as software switches in some embodiments. Software switches are switches that are implemented by storing the switching tables in the memory of a standalone computer instead of an off the shelf switch. In some embodiments, the standalone computer may also be executing in some cases a hypervisor and one or more virtual machines on top of that hypervisor These switches are referred to below as managed switching elements or managed forwarding elements as they are managed by the network control system in order to implement the logical datapath sets. In some embodiments described below, the control system manages these switching elements by pushing physical control plane data to them, as further described below. Switching elements generally receive data (e.g., a data packet) and perform one or more processing operations on the data, such as dropping a received data packet, passing a packet that is received from one source device to another destination device, processing the packet and then passing it a destination device, etc. In some embodiments, the physical control plane data that is pushed to a switching element is converted by the switching element (e.g., by a general purpose processor of the switching element) to physical forwarding plane data that specifies how the switching element (e.g., how a specialized switching circuit of the switching element) processes data packets that it receives.

The virtualized control system of some embodiments includes (1) a network operating system (NOS) that creates and maintains the NIB storage structure, and (2) one or more applications that run on top of the NOS to specify control logic for reading values from and writing values to the NIB. The NIB of some of these embodiments serves as a communication channel between the different controller instances and, in some embodiments, a communication channel between different processing layers of a controller instance.

Several examples of such systems are described below in Section I. Section II then describes the software architecture of a NOS instance. Section III describes the control data pipeline of some embodiments of the invention. Section IV next describes how some embodiments perform the virtualization operations that map user specified input to LDPS data tuples. Next, Section V describes several examples of use cases in which the control application performs the virtualization operations. Finally, Section VI describes an electronic system that implements some embodiments of the invention.

I. Virtualized Control System

FIG. 1 illustrates a virtualized network system 100 of some embodiments of the invention. This system allows multiple users to create and control multiple different sets of logical datapaths on a shared set of network infrastructure switching elements (e.g., switches, virtual switches, software switches, etc.). In allowing a user to create and control the user's set of logical datapaths (i.e., the user's switching logic), the system does not allow the user to have direct access to another user's set of logical datapaths in order to view or modify the other user's switching logic. However, the system does allow different users to pass packets through their virtualized switching logic to each other if the users desire such communication.

As shown in FIG. 1, the system 100 includes one or more switching elements 105, a network operating system 110, a network information base 115, and one or more applications 120. The switching elements include N switching devices (where N is a number equal to 1 or greater) that form the network infrastructure switching elements of the system 100. In some embodiments, the network infrastructure switching elements includes virtual or physical network switches, software switches (e.g., Open vSwitch), routers, and/or other switching devices, as well as any other network elements (such as load balancers, etc.) that establish connections between these switches, routers, and/or other switching devices. All such network infrastructure switching elements are referred to below as switching elements or forwarding elements.

The virtual or physical switching devices 105 typically include control switching logic 125 and forwarding switching logic 130. In some embodiments, a switch's control logic 125 specifies (1) the rules that are to be applied to incoming packets, (2) the packets that will be discarded, and (3) the packet processing methods that will be applied to incoming packets. The virtual or physical switching elements 105 use the control logic 125 to populate tables governing the forwarding logic 130. The forwarding logic 130 performs lookup operations on incoming packets and forwards the incoming packets to destination addresses.

As further shown in FIG. 1, the system 100 includes one or more applications 120 through which switching logic (i.e., sets of logical datapaths) is specified for one or more users (e.g., by one or more administrators or users). The network operating system (NOS) 110 serves as a communication interface between (1) the switching elements 105 that perform the physical switching for any one user, and (2) the applications 120 that are used to specify switching logic for the users. In this manner, the application logic determines the desired network behavior while the NOS merely provides the primitives needed to access the appropriate network state. In some embodiments, the NOS 110 provides a set of Application Programming Interfaces (API) that provides the applications 120 programmatic access to the network switching elements 105 (e.g., access to read and write the configuration of network switching elements). In some embodiments, this API set is data-centric and is designed around a view of the switching infrastructure, allowing control applications to read and write state to any element in the network.

To provide the applications 120 programmatic access to the switching elements, the NOS 110 needs to be able to control the switching elements 105 itself. The NOS uses different techniques in different embodiments to control the switching elements. In some embodiments, the NOS can specify both control and forwarding switching logic 125 and 130 of the switching elements. In other embodiments, the NOS 110 controls only the control switching logic 125 of the switching elements, as shown in FIG. 1. In some of these embodiments, the NOS 110 manages the control switching logic 125 of a switching element through a commonly known switch-access interface that specifies a set of APIs for allowing an external application (such as a network operating system) to control the control plane functionality of a switching element. Two examples of such known switch-access interfaces are the OpenFlow interface and the Open Virtual Switch interface, which are respectively described in the following two papers: McKeown, N. (2008). *OpenFlow: Enabling Innovation in Campus Networks* (which can be retrieved from http://www.openflowswitch.org//documents/openflow-wp-latest.pdf), and Pettit, J. (2010). *Virtual Switching in an Era of Advanced Edges* (which can be retrieved from http://openvswitch.org/papers/dccaves2010.pdf). These two papers are incorporated herein by reference.

FIG. 1 conceptually illustrates the use of switch-access APIs through the depiction of halos 135 around the control switching logic 125. Through these APIs, the NOS can read and write entries in the control plane flow tables. The NOS' connectivity to the switching elements' control plane resources (e.g., the control plane tables) is implemented in-band (i.e., with the network traffic controlled by NOS) in some embodiments, while it is implemented out-of-band (i.e., over a separate physical network) in other embodiments. There are only minimal requirements for the chosen mechanism beyond convergence on failure and basic connectivity to the NOS, and thus, when using a separate network, standard IGP protocols such as IS-IS or OSPF are sufficient.

In order to define the control switching logic 125 for physical switching elements, the NOS of some embodiments uses the Open Virtual Switch protocol to create one or more control tables within the control plane of a switch element. The control plane is typically created and executed by a general purpose CPU of the switching element. Once the system has created the control table(s), the system then writes flow entries to the control table(s) using the OpenFlow protocol. The general purpose CPU of the physical switching element uses its internal logic to convert entries written to the control table(s) to populate one or more forwarding tables in the forwarding plane of the switch element. The forwarding tables are created and executed typically by a specialized switching chip of the switching element. Through its execution of the flow entries within the forwarding tables, the switching chip of the switching element can process and route packets of data that it receives.

To enable the programmatic access of the applications 120 to the switching elements 105, the NOS also creates the network information base (NIB) 115. The NIB is a data structure in which the NOS stores a copy of the switch-element states tracked by NOS. The NIB of some embodiments is a graph of all physical or virtual switch elements and their interconnections within a physical network topology and their forwarding tables. For instance, in some embodiments, each switching element within the network infrastructure is represented by one or more data objects in the NIB. However, in other embodiments, the NIB stores state information about only some of the switching elements. For example, as further described below, the NIB in some embodiments only keeps track of switching elements at the edge of a network infrastructure. In yet other embodiments, the NIB stores state information about edge switching elements in a network as well as some non-edge switching elements in the network that facilitate communication between the edge switching elements. In some embodiments, the NIB also stores the logical configuration and the logical state for each user specified logical datapath set. In these embodiments, the information in the NIB that represents the state of the actual switching elements accounts for only a subset of the total information stored in the NIB.

In some embodiments, the NIB 115 is the heart of the NOS control model in the virtualized network system 100. Under one approach, applications control the network by reading from and writing to the NIB. Specifically, in some embodiments, the application control logic can (1) read the current state associated with network entity objects in the NIB, (2) alter the network state by operating on these objects, and (3) register for notifications of state changes to these objects. Under this model, when an application 120 needs to modify a record in a table (e.g., a control plane flow table) of a switching element 105, the application 120 first uses the NOS' APIs to write to one or more objects in the NIB that represent the table in the NIB. The NOS then acting as the switching element's controller propagates this change to the switching element's table.

Figure 2:
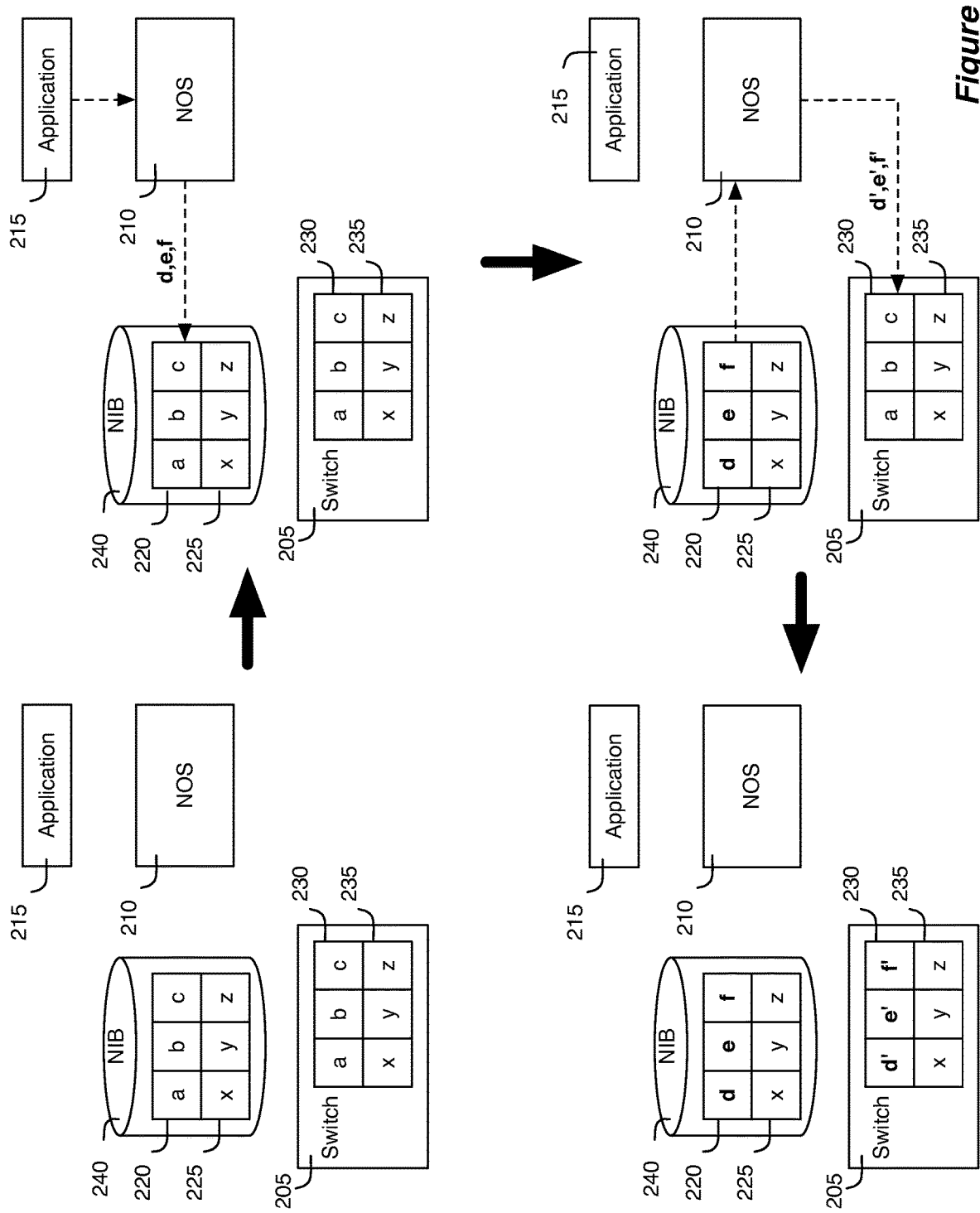
FIG. 2 illustrates an example of switch controller functionality of the network operating system (NOS) of some embodiments.

FIG. 2 presents one example that illustrates this switch controller functionality of the NOS 110. In particular, this figure illustrates in four stages the modification of a record (e.g., a flow table record) in a switch 205 by an application 215 and a NOS 210. In this example, the switch 205 has two switch logic records 230 and 235. As shown in stage one of FIG. 2, a NIB 240 stores two records 220 and 225 that correspond to the two switch logic records 230 and 235 of the switch. In the second stage, the application uses the NOS' APIs to write three new values d, e, and f in the record 220 of the NIB to replace three previous values a, b, and c.

Next, in the third stage, the NOS uses the set of switch-access APIs to write a new set of values into the switch. In some embodiments, the NIB performs a translation operation that modifies the format of the records before writing these records into the NIB. These operations are pictorially illustrated in FIG. 2 by showing the values d, e, f translated into ', e', 'f', and the writing of these new values into the switch 205. Alternatively, in some embodiments, one or more sets of values are kept identically in the NIB and the switching element, which thereby causes the NOS 210 to write the NIB values directly to the switch 205 unchanged.

In yet other embodiments, the NOS' translation operation might modify the set of values in the NIB (e.g., the values d, e, f) into a different set of values with fewer values (e.g., values x and y, where x and y might be a subset of d, e, and f, or completely different) or additional values (e.g., the w, x, y, z, where w, x, y, and z might be a super set of all or some of d, e, and f, or completely different). The NOS in these embodiments would then write this modified set of values (e.g., values x and y, or values w, x, y and z into the switching element).

The fourth stage finally shows the switch 205 after the old values a, b, and c have been replaced in the switch control record 230 with the values d', e', and f'. Again, in the example shown in FIG. 2, the NOS of some embodiments propagates NIB records to the switches as modified versions of the records were written to the NIB. In other embodiments, the NOS applies processing (e.g., data transformation) to the NIB records before the NOS propagates the NIB records to the switches, and such processing changes the format, content and quantity of data written to the switches.

A. Different NIB Views

In some embodiments, the virtualized system 100 of FIG. 1 provides different views of the NIB to different users in order (1) to ensure that different users do not have direct view and control over each other's switching logic and (2) to provide each user with a view of the switching logic at an abstraction level that is desired by the user. For instance, in some embodiments, the NIB is a hierarchical data structure that represents different attributes of different switching elements as elements (e.g., different nodes) in a hierarchy. The NIB in some of these embodiments is a multi-layer hierarchical data structure, with each layer having a hierarchical structure and one or more elements (e.g., nodes) on each layer linked to one or more elements (e.g., nodes) on another layer. In some embodiments, the lowest layer elements correspond to the actual switching elements and their attributes, while each of the higher layer elements serves as abstractions of the actual switching elements and their attributes. As further described below, some of these higher layer elements are used in some embodiments to show different abstract switching elements and/or switching element attributes to different users in a virtualized control system. In other words, the NOS of some embodiments generates the multi-layer, hierarchical NIB data structure, and the NOS or an application that runs on top of the NOS shows different users different views of different parts of the hierarchical levels and/or layers, in order to provide the different users with virtualized access to the shared switching elements and network.

Figure 3:
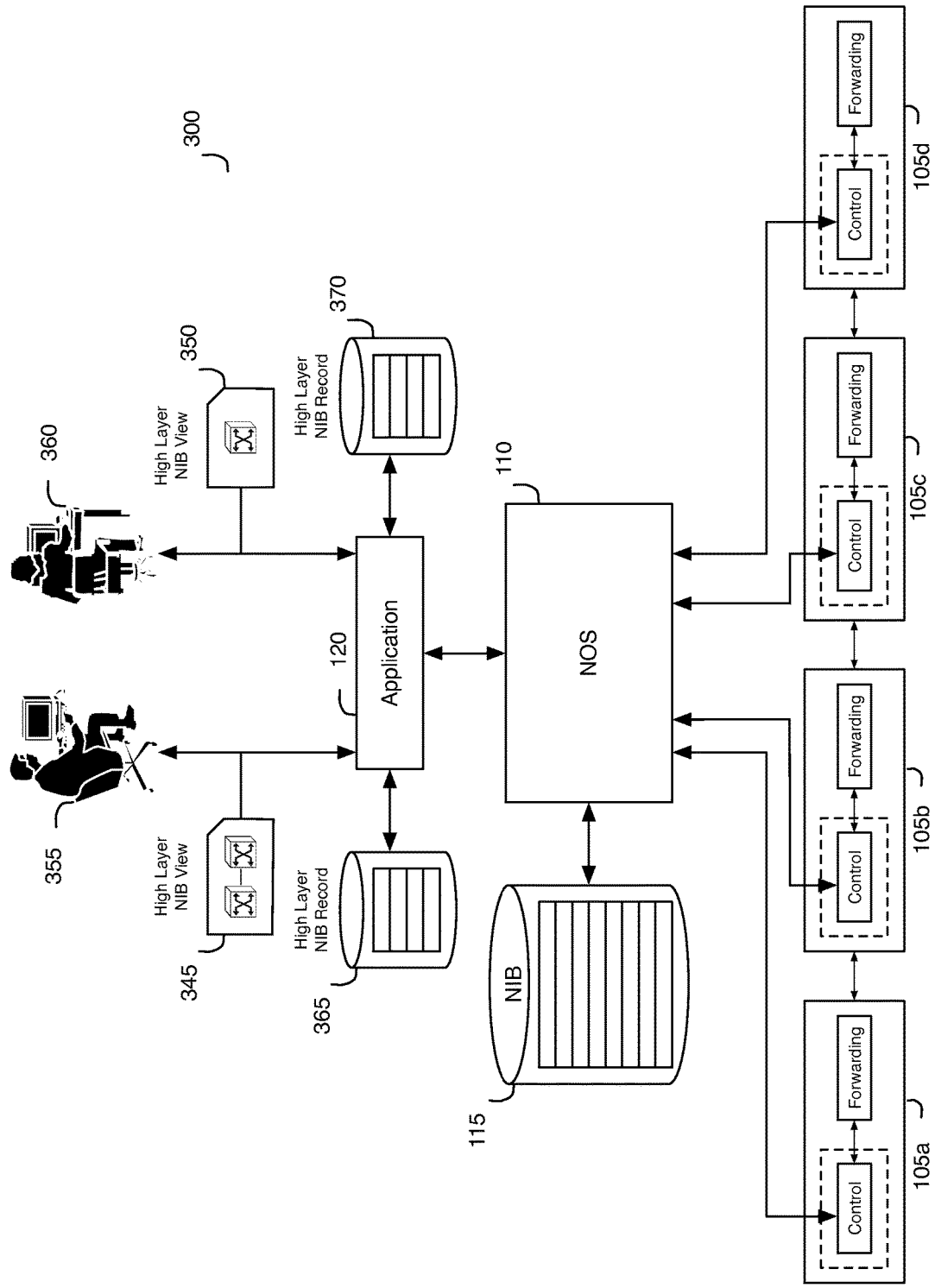
FIG. 3 illustrates an example of displaying different network information base (NIB) views to different users.

FIG. 3 illustrates an example of displaying different NIB views to different users. Specifically, this figure illustrates a virtualized switching system 300 that includes several switching elements that are shared by two users. The system 300 is similar to the system 100 of FIG. 1, except that the system 300 is shown to include four switching elements 105a-105d and one application 120, as opposed to the more general case of N switching elements 105 and M (where M is a number greater than or equal to 1) applications in FIG. 1. The number of switching elements and the use of one application are purely exemplary. Other embodiments might use more or fewer switching elements and applications. For instance, instead of having the two users interface with the same application, other embodiments provide two applications to interface with the two users.

In system 300, the NIB 115 stores sets of data records for each of the switching elements 105a-105d. In some embodiments, a system administrator can access these four sets of data through an application 120 that interfaces with the NOS. However, other users that are not system administrators do not have access to all of the four sets of records in the NIB, because some switch logic records in the NIB might relate to the logical switching configuration of other users.

Instead, each non system-administrator user can only view and modify the switching element records in the NIB that relate to the logical switching configuration of the user. FIG. 3 illustrates this limited view by showing the application 120 providing a first layered NIB view 345 to a first user 355 and a second layered NIB view 350 to a second user 360. The first layered NIB view 345 shows the first user data records regarding the configuration of the shared switching elements 105a-105d for implementing the first user's switching logic and the state of this configuration. The second layered NIB view 350 shows the second user data records regarding the configuration of the shared switching elements 105a-105d for implementing the second user's switching logic and the state of this configuration. In viewing their own logical switching configuration, neither user can view the other user's logical switching configuration.

In some embodiments, each user's NIB view is a higher level NIB view that represents an abstraction of the lowest level NIB view that correlates to the actual network infrastructure that is formed by the switching elements 105a-105d. For instance, as shown in FIG. 3, the first user's layered NIB view 345 shows two switches that implement the first user's logical switching configuration, while the second user's layered NIB view 350 shows one switch that implements the second user's logical switching configuration. This could be the case even if either user's switching configuration uses all four switching elements 105a-105d. However, under this approach, the first user perceives that his computing devices are interconnected by two switching elements, while the second user perceives that her computing devices are interconnected by one switching element.

The first layered NIB view is a reflection of a first set of data records 365 that the application 120 allows the first user to access from the NIB, while the second layered NIB view is a representation of a second set of data records 370 that the application 120 allows the second user to access from the NIB. In some embodiments, the application 120 retrieves the two sets of data records 365 and 370 from the NIB and maintains these records locally, as shown in FIG. 3. In other embodiments, however, the application does not maintain these two sets of data records locally. Instead, in these other embodiments, the application simply provides the users with an interface to access the limited set of first and second data records from the NIB 115. Also, in other embodiments, the system 300 does not provide switching element abstractions in the higher layered NIB views 345 and 350 that it provides to the users. Rather, it simply provides views to the limited first and second set of data records 365 and 370 from the NIB.

Irrespective of whether the application maintains a local copy of the first and second data records or whether the application only provides the switching element abstractions in its higher layered NIB views, the application 120 serves as an interface through which each user can view and modify the user's logical switching configuration, without being able to view or modify the other user's logical switching configuration. Through the set of APIs provided by the NOS 110, the application 120 propagates to the NIB 115 changes that a user makes to the logical switching configuration view that the user receives from the application. The propagation of these changes entails the transferring, and in some cases of some embodiments, the transformation, of the high level data entered by a user for a higher level NIB view to lower level data that is to be written to lower level NIB data that is stored by the NOS.

In the system 300 of FIG. 3, the application 120 can perform several different sets of operations in several different embodiments of the invention, as apparent from the discussion above. Examples of such operations include providing an interface to a user to access NIB data regarding the user's logical switching configuration, providing different layered NIB views to different users, providing control logic for modifying the provided NIB data, providing logic for propagating received modifications to the NIB structure stored by the NOS, etc.

Figure 4:
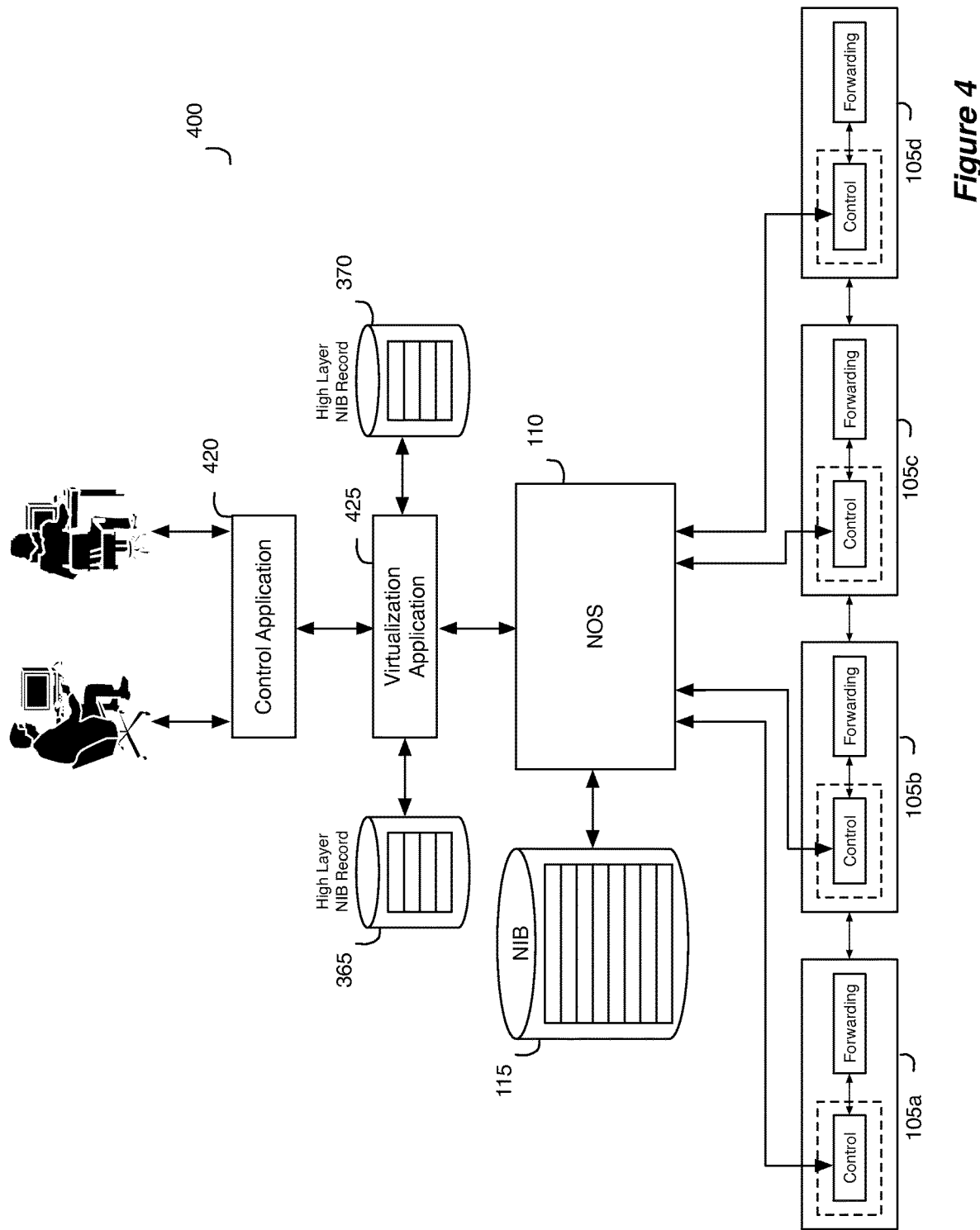
FIG. 4 illustrates a virtualized system that employs control and virtualization applications.

The system of some embodiments embeds all such operations in the NOS 110 instead of in the application 120 operating on top of the NOS. Alternatively, in other embodiments the system separates these operations into several applications that operate above the NOS. FIG. 4 illustrates a virtualized system that employs several such applications. Specifically, this figure illustrates a virtualized system 400 that is similar to the virtualized system 300 of FIG. 3, except that the operations of the application 120 in the system 400 have been divided into two sets of operations, one that is performed by a control application 420 and one that is performed by a virtualization application 425.

In some embodiments, the virtualization application 425 interfaces with the NOS 110 to provide different views of different NIB records to different users through the control application 420. The control application 420 also provides the control logic for allowing a user to specify different operations with respect to the limited NIB records/views provided by the virtualization application. Examples of such operations can be read operations from the NIB or write operations to the NIB. The virtualization application then translates these operations into operations that access the NIB. In translating these operations, the virtualization application in some embodiments also transfers and/or transforms the data that are expressed in terms of the higher level NIB records/views to data that are expressed in terms of lower level NIB records.

Even though FIG. 4 shows just one control application and one virtualization application being used for the two users, the system 400 in other embodiments employs two control applications and/or two virtualization applications for the two different users. Similarly, even though several of the above-described figures show one or more applications operating on a single NOS instance, other embodiments provide several different NOS instances on top of each of which one or more applications can execute. Several such embodiments will be further described below.

B. Type I versus Type II Virtualized System

Different embodiments of the invention use different types of virtualization applications. One type of virtualization application exposes the definition of different elements at different hierarchical levels in the NIB and the definition of the links between these elements to the control applications that run on top of the NOS and the virtualization application in order to allow the control application to define its operations by reference to these definitions. For instance, in some embodiments, the developer of the control application running on top of the virtualization application uses these definitions to enumerate how the application is to map the logical datapath sets of the user to the physical switching elements of the control system. Under this approach, the developer would have to enumerate all different scenarios that the control system may encounter and the mapping operation of the application for each scenario. This type of virtualization is referred to below as Type I network virtualization.

Another type of network virtualization, which is referred to below as Type II network virtualization, does not require the application developers to have intimate knowledge of the NIB elements and the links in the NIB between these elements. Instead, this type of virtualization allows the application to simply provide user specified switching element attributes in the form of one or more tables, which are then mapped to NIB records by a table mapping engine. In other words, the Type II virtualized system of some embodiments accepts switching element configurations (e.g., access control list table configurations, L2 table configurations, L3 table configurations, etc.) that the user defines without referencing any operational state of the switching elements in a particular network configuration. It then maps the user-specified switching element configurations to the switching element configurations stored in the NIB.

Figure 5:
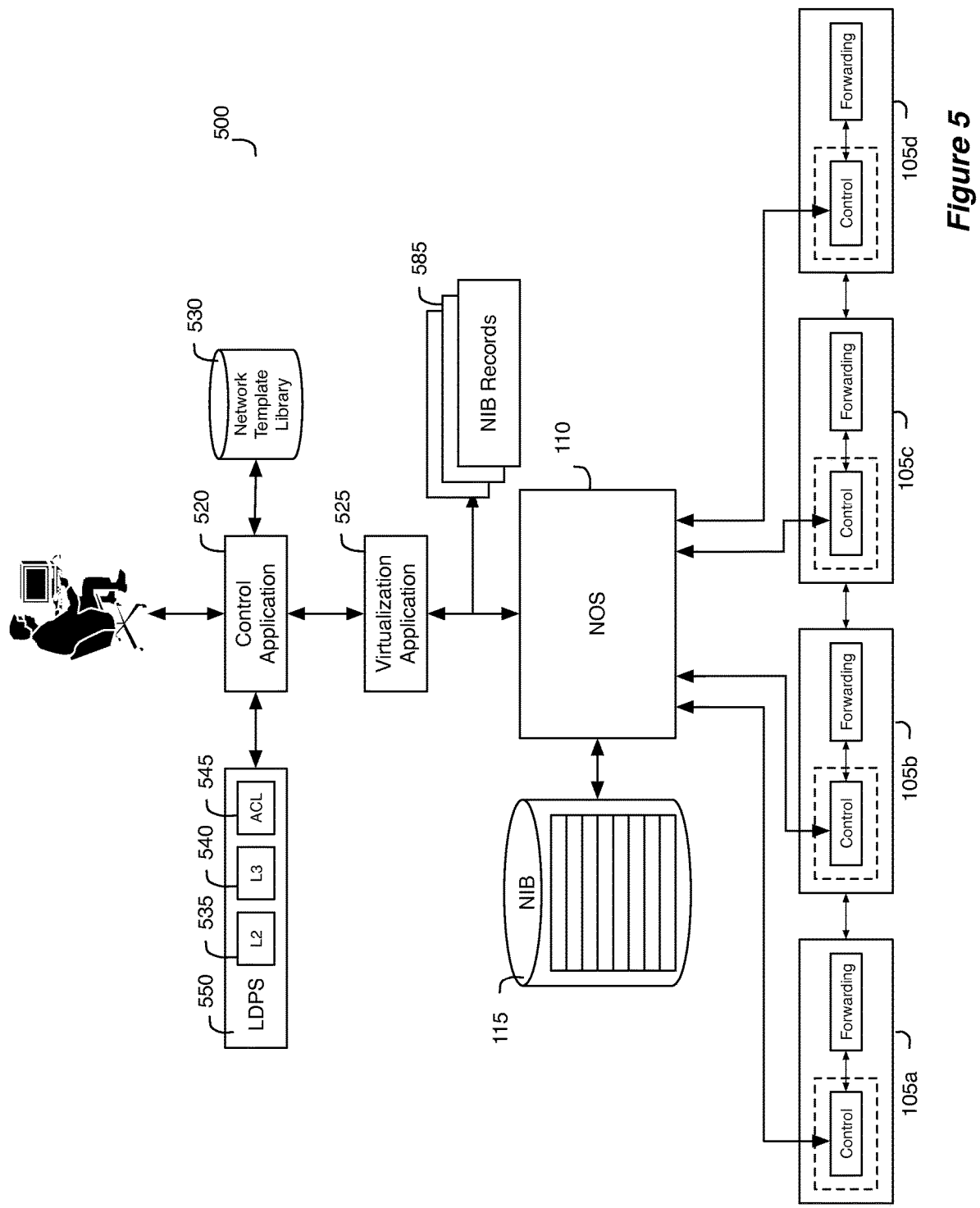
FIG. 5 illustrates an example of a virtualized system of some embodiments.

FIG. 5 illustrates an example of such a Type II virtualized system. Like the virtualized system 300 of FIG. 3 and the virtualized system 400 of FIG. 4, the virtualized system 500 in this example is shown to include one NOS 110 and four switching elements 105a-105d. Also, like the virtualized system 400, the system 500 includes a control application and a virtualization application that run on top of the NOS 110. In some embodiments, the control application 520 allows a user to specify and populate logical datapath sets, while the virtualization application 525 implements the specified logical datapath sets by mapping the logical datapath set to the physical switching infrastructure.

More specifically, the control application 520 allows (1) a user to specify abstract switching element configurations, which the virtualization application 525 then maps to the data records in the NIB, and (2) the user to view the state of the abstract switching element configurations. In some embodiments, the control application 520 uses a network template library 530 to allow a user to specify a set of logical datapaths by specifying one or more switch element attributes (i.e., one or more switch element configurations). In the example shown in FIG. 5, the network template library includes several types of tables that a switching element may include. In this example, the user has interfaced with the control application 520 to specify an L2 table 535, an L3 table 540, and an access control list (ACL) table 545. These three tables specify a logical datapath set 550 for the user. In some embodiments a logical datapath set defines a logical switching element (also referred to as a logical switch). A logical switch in some embodiments is a simulated/conceptual switch that is defined (e.g., by a user) to conceptually describe a set of switching behaviors for a switch. The control application of some embodiments (such as the control application 520 illustrated in FIG. 5) implements this logical switch across one or more physical switches, which as mentioned above may be hardware switches, software switches, or virtual switches defined on top of other switches.

In specifying these tables, the user simply specifies desired switch configuration records for one or more abstract, logical switching elements. When specifying these records, the user of the system 500 does not have any understanding of the switching elements 105a-105d employed by the system nor any data regarding these switching elements from the NIB 115. The only switch-element specific data that the user of the system 500 receives is the data from the network template library, which specifies the types of network elements that the user can define in the abstract, which the system can then process.

While the example in FIG. 5 shows the user specifying ACL table, one of ordinary skill in the art will realize that the system of some embodiments does not provide such specific switch table attributes in the library 530. For instance, in some embodiments, the switch-element abstractions provided by the library 530 are generic switch tables and do not relate to any specific switching element table, component and/or architecture. In these embodiments, the control application 520 enables the user to create generic switch configurations for a generic set of one or more tables. Accordingly, the abstraction level of the switch-element attributes that the control application 520 allows the user to create is different in different embodiments.

Irrespective of the abstraction level of the switch-element attributes produced through the control logic application, the virtualization application 525 performs a mapping operation that maps the specified switch-element attributes (e.g., the specific or generic switch table records) to records in the NIB. In some embodiments, the virtualization application translates control application input into one or more NIB records 585. The virtualization application then writes the resulting NIB records 585 to the NIB through the API set provided by NOS. From the NIB, these records are then subsequently transferred to the switching infrastructure through the operation of the NOS. In some embodiments, the NIB stores both the logical datapath set input received through the control application as well as the NIB records that are produced by the virtualization application.

In some embodiments, the control application can receive switching infrastructure data from the NIB. In response to this data, the control application may modify record(s) associated with one or more logical datapath sets (LDPS). Any such modified LDPS record would then be translated to one or more physical switching infrastructure records by the virtualization application, which might then be transferred to the physical switching infrastructure by the NOS.

To map the control application input to physical switching infrastructure attributes for storage in the NIB, the virtualization application of some embodiments uses a database table mapping engine to map input tables, which are created from (1) the control-application specified input tables, and (2) a set of properties associated with switching elements used by the system, to output tables. The content of these output tables are then transferred to the NIB elements.

Some embodiments use a variation of the datalog database language to allow application developers to create the table mapping engine for the virtualization application, and thereby to specify the manner by which the virtualization application maps logical datapath sets to the controlled physical switching infrastructure. This variation of the datalog database language is referred to below as nLog. Like datalog, nLog provides a few declaratory rules and operators that allow a developer to specify different operations that are to be performed upon the occurrence of different events. In some embodiments, nLog provides a limited subset of the operators that are provided by datalog in order to increase the operational speed of nLog. For instance, in some embodiments, nLog only allows the AND operator to be used in any of the declaratory rules.

The declaratory rules and operations that are specified through nLog are then compiled into a much larger set of rules by an nLog compiler. In some embodiments, this compiler translates each rule that is meant to address an event into several sets of database join operations. Collectively the larger set of rules forms the table mapping, rules engine that is referred to below as the nLog engine. The nLog mapping techniques of some embodiments is further described below.

In some embodiments, the nLog virtualization engine provides feedback (e.g., from one or more of the output tables or from NIB records that are updated to reflect values stored in the output tables) to the user in order to provide the user with state information about the logical datapath set that he or she created. In this manner, the updates that the user gets are expressed in terms of the logical space that the user understands and not in terms of the underlying switching element states, which the user does not understand.

The use of nLog serves as a significant distinction between Type I virtualized control systems and Type II virtualized control systems, even for Type II systems that store user specified logical datapath sets in the NIB. This is because nLog provides a machine-generated rules engine that addresses the mapping between the logical and physical domains in a more robust, comprehensive manner than the hand-coded approach used for Type I virtualized control systems. In the Type I control systems, the application developers need to have a detailed understanding of the NIB structure and need to use this detailed understanding to write code that addresses all possible conditions that the control system would encounter at runtime. On the other hand, in Type II control systems, the application developers only need to produce applications that express the user-specified logical datapath sets in terms of one or more tables, which are then automatically mapped to output tables whose content are in turn transferred to the NIB. This approach allows the Type II virtualized systems not to maintain the data regarding the logical datapath sets in the NIB. However, some embodiments maintain this data in the NIB in order to distribute this data among other NOS instances, as further described below.

C. Edge and Non-Edge Switch Controls

Figure 6:
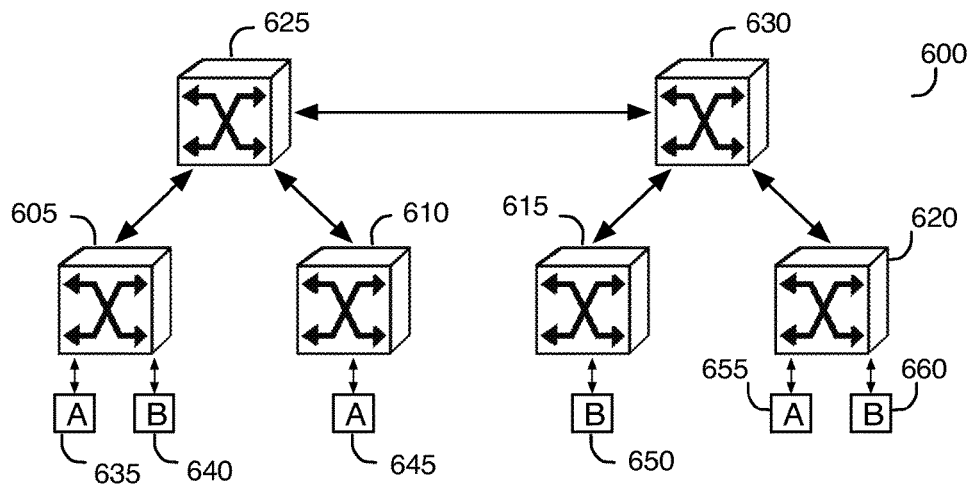
FIG. 6 illustrates the switch infrastructure of a multi-tenant server hosting system in some embodiments.
Figure 7:
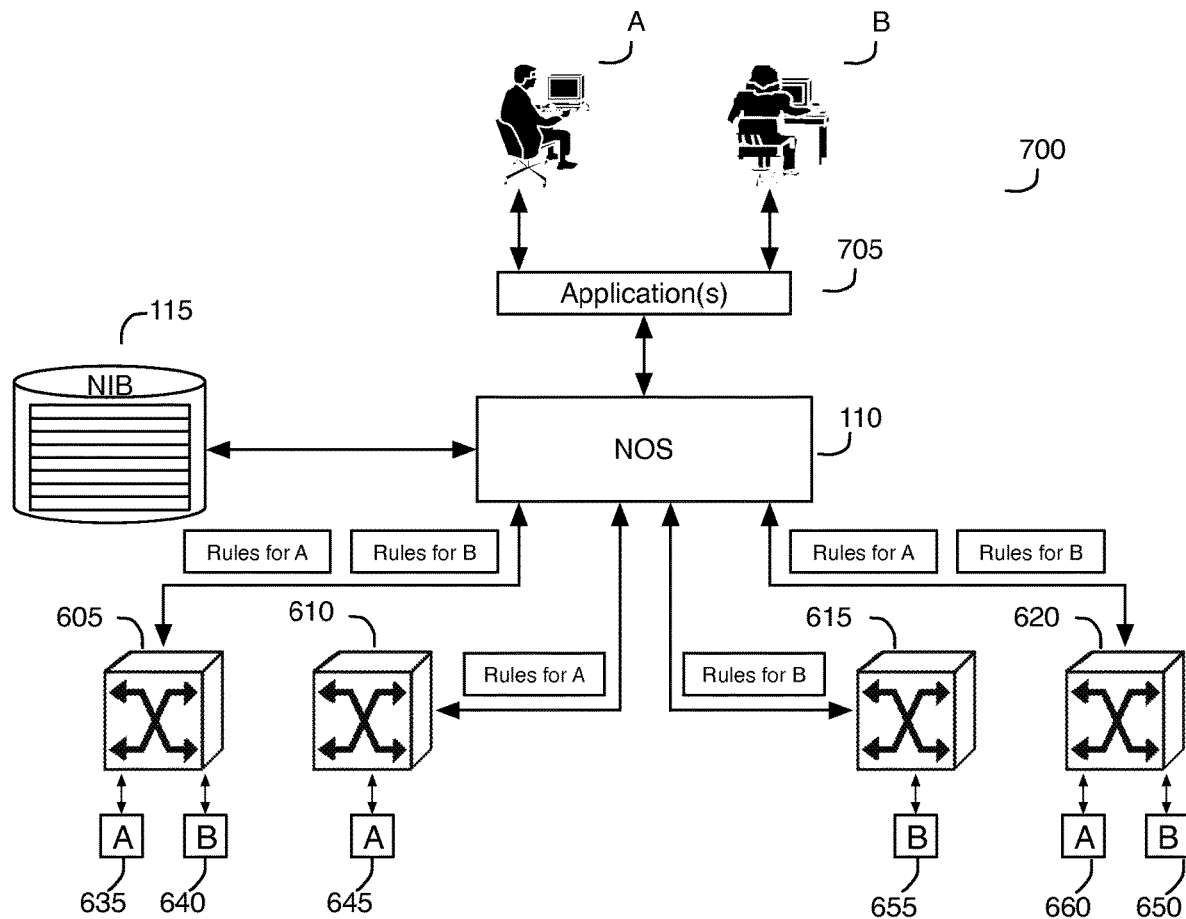
FIG. 7 illustrates a virtualized network control system that manages edge switches.

As mentioned above, the NIB in some embodiments stores data regarding each switching element within the network infrastructure of a system, while in other embodiments, the NIB stores state information about only switching elements at the edge of a network infrastructure. FIGS. 6 and 7 illustrate an example that differentiates the two differing approaches. Specifically, FIG. 6 illustrates the switch infrastructure of a multi-tenant server hosting system. In this system, six switching elements are employed to interconnect six computing devices of two users A and B. Four of these switches 605-620 are edge switches that have direct connections with the computing devices 635-660 of the users A and B, while two of the switches 625 and 630 are interior switches (i.e., non-edge switches) that interconnect the edge switches and connect to each other.

FIG. 7 illustrates a virtualized network control system 700 that manages the edge switches 605-620. As shown in this figure, the system 700 includes a NOS 110 that creates and maintains a NIB 115, which contains data records regarding only the four edge switching elements 605-620. In addition, the applications 705 running on top of the NOS 110 allow the users A and B to modify their switch element configurations for the edge switches that they use. The NOS then propagates these modifications if needed to the edge switching elements. Specifically, in this example, two edge switches 605 and 620 are used by computing devices of both users A and B, while edge switch 610 is only used by the computing device 645 of the user A and edge switch 615 is only used by the computing device 650 of the user B. Accordingly, FIG. 7 illustrates the NOS modifying users A and B records in switches 605 and 620, but only updating user A records in switch element 610 and user B records in switch element 615.

The system of some embodiments only controls edge switches (i.e., only maintains data in the NIB regarding edge switches) for several reasons. Controlling edge switches provides the system with a sufficient mechanism for maintaining isolation between computing devices, which is needed, as opposed to maintaining isolation between all switch elements, which is not needed. The interior switches forward between switching elements. The edge switches forward between computing devices and other network elements. Thus, the system can maintain user isolation simply by controlling the edge switch because the edge switch is the last switch in line to forward packets to a host.

Controlling only edge switches also allows the system to be deployed independent of concerns about the hardware vendor of the non-edge switches, because deploying at the edge allows the edge switches to treat the internal nodes of the network as simply a collection of elements that moves packets without considering the hardware makeup of these internal nodes. Also, controlling only edge switches makes distributing switching logic computationally easier. Controlling only edge switches also enables non-disruptive deployment of the system because edge-switching solutions can be added as top of rack switches without disrupting the configuration of the non-edge switches.

In addition to controlling edge switches, the network control system of some embodiments also utilizes and controls non-edge switches that are inserted in the switch network hierarchy to simplify and/or facilitate the operation of the controlled edge switches. For instance, in some embodiments, the control system requires the switches that it controls to be interconnected in a hierarchical switching architecture that has several edge switches as the leaf nodes in this switching architecture and one or more non-edge switches as the non-leaf nodes in this architecture. In some such embodiments, each edge switch connects to one or more of the non-leaf switches, and uses such non-leaf switches to facilitate its communication with other edge switches. Examples of functions that a non-leaf switch of some embodiments may provide to facilitate such communications between edge switch in some embodiments include (1) routing of a packet with an unknown destination address (e.g., unknown MAC address) to the non-leaf switch so that this switch can route this packet to the appropriate edge switch, (2) routing a multicast or broadcast packet to the non-leaf switch so that this switch can convert this packet to a series of unicast packets to the desired destinations, (3) bridging remote managed networks that are separated by one or more networks, and (4) bridging a managed network with an unmanaged network.

Some embodiments employ one level of non-leaf (non-edge) switches that connect to edge switches and in some cases to other non-leaf switches. Other embodiments, on the other hand, employ multiple levels of non-leaf switches, with each level of non-leaf switch after the first level serving as a mechanism to facilitate communication between lower level non-leaf switches and leaf switches. In some embodiments, the non-leaf switches are software switches that are implemented by storing the switching tables in the memory of a standalone computer instead of an off the shelf switch. In some embodiments, the standalone computer may also be executing in some cases a hypervisor and one or more virtual machines on top of that hypervisor. Irrespective of the manner by which the leaf and non-leaf switches are implemented, the NIB of the control system of some embodiments stores switching state information regarding the leaf and non-leaf switches.

The above discussion relates to the control of edge switches and non-edge switches by a network control system of some embodiments. In some embodiments, edge switches and non-edge switches (leaf and non-leaf nodes) may be referred to as managed switches. This is because these switches are managed by the network control system (as opposed to unmanaged switches, which are not managed by the network control system, in the network) in order to implement logical datapath sets through the managed switches.

D. Secondary Storage Structure

In addition to using the NIB to store switching-element data, the virtualized network-control system of some embodiments also stores other storage structures to store data regarding the switching elements of the network. These other storage structures are secondary storage structures that supplement the storage functions of the NIB, which is the primary storage structure of the system while the system operates. In some embodiments, the primary purpose for one or more of the secondary storage structures is to back up the data in the NIB. In these or other embodiments, one or more of the secondary storage structures serves a purpose other than backing up the data in the NIB (e.g., for storing data that are not in the NIB).

In some embodiments, the NIB is stored in system memory (e.g., RAM) while the system operates. This allows for the fast access of the NIB records. In some embodiments, one or more of the secondary storage structures, on the other hand, are stored on disk or other non-volatile memories that are slower to access. Such non-volatile disk or other storages, however, improve the resiliency of the system as they allow the data to be stored in a persistent manner.

Figure 8:
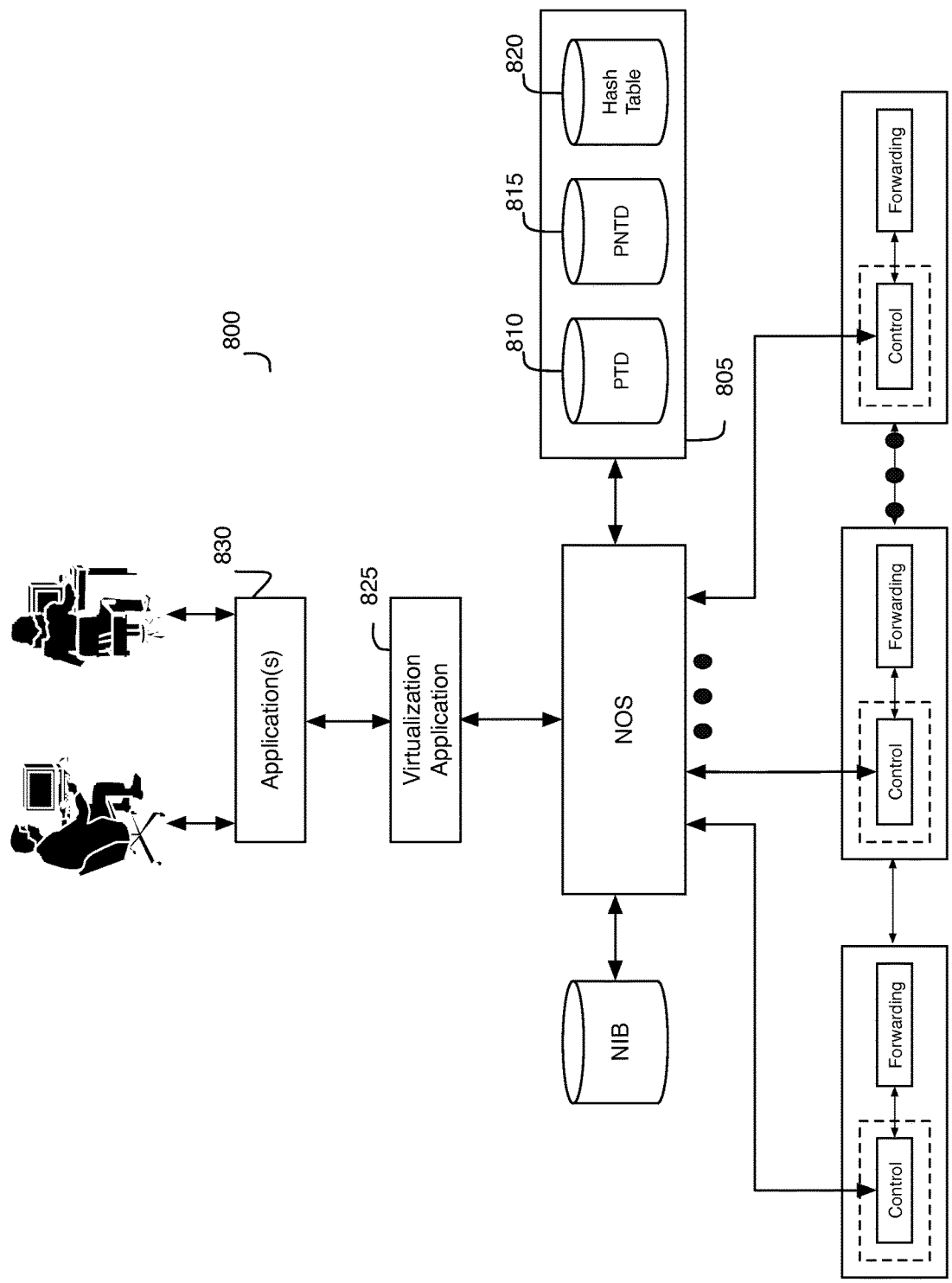
FIG. 8 illustrates an example of a virtualized system that employs secondary storage structures that supplement the NIB's storage operations.

FIG. 8 illustrates an example of a virtualized system 800 that employs secondary storage structures that supplement the NIB's storage operations. This system is similar to the systems 400 and 500 of FIGS. 4 and 5, except that it also includes secondary storage structures 805. In this example, these structures include a persistent transactional database (PTD) 810, a persistent non-transactional database (PNTD) 815, and a hash table 820. In some embodiments, these three types of secondary storage structures store different types of data, store data in different manners, and/or provide different query interfaces that handle different types of queries.

In some embodiments, the PTD 810 is a database that is stored on disk or other non-volatile memory. In some embodiments, the PTD is a commonly available database, such as MySQL or SQLite. The PTD of some embodiments can handle complex transactional queries. As a transactional database, the PTD can undo a series of prior query operations that it has performed as part of a transaction when one of the subsequent query operations of the transaction fails. Moreover, some embodiments define a transactional guard processing (TGP) layer before the PTD in order to allow the PTD to execute conditional sets of database transactions. The TGP layer allows the PTD to avoid unnecessary later database operations when conditions of earlier operations are not met.

The PTD in some embodiments stores the exact replica of the data that are stored in the NIB, while in other embodiments it stores only a subset of the data that are stored in the NIB. Some or all of the data in the NIB are stored in the PTD in order to ensure that the NIB data will not be lost in the event of a crash of the NOS or the NIB.

The PNTD 815 is another persistent database that is stored on disk or other non-volatile memory. Some embodiments use this database to store data (e.g., statistics, computations, etc.) regarding one or more switch element attributes or operations. For instance, this database is used in some embodiment to store the number of packets routed through a particular port of a particular switching element. Other examples of types of data stored in the database 815 include error messages, log files, warning messages, and billing data. Also, in some embodiments, the PNTD stores the results of operations performed by the application(s) 830 running on top of the NOS, while the PTD and hash table store only values generated by the NOS.

The PNTD in some embodiments has a database query manager that can process database queries, but as it is not a transactional database, this query manager cannot handle complex conditional transactional queries. In some embodiments, accesses to the PNTD are faster than accesses to the PTD but slower than accesses to the hash table 820.

Unlike the databases 810 and 815, the hash table 820 is not a database that is stored on disk or other non-volatile memory. Instead, it is a storage structure that is stored in volatile system memory (e.g., RAM). It uses hashing techniques that use hashed indices to quickly identify records that are stored in the table. This structure combined with the hash table's placement in the system memory allows this table to be accessed very quickly. To facilitate this quick access, a simplified query interface is used in some embodiments. For instance, in some embodiments, the hash table has just two queries: a Put query for writing values to the table and a Get query for retrieving values from the table. Some embodiments use the hash table to store data that change quickly. Examples of such quick-changing data include network entity status, statistics, state, uptime, link arrangement, and packet handling information. Furthermore, in some embodiments, the NOS uses the hash tables as a cache to store information that is repeatedly queried for, such as flow entries that will be written to multiple nodes. Some embodiments employ a hash structure in the NIB in order to quickly access records in the NIB. Accordingly, in some of these embodiments, the hash table 820 is part of the NIB data structure.

The PTD and the PNTD improve the resiliency of the NOS system by preserving network data on hard disks. If a NOS system fails, network configuration data will be preserved on disk in the PTD and log file information will be preserved on disk in the PNTD.

E. Multi-Instance Control System

Using a single NOS instance to control a network can lead to scaling and reliability issues. As the number of network elements increases, the processing power and/or memory capacity that are required by those elements will saturate a single node. Some embodiments further improve the resiliency of the control system by having multiple instances of NOS running on one or more computers, with each instance of NOS containing one or more of the secondary storage structures described above. The control applications in some embodiments partition the workload between the different instances in order to reduce each instance's workload. Also, in some embodiments, the multiple instances of NOS communicate the information stored in their storage layers to enable each instance of NOS to cover for the others in the event of a NOS instance failing.

Figure 9:
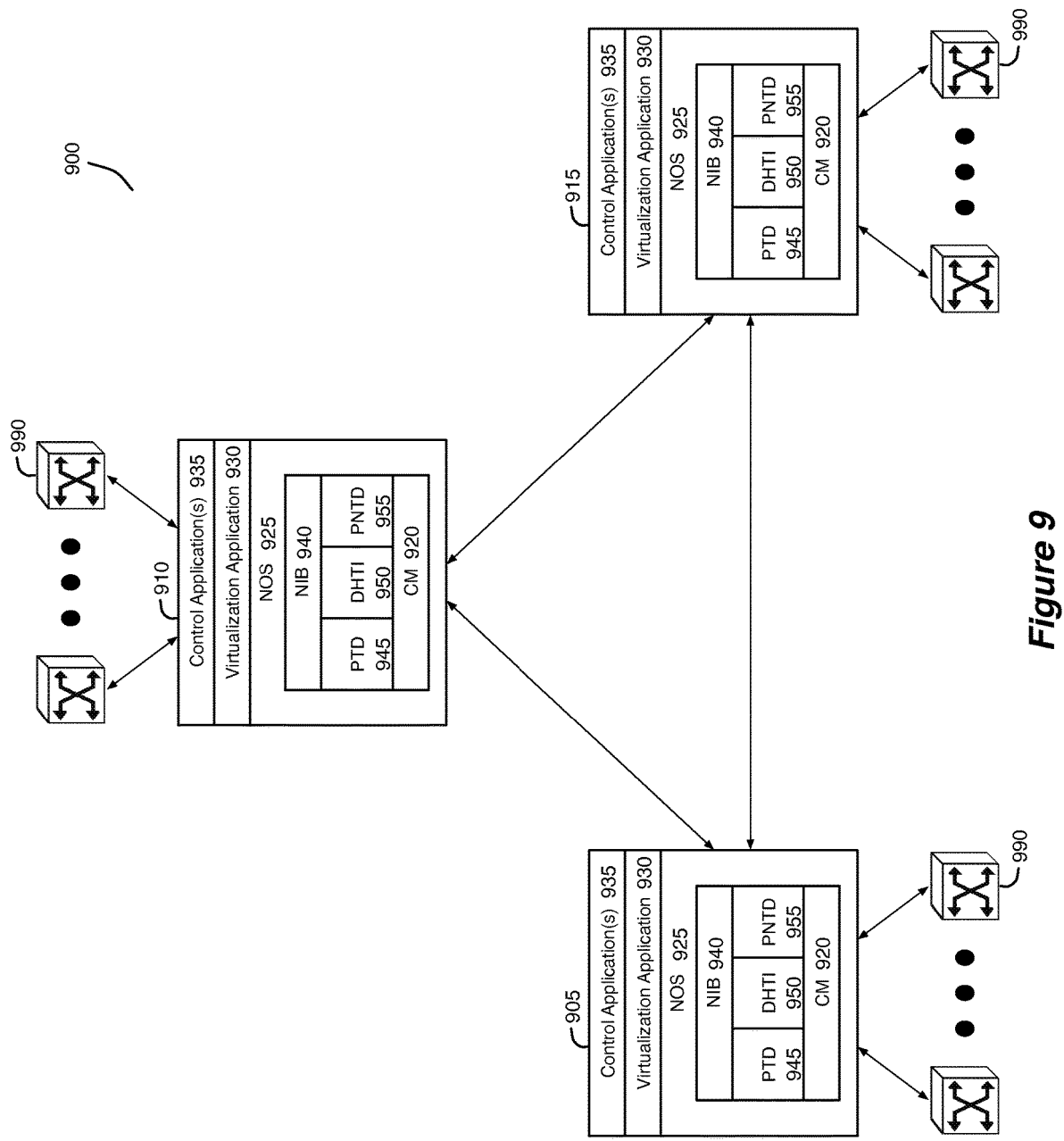
FIG. 9 illustrates a multi-instance, distributed network control system of some embodiments.

FIG. 9 illustrates a multi-instance, distributed network control system 900 of some embodiments. This distributed system controls multiple switching elements 990 with three instances 905, 910, and 915. In some embodiments, the distributed system 900 allows different controller instances to control the operations of the same switch or of different switches.

As shown in FIG. 9, each instance includes a NOS 925, a virtualization application 930, one or more control applications 935, and a coordination manager (CM) 920. For the embodiments illustrated in this figure, each NOS in the system 900 is shown to include a NIB 940 and three secondary storage structures, i.e., a PTD 945, a distributed hash table (DHT) instance 950, and a persistent non-transaction database (PNTD) 955. Other embodiments may not tightly couple the NIB and/or each of the secondary storage structures within the NOS. Also, other embodiments might not include each of the three secondary storage structures (i.e., the PTD, DHT instance, and PNTD) in each instance 905, 910, or 915. For example, one NOS instance 905 may have all three data structures whereas another NOS instance may only have the DHT instance.

In some embodiments, the system 900 maintains the same switch element data records in the NIB of each instance, while in other embodiments, the system 900 allows NIBs of different instances to store different sets of switch element data records. FIGS. 10-12 illustrate three different approaches that different embodiments employ to maintain the NIB records. In each of these three examples, two instances 1005 and 1010 are used to manage several switching elements having numerous attributes that are stored collectively in the NIB instances. This collection of the switch element data in the NIB instances is referred to as the global NIB data structure 1015 in FIGS. 10-12.

FIG. 10 illustrates the approach of maintaining the entire global NIB data structure 1015 in each NOS instance 1005 and 1010. FIG. 11 illustrates an alternative approach of dividing the global NIB 1015 into two separate portions 1020 and 1025, and storing each of these portions in a different NOS instance. FIG. 12 illustrates yet another alternative approach. In this example, the global NIB 1015 is divided into two separate, but overlapping portions 1030 and 1035, which are then stored separately by the two different instances (with instance 1005 storing portion 1030 and instance 1010 storing portion 1035). In the systems of some embodiments that store different portions of the NIB in different instances, one controller instance is allowed to query another controller instance to obtain a NIB record. Other systems of such embodiments, however, do not allow one controller instance to query another controller instance for a portion of the NIB data that is not maintained by the controller itself. Still others allow such queries to be made, but allow restrictions to be specified that would restrict access to some or all portions of the NIB.

The system 900 of some embodiments also replicates each NIB record in each instance in the PTD 945 of that instance in order to maintain the records of the NIB in a persistent manner. Also, in some embodiments, the system 900 replicates each NIB record in the PTDs of all the controller instances 905, 910, or 915, in order to protect against failures of individual controller instances (e.g., of an entire controller instance or a portion of the controller instance). Other embodiments, however, do not replicate each NIB record in each PTD and/or do not replicate the PTD records across all the PTDs. For instance, some embodiments only replicate only a part but not all of the NIB data records of one controller instance in the PTD storage layer of that controller instance, and then replicate only this replicated portion of the NIB in all of the NIBs and PTDs of all other controller instances. Some embodiments also store a subset of the NIB records in another one of the secondary storage records, such as the DHT instance 950.

In some embodiments, the DHT instances (DHTI) 950 of all controller instances collectively store one set of records that are indexed based on hashed indices for quick access. These records are distributed across the different controller instances to minimize the size of the records within each instance and to allow the size of the DHT to be increased by adding additional DHT instances. According to this scheme, one DHT record is not stored in each controller instance. In fact, in some embodiments, each DHT record is stored in at most one controller instance. To improve the system's resiliency, some embodiments, however, allow one DHT record to be stored in more than one controller instance, so that in case one DHT record is no longer accessible because of one instance failure, that DHT record can be accessed from another instance. Some embodiments store in the DHT only the type of data that can be quickly re-generated, and therefore do not allow for replication of records across different DHT instances or allow only a small amount of such records to be replicated.

The PNTD 955 is another distributed data structure of the system 900 of some embodiments. For example, in some embodiments, each instance's PNTD stores the records generated by the NOS 925 or applications 930 or 935 of that instance or another instance. Each instance's PNTD records can be locally accessed or remotely accessed by other controller instances whenever the controller instances need these records. This distributed nature of the PNTD allows the PNTD to be scalable as additional controller instances are added to the control system 900. In other words, addition of other controller instances increases the overall size of the PNTD storage layer.

The PNTD in some embodiments is replicated partially across different instances. In other embodiments, the PNTD is replicated fully across different instances. Also, in some embodiments, the PNTD 955 within each instance is accessible only by the application(s) that run on top of the NOS of that instance. In other embodiments, the NOS can also access (e.g., read and/or write) to the PNTD 955. In yet other embodiments, the PNTD 955 of one instance is only accessible by the NOS of that instance.

By allowing different NOS instances to store the same or overlapping NIB records, and/or secondary storage structure records, the system improves its overall resiliency by guarding against the loss of data due to the failure of any NOS or secondary storage structure instance. In some embodiments, each of the three storages of the secondary storage layer uses a different distribution technique to improve the resiliency of a multiple NOS instance system. For instance, as mentioned above, the system 900 of some embodiments replicates the PTD across NOS instances so that every NOS has a full copy of the PTD to enable a failed NOS instance to quickly reload its PTD from another instance. In some embodiments, the system 900 distributes the PNTD with overlapping distributions of data across the NOS instances to reduce the damage of a failure. The system 900 in some embodiments also distributes the DHT fully or with minimal overlap across multiple controller instances in order to maintain the DHT instance within each instance small and to allow the size of the DHT to be increased by adding additional DHT instances.

For some or all of the communications between the distributed instances, the system 900 uses the CMs 920. The CM 920 in each instance allows the instance to coordinate certain activities with the other instances. Different embodiments use the CM to coordinate the different sets of activities between the instances. Examples of such activities include writing to the NIB, writing to the PTD, writing to the DHT, controlling the switching elements, facilitating intra-controller communication related to fault tolerance of controller instances, etc.

As mentioned above, different controller instances of the system 900 can control the operations of the same switching elements or of different switching elements. By distributing the control of these operations over several instances, the system can more easily scale up to handle additional switching elements. Specifically, the system can distribute the management of different switching elements and/or different portions of the NIB to different NOS instances in order to enjoy the benefit of processing efficiencies that can be realized by using multiple NOS instances. In such a distributed system, each NOS instance can have a reduced number switches or reduce portion of the NIB under management, thereby reducing the number of computations each controller needs to perform to distribute flow entries across the switches and/or to manage the NIB. In other embodiments, the use of multiple NOS instances enables the creation of a scale-out network management system. The computation of how best to distribute network flow tables in large networks is a CPU intensive task. By splitting the processing over NOS instances, the system 900 can use a set of more numerous but less powerful computer systems to create a scale-out network management system capable of handling large networks.

As noted above, some embodiments use multiple NOS instance in order to scale a network control system. Different embodiments may utilize different methods to improve the scalability of a network control system. Three example of such methods include (1) partitioning, (2) aggregation, and (3) consistency and durability. For a first method, the network control system of some embodiments configures the NOS instances so that a particular controller instance maintains only a subset of the NIB in memory and up-to-date. Further, in some of these embodiments, a particular NOS instance has connections to only a subset of the network elements, and subsequently, can have less network events to process.

A second method for improving scalability of a network control system is referred to as aggregation. In some embodiments, aggregation involves the controller instances grouping NOS instances together into sets. All the NOS instances within a set have complete access to the NIB entities representing network entities connected to those NOS instances. The set of NOS instances then exports aggregated information about its subset of the NIB to other NOS instances (which are not included in the set of NOS instances)

Consistency and durability is a third method for improving scalability of a network control system. For this method, the controller instances of some embodiments are able to dictate the consistency requirements for the network state that they manage. In some embodiments, distributed locking and consistency algorithms are implemented for network state that requires strong consistency, and conflict detection and resolution algorithms are implemented for network state that does not require strong consistency (e.g., network state that is not guaranteed to be consistent). As mentioned above, the NOS of some embodiments provides two data stores that an application can use for network state with differing preferences for durability and consistency. The NOS of some embodiments provides a replicated transactional database for network state that favors durability and strong consistency, and provides a memory-based one-hop DHT for volatile network state that can sustain inconsistencies.

In some embodiments, the above methods for improving scalability can be used alone or in combination. They can also be used to manage networks too large to be controlled by a single NOS instance. These methods are described in further detail in U.S. Patent Application entitled "A Distributed Control Platform for Large-scale Production Networks," filed Jul. 6, 2011, with application Ser. No. 13/177, 538.

To distribute the workload and to avoid conflicting operations from different controller instances, the system 900 of some embodiments designates one controller instance (e.g., 905) within the system 900 as the master of any particular NIB portion and/or any given switching element (e.g., 990c). Even with one master controller, different controller instance (e.g., 910 and 915) can request changes to different NIB portions and/or to different switching elements (e.g., 990c) controlled by the master (e.g., 905). If allowed, the master instance then effectuates this change and writes to the desired NIB portion and/or switching element. Otherwise, the master rejects the request.

Figure 13:
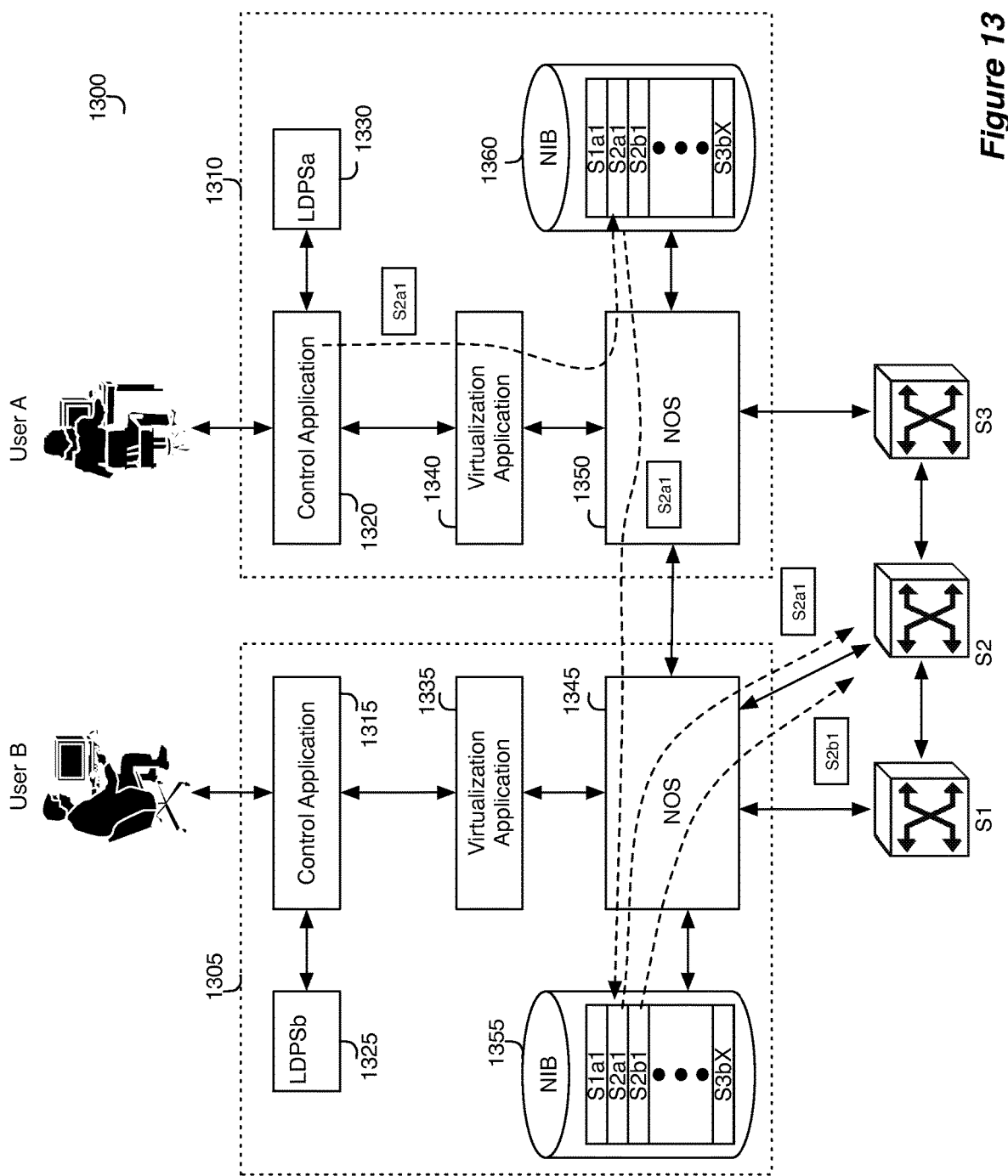
FIG. 13 illustrates an example of specifying a master controller instance for a switch in a distributed system.

FIG. 13 illustrates an example of specifying a master controller instance for a switch in a distributed system 1300 that is similar to the system 900 of FIG. 9. In this example, two controllers 1305 and 1310 control three switching elements 51, S2 and S3, for two different users A and B. Through two control applications 1315 and 1320, the two users specify two different sets of logical datapaths 1325 and 1330, which are translated into numerous records that are identically stored in two NIBs 1355 and 1360 of the two controller instances 1305 and 1310 by NOS instances 1345 and 1350 of the controllers.

In the example illustrated in FIG. 13, both control applications 1315 and 1320 of both controllers 1305 and 1310 can modify records of the switching element S2 for both users A and B, but only controller 1305 is the master of this switching element. This example illustrates two cases. The first case involves the controller 1305 updating the record S2$b1$ in switching element S2 for the user B. The second case involves the controller 1305 updating the records S2$a1$ in switching element S2 after the control application 1320 updates a NIB record S2$a1$ for switching element S2 and user A in NIB 1360. In the example illustrated in FIG. 13, this update is routed from NIB 1360 of the controller 1310 to the NIB 1355 of the controller 1305, and then subsequently routed to switching element S2.

Different embodiments use different techniques to propagate changes to the NIB 1360 of controller instance 1310 to NIB 1355 of the controller instance 1305. For instance, to propagate changes, the system 1300 in some embodiments uses the secondary storage structures (not shown) of the controller instances 1305 and 1310. More generally, the distributed control system of some embodiments uses the secondary storage structures as communication channels between the different controller instances. Because of the differing properties of the secondary storage structures, these structures provide the controller instances with different mechanisms for communicating with each other. For instance, in some embodiments, different DHT instances can be different, and each DHT instance is used as a bulletin board for one or more instances to store data so that they or other instances can retrieve this data later. In some of these embodiments, the PTDs are replicated across all instances, and some or all of the NIB changes are pushed from one controller instance to another through the PTD storage layer. Accordingly, in the example illustrated in FIG. 13, the change to the NIB 1360 could be replicated to the PTD of the controller 1310, and from there it could be replicated in the PTD of the controller 1305 and the NIB 1355.

Instead of propagating the NIB changes through the secondary storages, the system 1300 uses other techniques to change the record S2*a*1 in the switch S2 in response to the request from control application 1320. For instance, to propagate this update, the NOS 1350 of the controller 1310 in some embodiments sends an update command to the NOS 1345 of the controller 1305 (with the requisite NIB update parameters that identify the record and one or more new values for the record) to direct the NOS 1345 to modify the record in the NIB 1355 or in the switch S2. In response, the NOS 1345 would make the changes to the NIB 1355 and the switch S2 (if such a change is allowed). After this change, the controller instance 1310 would change the corresponding record in its NIB 1360 once it receives notification (from controller 1305 or from another notification mechanism) that the record in the NIB 1355 and/or switch S2 has changed.

Other variations to the sequence of operations shown in FIG. 13 could exist because some embodiments designate one controller instance as a master of a portion of the NIB, in addition to designating a controller instance as a master of a switching element. In some embodiments, different controller instances can be masters of a switch and a corresponding record for that switch in the NIB, while other embodiments require the controller instance to be master of the switch and all records for that switch in the NIB.

In the embodiments where the system 1300 allows for the designation of masters for switching elements and NIB records, the example illustrated in FIG. 13 illustrates a case where the controller instance 1310 is the master of the NIB record S2*a*1, while the controller instance 1305 is the master for the switch S2. If a controller instance other than the controller instance 1305 and 1310 was the master of the NIB record S2*a*1, then the request for the NIB record modification from the control application 1320 would have to be propagated to this other controller instance. This other controller instance would then modify the NIB record and this modification would then cause the NIB 1355, the NIB 1360 and the switch S2 to update their records once the controller instances 1305 and 1310 are notified of this modification through any number of mechanisms that would propagate this modification to the controller instances 1305 and 1310.

In other embodiments, the controller instance 1305 might be the master of the NIB record S2*a*1, or the controller instance might be the master of switch S2 and all the records for this NIB. In these embodiments, the request for the NIB record modification from the control application 1320 would have to be propagated the controller instance 1305, which would then modify the records in the NIB 1355 and the switch S2. Once this modification is made, the NIB 1360 would modify its record S2*a*1 once the controller instance 1310 is notified of this modification through any number of mechanisms that would propagate this modification to the controller instance 1310.

As mentioned above, different embodiments employ different techniques to facilitate communication between different controller instances. In addition, different embodiments implement the controller instances differently. For instance, in some embodiments, the stack of the control application(s) (e.g., 935 or 1315 in FIGS. 9 and 13), the virtualization application (e.g., 930 or 1335), and the NOS (e.g., 925 or 1345) is installed and runs on a single computer. Also, in some embodiments, multiple controller instances can be installed and run in parallel on a single computer. In some embodiments, a controller instance can also have its stack of components divided amongst several computers. For example, within one instance, the control application (e.g., 935 or 1315) can be on a first physical or virtual computer, the virtualization application (e.g., 930 or 1335) can be on a second physical or virtual computer, and the NOS (e.g., 925 or 1350) can be on a third physical or virtual computer.

Figure 14:
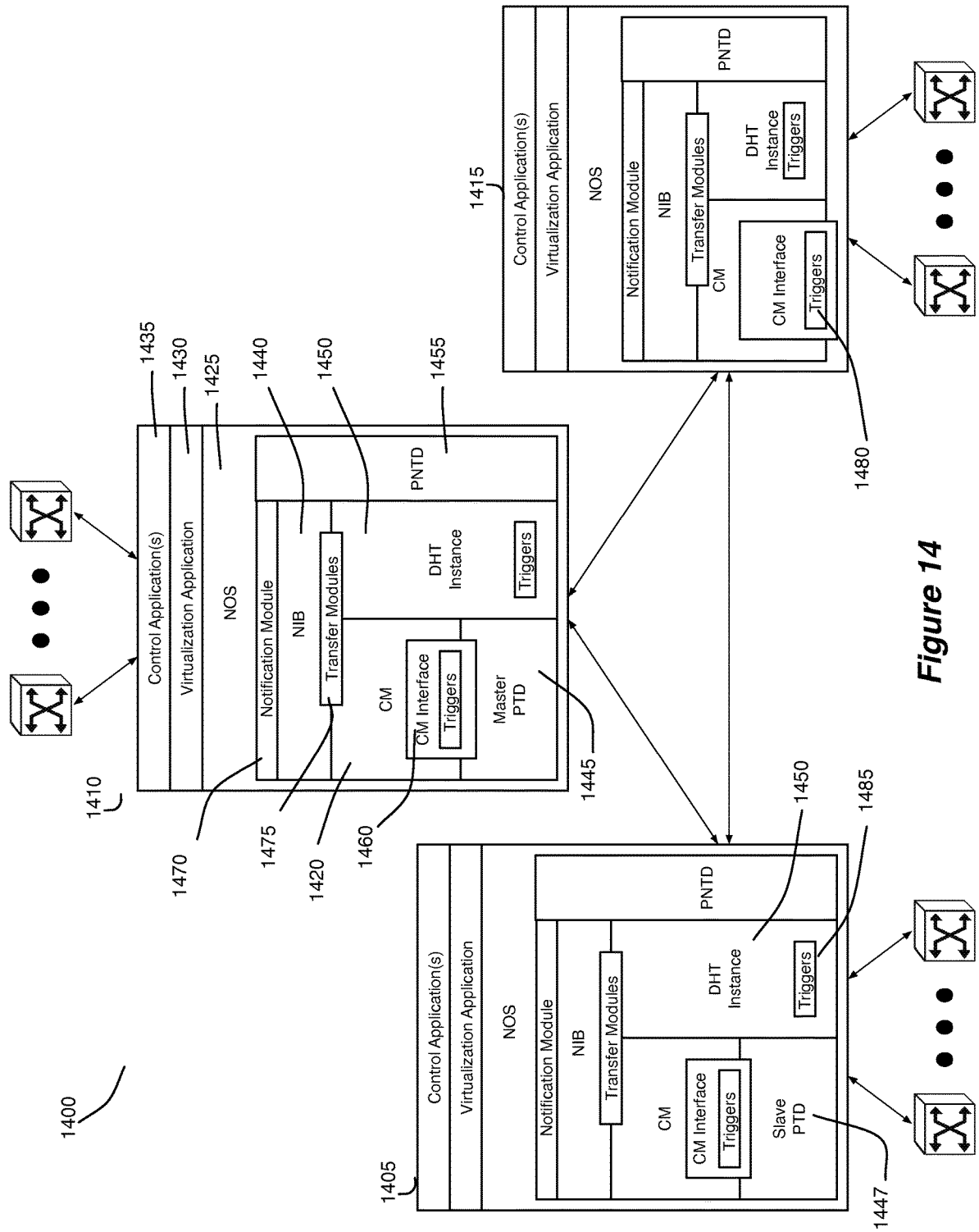
FIG. 14 illustrates a particular distributed network control system of some embodiments of the invention.

FIG. 14 illustrates a particular distributed network control system 1400 of some embodiments of the invention. In several manners, this control system 1400 is similar to the control system 900 of FIG. 9. For instance, it uses several different controller instances to control the operations of the same switching elements or of different switching elements. In the example illustrated in FIG. 14, three instances 1405, 1410 and 1415 are illustrated. However, one of ordinary skill in the art will understand that the control system 1400 can have any number of controller instances.

Also, like the control system 900, each controller instance includes a NOS 1425, a virtualization application 1430, one or more control applications 1435, and a coordination manager (CM) 1420. Each NOS in the system 1400 includes a NIB 1440 and at least two secondary storage structures, e.g., a distributed hash table (DHT) 1450 and a PNTD 1455.

However, as illustrated in FIG. 14, the control system 1400 has several additional and/or different features than the control system 900. These features include a NIB notification module 1470, NIB transfer modules 1475, a CM interface 1460, PTD triggers 1480, DHT triggers 1485, and master/slave PTDs 1445/1447.

In some embodiments, the notification module 1470 in each controller instance allows applications (e.g., a control application) that run on top of the NOS to register for callbacks when changes occur within the NIB. This module in some embodiments has two components, which include a notification processor and a notification registry. The notification registry stores the list of applications that need to be notified for each NIB record that the module 1470 tracks, while the notification processor reviews the registry and processes the notifications upon detecting a change in a NIB record that it tracks. The notification module as well as its notification registry and notification processor are a conceptual representation of the NIB-application layer notification components of some embodiments, as the system of these embodiments provides a separate notification function and registry within each NIB object that can be tracked by the application layer.

The transfer modules 1475 include one or more modules that allow data to be exchanged between the NIB 1440 on one hand, and the PTD or DHT storage layers in each controller instance on the other hand. In some embodiments, the transfer modules 1475 include an import module for importing changes from the PTD/DHT storage layers into the NIB, and an export module for exporting changes in the NIB to the PTD/DHT storage layers.

Unlike the control system 900 that has the same type of PTD in each instance, the control system 1400 only has PTDs in some of the NOS instances, and of these PTDs, one of them serves as master PTD 1445, while the rest serve as slave PTDs 1447. In some embodiments, NIB changes within a controller instance that has a slave PTD are first propagated to the master PTD 1445, which then direct the controller instance's slave PTD to record the NIB change. The master PTD 1445 similarly receives NIB changes from controller instances that do not have either master or slave PTDs.

In the control system 1400, the coordination manager 1420 includes the CM interface 1460 to facilitate communication between the NIB storage layer and the PTD storage layer. The CM interface also maintains the PTD trigger list 1480, which identifies the modules of the system 1400 to callback whenever the CM interface 1460 is notified of a PTD record change. A similar trigger list 1485 for handling DHT callbacks is maintained by the DHT instance 1450. The CM 1420 also has a DHT range identifier (not shown) that allows the DHT instances of different controller instances to store different DHT records in different DHT instances.

Also, in the control system 1400, the PNTD is not placed underneath the NIB storage layer. This placement is to signify that the PNTD in the control system 1400 does not exchange data directly with the NIB storage layer, but rather is accessible solely by the application(s) (e.g., the control application) running on top of the NOS 1425 as well as other applications of other controller instances. This placement is in contrast to the placement of the PTD storage layer 1445/1447 and DHT storage layers 1450, which are shown to be underneath the NIB storage layer because the PTD and DHT are not directly accessible by the application(s) running on top of the NOS 1425. Rather, in the control system 1400, data are exchanged between the NIB storage layer and the PTD/DHT storage layers of the same or different instances.

The control system 1400 uses the PTD, DHT and PNTD storage layers to facilitate communication between the different controller instances. In some embodiments, each of the three storages of the secondary storage layer uses a different storage and distribution technique to improve the resiliency of the distributed, multi-instance system 1400. For instance, the system 1400 of some embodiments replicates the PTD across NOS instances so that every NOS has a full copy of the PTD to enable a failed NOS instance to quickly reload its PTD from another instance. On the other hand, the system 1400 in some embodiments distributes the PNTD with partial overlapping distributions of data across the NOS instances to reduce the damage of a failure. Similarly, the system 1400 in some embodiments distributes the DHT fully or with minimal overlap across multiple controller instances in order to maintain the DHT instance within each instance small. Also, using this approach, allows the system to increase the size of the DHT by adding additional DHT instances in order to make the system more scalable.

One of the advantages of this system is that it can be configured in any number of ways. In some embodiments, this system provides great flexibility to specify the configurations for the components of the system in order to customize its storage and data distribution scheme to achieve the best tradeoff of scalability and speed on one hand, and reliability and consistency on the other hand. Attributes of the storage structures that affect scalability, speed, reliability and consistency considerations include the speed of the storage (e.g., RAM versus disk access speed), the reliability of the storage (e.g., persistent non-volatile storage of disk versus volatile storage of RAM), the query interface of the storage (e.g., simple Put/Get query interface of DHT versus more robust transactional database queries of PTD in some embodiments), and the number of points of failures in the system (e.g., a single point of failure for a DHT record versus multiple points of failure for a PTD record in some embodiments).

Through the configurations of its components, the system can be configured (1) on how to distribute the data records between the NIB and the secondary storage structures within one instance (e.g., which secondary storage should store which NIB record), (2) on how to distribute the data records between the NIBs of different instances (e.g., which NIB records should be replicated across different controller instances), (3) on how to distribute the data records between the secondary storage structures within one instance (e.g., which secondary storage records contain which records), (4) on how to distribute the data records between the secondary storage structures of different instances (e.g., which secondary storage records are replicated across different controller instances), (5) on how to distribute secondary storage instances across controller instances (e.g., whether to put a PTD, a DHT, or a Stats database instances within each controller or whether to put different subset of these storages within different instances), and (6) on how to replicate data records in the distributed secondary storage structures (e.g., whether to replicated PTD fully across all instances, whether to replicate some or all DHT records across more than one instance, etc.). The system also allows the coordination between the different controller instances as to the master control over different switching elements or different portions of the NIB to be configured differently. In some embodiments, some or all of these configurations can be specified by applications (e.g., a control application or a virtualization application) that run on top of the NOS.

In some embodiments, as noted above, the CMs facilitate intra-controller communication related to fault tolerance of controller instances. For instance, the CMs implement the intra-controller communication through the secondary storage layers described above. A controller instance in the control system may fail due to any number of reasons. (e.g., hardware failure, software failure, network failure, etc.). Different embodiments may use different techniques for determining whether a controller instance has failed. In some embodiments, Paxos protocol is used to determine whether a controller instance in the control system has failed. While some of these embodiments may use Apache Zookeeper to implement the Paxos protocols, other of these embodiments may implement Paxos protocol in other ways.

Some embodiments of the CM 1420 may utilize defined timeouts to determine whether a controller instance has failed. For instance, if a CM of a controller instance does not respond to a communication (e.g., sent from another CM of another controller instance in the control system) within an amount of time (i.e., a defined timeout amount), the non-responsive controller instance is determined to have failed. Other techniques may be utilized to determine whether a controller instance has failed in other embodiments.

When a master controller instance fails, a new master for the logical datapath sets and the switching elements needs to be determined. Some embodiments of the CM 1420 make such determination by performing a master election process that elects a master controller instance (e.g., for partitioning management of logical datapath sets and/or partitioning management of switching elements). The CM 1420 of some embodiments may perform a master election process for electing a new master controller instance for both the logical datapath sets and the switching elements of which the failed controller instance was a master. However, the CM 1420 of other embodiments may perform (1) a master election process for electing a new master controller instance for the logical datapath sets of which the failed controller instance was a master and (2) another master election process for electing a new master controller instance for the switching elements of which the failed controller instance was a master. In these cases, the CM 1420 may determine two different controller instances as new controller instances: one for the logical datapath sets of which the failed controller instance was a master and another for the switching elements of which the failed controller instance was a master.

In some embodiments, the master election process is further for partitioning management of logical datapath sets and/or management of switching elements when a controller instance is added to the control system. In particular, some embodiments of the CM 1420 perform the master election process when the control system 1400 detects a change in membership of the controller instances in the control system 1400. For instance, the CM 1420 may perform the master election process to redistribute a portion of the management of the logical datapath sets and/or the management of the switching elements from the existing controller instances to the new controller instance when the control system 1400 detects that a new network controller has been added to the control system 1400. However, in other embodiments, redistribution of a portion of the management of the logical datapath sets and/or the management of the switching elements from the existing controller instances to the new controller instance does not occur when the control system 1400 detects that a new network controller has been added to the control system 1400. Instead, the control system 1400 in these embodiments assigns unassigned logical datapath sets and/or switching elements in these embodiments (e.g., new logical datapath sets and/or switching elements or logical datapath sets and/or switching elements from a failed network controller) to the new controller instance when the control system 1400 detects the unassigned logical datapath sets and/or switching elements have been added.

II. Single NOS Instance

Figure 15:
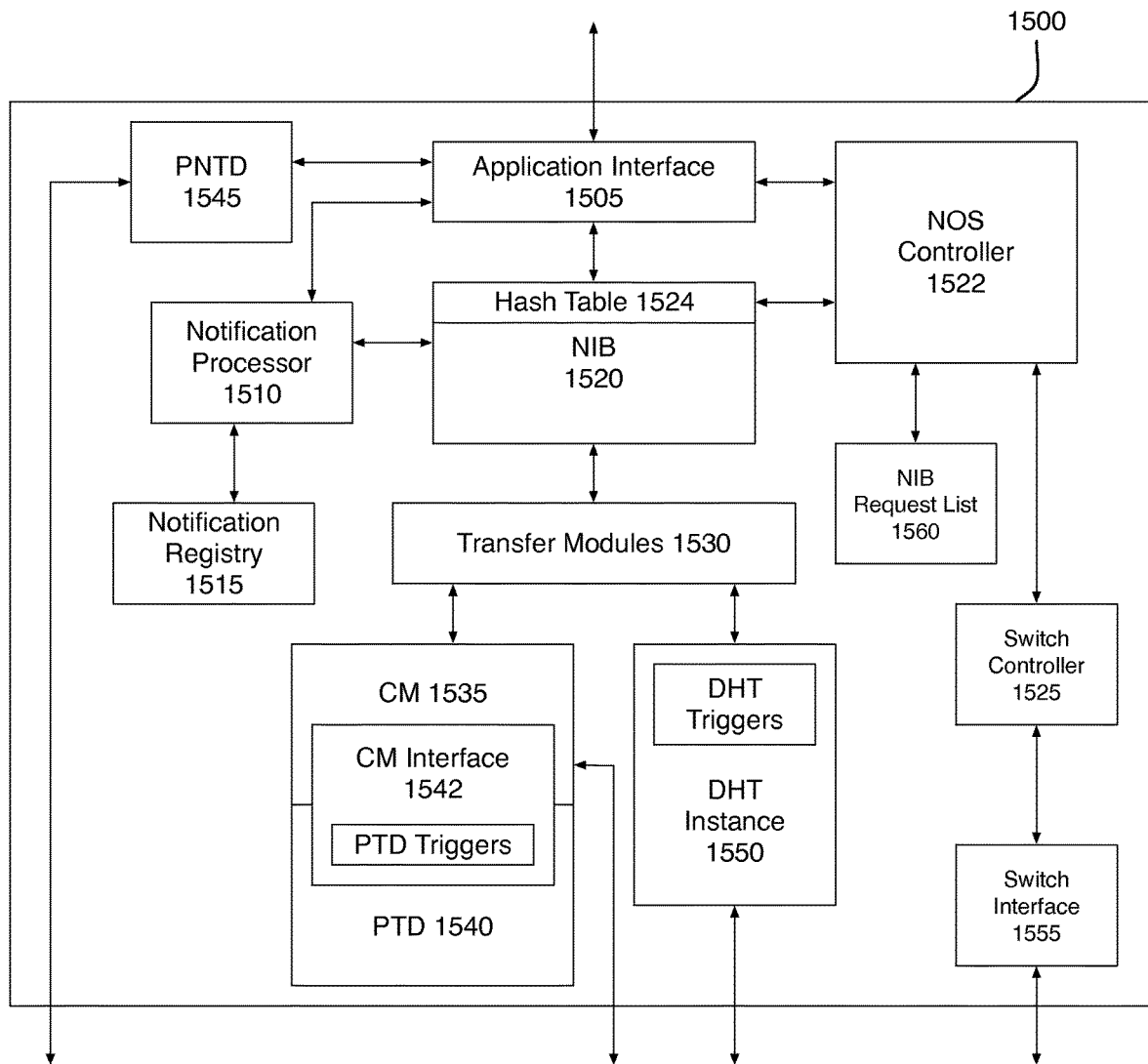
FIG. 15 conceptually illustrates a single NOS instance of some embodiments.

FIG. 15 conceptually illustrates a single NOS instance 1500 of some embodiments. This instance can be used as a single NOS instance in the distributed control system 1400 that employs multiple NOS instances in multiple controller instances. Alternatively, with slight modifications, this instance can be used as a single NOS instance in a centralized control system that utilizes only a single controller instance with a single NOS instance. The NOS instance 1500 supports a wide range of control scenarios. For instance, in some embodiments, this instance allows an application running on top of it (e.g., a control or virtualization application) to customize the NIB data model and have control over the placement and consistency of each element of the network infrastructure.

Also, in some embodiments, the NOS instance 1500 provides multiple methods for applications to gain access to network entities. For instance, in some embodiments, it maintains an index of all of its entities based on the entity identifier, allowing for direct querying of a specific entity. The NOS instance of some embodiments also supports registration for notifications on state changes or the addition/deletion of an entity. In some embodiments, the applications may further extend the querying capabilities by listening for notifications of entity arrival and maintaining their own indices. In some embodiments, the control for a typical application is fairly straightforward. It can register to be notified on some state change (e.g., the addition of new switches and ports), and once notified, it can manipulate the network state by modifying the NIB data tuple(s) (e.g., key-value pairs) of the affected entities.

As shown in FIG. 15, the NOS 1500 includes an application interface 1505, a notification processor 1510, a notification registry 1515, a NIB 1520, a hash table 1524, a NOS controller 1522, a switch controller 1525, transfer modules 1530, a CM 1535, a PTD 1540, a CM interface 1542, a PNTD 1545, a DHT instance 1550, switch interface 1555, and NIB request list 1560.

The application interface 1505 is a conceptual illustration of the interface between the NOS and the applications (e.g., control and virtualization applications) that can run on top of the NOS. The interface 1505 includes the NOS APIs that the applications (e.g., control or virtualization application) running on top of the NOS use to communicate with the NOS. In some embodiments, these communications include registrations for receiving notifications of certain changes in the NIB 1520, queries to read certain NIB attributes, queries to write to certain NIB attributes, requests to create or destroy NIB entities, instructions for configuring the NOS instance (e.g., instructions regarding how to import or export state), requests to import or export entities on demand, and requests to synchronize NIB entities with switching elements or other NOS instances.

The switch interface 1555 is a conceptual illustration of the interface between the NOS and the switching elements that run below the NOS instance 1500. In some embodiments, the NOS accesses the switching elements by using the OpenFlow or OVS APIs provided by the switching elements. Accordingly, in some embodiments, the switch interface 1555 includes the set of APIs provided by the OpenFlow and/or OVS protocols.

The NIB 1520 is the data storage structure that stores data regarding the switching elements that the NOS instance 1500 is controlling. In some embodiments, the NIB just stores data attributes regarding these switching elements, while in other embodiments, the NIB also stores data attributes for the logical datapath sets defined by the user. Also, in some embodiments, the NIB is a hierarchical object data structure (such as the ones described above) in which some or all of the NIB objects not only include data attributes (e.g., data tuples regarding the switching elements) but also include functions to perform certain functionalities of the NIB. For these embodiments, one or more of the NOS functionalities that are shown in modular form in FIG. 15 are conceptual representations of the functions performed by the NIB objects.

The hash table 1524 is a table that stores a hash value for each NIB object and a reference to each NIB object. Specifically, each time an object is created in the NIB, the object's identifier is hashed to generate a hash value, and this hash value is stored in the hash table along with a reference (e.g., a pointer) to the object. The hash table 1524 is used to quickly access an object in the NIB each time a data attribute or function of the object is requested (e.g., by an application or secondary storage). Upon receiving such requests, the NIB hashes the identifier of the requested object to generate a hash value, and then uses that hash value to quickly identify in the hash table a reference to the object in the NIB. In some cases, a request for a NIB object might not provide the identity of the NIB object but instead might be based on non-entity name keys (e.g., might be a request for all entities that have a particular port). For these cases, the NIB includes an iterator that iterates through all entities looking for the key specified in the request.

The notification processor 1510 interacts with the application interface 1505 to receive NIB notification registrations from applications running on top of the NOS and other modules of the NOS (e.g., such as an export module within the transfer modules 1530). Upon receiving these registrations, the notification processor 1510 stores notification requests in the notification registry 1515 that identifies each requesting party and the NIB data tuple(s) that the requesting party is tracking.

As mentioned above, the system of some embodiments embeds in each NIB object a function for handling notification registrations for changes in the value(s) of that NIB object. For these embodiments, the notification processor 1510 is a conceptual illustration of the amalgamation of all the NIB object notification functions. Other embodiments, however, do not provide notification functions in some or all of the NIB objects. The NOS of some of these embodiments therefore provides an actual separate module to serve as the notification processor for some or all of the NIB objects.

When some or all of the NIB objects have notification functions in some embodiments, the notification registry for such NIB objects are typically kept with the objects themselves. Accordingly, for some of these embodiments, the notification registry 1515 is a conceptual illustration of the amalgamation of the different sets of registered requestors maintained by the NIB objects. Alternatively, when some or all of the NIB objects do not have notification functions and notification services are needed for these objects, some embodiments use a separate notification registry 1515 for the notification processing module 1510 to use to keep track of the notification requests for such objects.

The notification process serves as only one manner for accessing the data in the NIB. Other mechanisms are needed in some embodiments for accessing the NIB. For instance, the secondary storage structures (e.g., the PTD 1540 and the DHT instance 1550) also need to be able to import data from and export data to the NIB. For these operations, the NOS 1500 uses the transfer modules 1530 to exchange data between the NIB and the secondary storage structure.

In some embodiments, the transfer modules include a NIB import module and a NIB export module. These two modules in some embodiments are configured through the NOS controller 1522, which processes configuration instructions that it receives through the interfaces 1505 from the applications above the NOS. The NOS controller 1522 also performs several other operations. As with the notification processor, some or all of the operations performed by the NOS controller are performed by one or more functions of NIB objects, in some of the embodiments that implement one or more of the NOS 1500 operations through the NIB object functions. Accordingly, for these embodiments, the NOS controller 1522 is a conceptual amalgamation of several NOS operations, some of which are performed by NIB object functions.

Other than configuration requests, the NOS controller 1522 of some embodiments handles some of the other types of requests directed at the NOS instance 1500. Examples of such other requests include queries to read certain NIB attributes, queries to write to certain NIB attributes, requests to create or destroy NIB entities, requests to import or export entities on demand, and requests to synchronize NIB entities with switching elements or other NOS instances.

In some embodiments, the NOS controller stores requests to change the NIB on the NIB request list 1560. Like the notification registry, the NIB request list in some embodiments is a conceptual representation of a set of distributed requests that are stored in a distributed manner with the objects in the NIB. Alternatively, for embodiments in which some or all of the NIB objects do not maintain their modification requests locally, the request list is a separate list maintained by the NOS 1500. The system of some of these embodiments that maintains the request list as a separate list, stores this list in the NIB in order to allow for its replication across the different controller instances through the PTD storage layer and/or the DHT storage layer. This replication allows the distributed controller instances to process in a uniform manner a request that is received from an application operating on one of the controller instances.

Synchronization requests are used to maintain consistency in NIB data in some embodiments that employ multiple NIB instances in a distributed control system. For instance, in some embodiments, the NIB of some embodiments provides a mechanism to request and release exclusive access to the NIB data structure of the local instance. As such, an application running on top of the NOS instance(s) is only assured that no other thread is updating the NIB within the same controller instance; the application therefore needs to implement mechanisms external to the NIB to coordinate an effort with other controller instances to control access to the NIB. In some embodiments, this coordination is static and requires control logic involvement during failure conditions.

Also, in some embodiments, all NIB operations are asynchronous, meaning that updating a network entity only guarantees that the update will eventually be pushed to the corresponding switching element and/or other NOS instances. While this has the potential to simplify the application logic and make multiple modifications more efficient, often it is useful to know when an update has successfully completed. For instance, to minimize disruption to network traffic, the application logic of some embodiments requires the updating of forwarding state on multiple switches to happen in a particular order (to minimize, for example, packet drops). For this purpose, the API of some embodiments provides the synchronization request primitive that calls back one or more applications running on top of the NOS once the state has been pushed for an entity. After receiving the callback, the control application of some embodiments will then inspect the content of the NIB and determine whether its state is still as originally intended. Alternatively, in some embodiments, the control application can simply rely on NIB notifications to react to failures in modifications as they would react to any other network state changes.

The NOS controller 1522 is also responsible for pushing the changes in its corresponding NIB to switching elements for which the NOS 1500 is the master. To facilitate writing such data to the switching element, the NOS controller 1522 uses the switch controller 1525. It also uses the switch controller 1525 to read values from a switching element. To access a switching element, the switch controller 1525 uses the switch interface 1555, which as mentioned above uses OpenFlow or OVS, or other known set of APIs in some embodiments.

Like the PTD and DHT storage structures 1445 and 1450 of the control system 1400 of FIG. 14, the PTD and DHT storage structures 1540 and 1550 of FIG. 15 interface with the NIB and not the application layer. In other words, some embodiments only limit PTD and DHT layers to communicate between the NIB layer and these two storage layers, and to communicate between the PTD/DHT storages of one instance and PTD/DHT storages of other instances. Other embodiments, however, allow the application layer (e.g., the control application) within one instance to access the PTD and DHT storages directly or through the transfer modules 1530. These embodiments might provide PTD and DHT access handles (e.g., APIs to DHT, PTD or CM interface) as part of the application interface 1505, or might provide handles to the transfer modules that interact with the PTD layer (e.g., the CM interface 1542) and DHT layers, so that the applications can directly interact with the PTD and DHT storage layers.

Also, like structures 1445 and 1450, the PTD 1540 and DHT instance 1550 have corresponding lists of triggers that are respectively maintained in the CM interface 1542 and the DHT instance 1550. Also, like the PNTD 1455 of the control system 1400, the PNTD 1545 of FIG. 15 does not interface with the NIB 1520. Instead, it interfaces with the application layer through the application interface 1505. Through this interface, the applications running on top of the NOS can store data in and retrieve data from the PNTD. Also, applications of other controller instances can access the PNTD 1545, as shown in FIG. 15.

III. Control Data Pipeline

Figure 16:
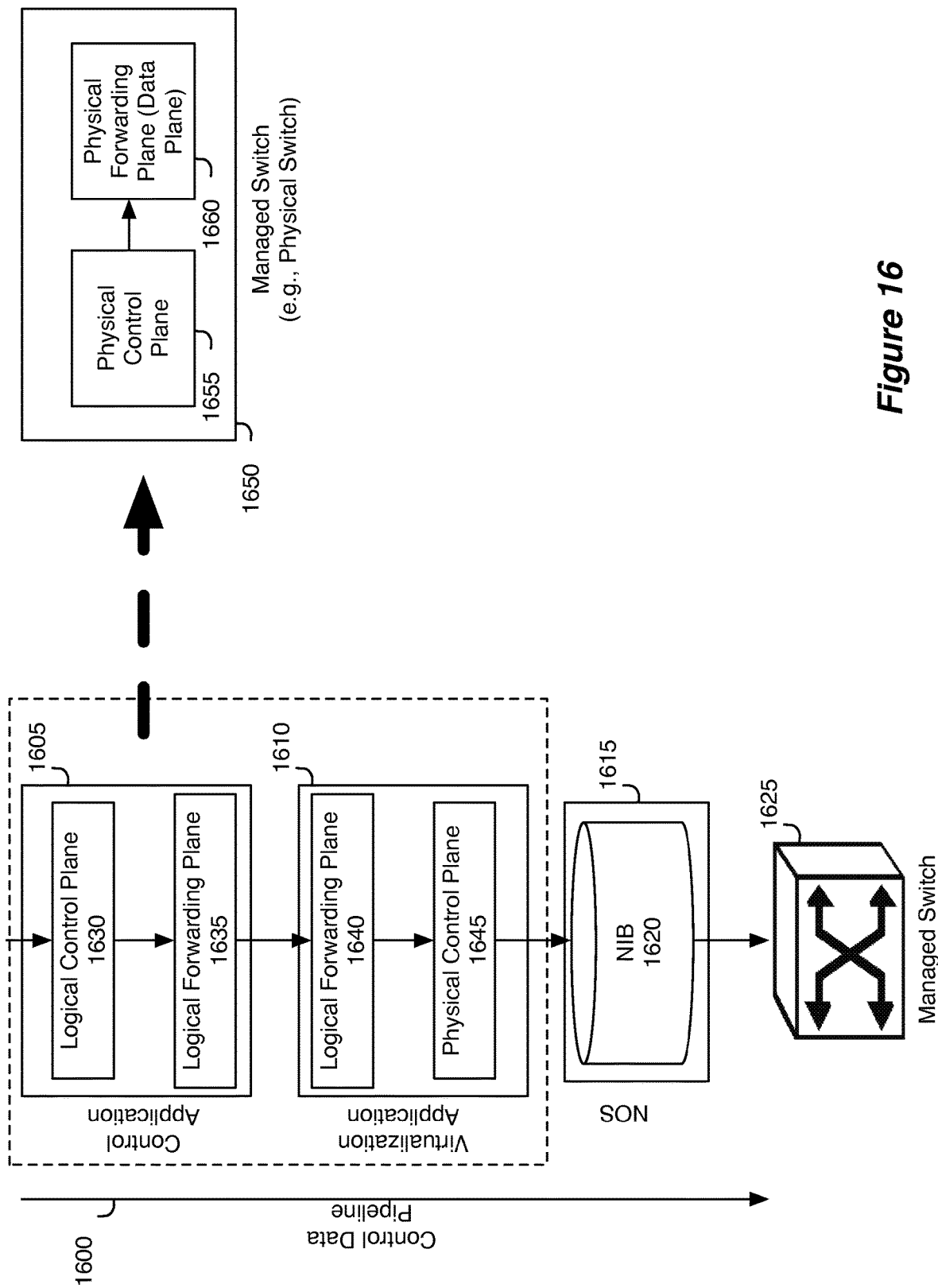
FIG. 16 illustrates propagation of instructions to control a managed switch through the various processing layers of the controller instances of some embodiments.

FIG. 16 further elaborates on the propagation of the instructions to control a managed switch through the various processing layers of the controller instances of some embodiments of the invention. This figure illustrates a control data pipeline 1600 that translates and propagates control plane data through three processing layers of the same or different controller instances to a managed switch 1625. These three layers are the control application 1605, the virtualization application 1610, and the NOS 1615. In some embodiments, these three layers are in the same controller instance. However, other arrangements of these layers exist in other embodiments. For instance, in other embodiments, only the control and virtualization applications 1605 and 1610 and the NIB that initially stores the output of the virtualization application 1610 are in the same controller instance, but the functionality to propagate the generated physical control plane data reside in a NOS of another controller instance (not shown). In these other embodiments, the physical control plane data is transferred from the initial NIB to the NIB of a NOS of the other controller instance, before this other NOS pushes the control plane data to the managed switch.

As shown in FIG. 16, the control application 1605 in some embodiments has two logical planes 1630 and 1635 that can be used to express the input and output to this application. In some embodiments, the first logical plane 1630 is a logical control plane that includes a collection of higher-level constructs that allow the control application and its users to specify one or more logical datapath sets within the logical control plane for one or more users. The second logical plane 1635 in some embodiments is the logical forwarding plane, which represents the logical datapath sets of the users in a format that can be processed by the virtualization application 1610. In this manner, the two logical planes 1630 and 1635 are virtualization space analogs of the control and forwarding planes 1655 and 1660 that are typically can be found in a typical managed switch 1650, as shown in FIG. 16.

In some embodiments, the control application 1605 defines and exposes the logical control plane constructs with which the application itself or users of the application define different logical datapath sets within the logical control plane. For instance, in some embodiments, the logical control plane data 1630 includes logical ACL data, etc. Some of this data (e.g., logical ACL data) can be specified by the user, while other such data (e.g., the logical L2 or L3 records) are generated by the control application and may not be specified by the user. In some embodiments, the control application 1605 generates and/or specifies such data in response to certain changes to the NIB (which indicate changes to the managed switches and the managed datapath sets) that the control application 1605 detects.

In some embodiments, the logical control plane data (i.e., the LDPS data that is expressed in terms of the control plane constructs) can be initially specified without consideration of current operational data from the managed switches and without consideration of the manner by which this control plane data will be translated to physical control plane data. For instance, the logical control plane data might specify control data for one logical switch that connects five computers, even though this control plane data might later be translated to physical control data for three managed switches that implement the desired switching between the five computers.

The control application includes a set of modules for converting any logical datapath set within the logical control plane to a logical datapath set in the logical forwarding plane 1635. In some embodiments, the control application 1605 uses the nLog table mapping engine to perform this conversion. The control application's use of the nLog table mapping engine to perform this conversion is further described below. The control application also includes a set of modules for pushing the LDPS from the logical forwarding plane 1635 of the control application 1605 to a logical forwarding plane 1640 of the virtualization application 1610.

The logical forwarding plane 1640 includes one or more logical datapath sets of one or more users. The logical forwarding plane 1640 in some embodiments includes logical forwarding data for one or more logical datapath sets of one or more users. Some of this data is pushed to the logical forwarding plane 1640 by the control application, while other such data are pushed to the logical forwarding plane by the virtualization application detecting events in the NIB 1620 as further described below for some embodiments.

In addition to the logical forwarding plane 1640, the virtualization application 1610 includes the physical control plane 1645. The physical control plane 1645 includes one or more physical control path sets of one or more users. The virtualization application includes a set of modules for converting any LDPS within the logical forwarding plane 1640 to a physical control datapath set in the physical control plane 1645. In some embodiments, the virtualization application 1610 uses the nLog table mapping engine to perform this conversion. The virtualization application also includes a set of modules (not shown) for pushing the physical control plane data from the physical control plane 1645 of the virtualization application 1610 into the NIB 1620 of the NOS 1615.

From the NIB, the physical control plane data is later pushed into the managed switch 1650, as shown in FIG. 16. As mentioned above, the physical control plane data in some instances of some embodiments is pushed to the managed switch by the NOS of the same controller instance that has the control application 1605 and virtualization application, but in other instance is pushed to the managed switch by the NOS of another controller instance (not shown). The managed switch 1650 then converts this physical control plane data to physical forwarding plane data that specifies the forwarding behavior of the managed switch.

In some embodiments, the physical control plane data that is propagated to the managed switch 1650 allows this switch to perform the logical data processing on data packets that it processes in order to effectuate the processing of the logical datapath sets specified by the control application. In some such embodiments, physical control planes include control plane data for operating in the physical domain and control plane data for operating in the logical domain. In other words, the physical control planes of these embodiments include control plane data for processing network data (e.g., packets) through managed switches to implement physical switching and control plane data for processing network data through managed switches in order to implement the logical switching. In this manner, the physical control plane facilitates implementing logical switches across managed switches. The use of the propagated physical control plane to implement logical data processing in the managed switches is further described in U.S. Patent Application entitled "Hierarchical Managed Switch Architecture," filed Jul. 6, 2011, with application Ser. No. 13/177,535, now issued as U.S. Pat. No. 8,750,164. This patent application is incorporated by reference in this application.

In addition to pushing physical control plane data to the NIB 1620, the control and virtualization applications 1605 and 1610 also store logical control plane data and logical forwarding plane data in the NIB. These embodiments store such data in the NIB for a variety of reasons. For instance, in some embodiments, the NIB 1620 serves as a medium for communications between different controller instances, and the storage of such data in the NOB facilitates the relaying of such data across different controller instances.

FIG. 16 illustrates the control data pipeline 1600 through three processing layers of the same or different controller instances to a managed switch 1625. However, in some embodiments, the control data pipeline 1600 may have two processing layers instead of three with the upper layer being a single application that performs the functionalities of both the control application 1605 and the virtual application 1610. The dashed box encompassing the two applications indicates that a single virtualization application (also called network hypervisor) may replace these two applications 1605 and 1610 in some embodiments. In such embodiments, the control application 1605 would form the front end of this network hypervisor, and would create and populate the logical datapath sets. The virtualization application 1610 in these embodiments would form the back end of the network hypervisor, and would convert the logical datapath sets to physical datapath sets that are defined in the physical control plane.

Figure 17:
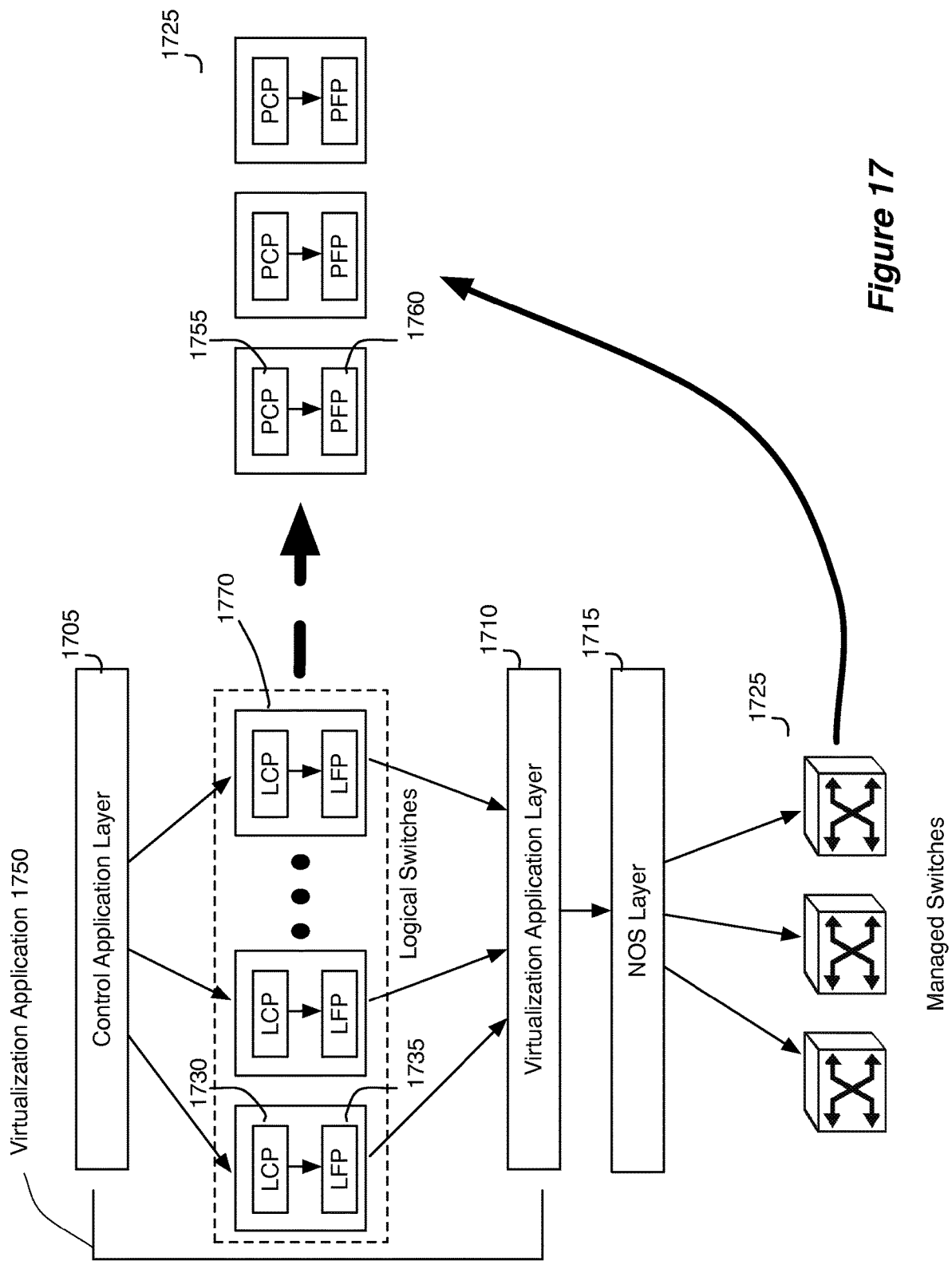
FIG. 17 illustrates propagation of instructions to control several managed switches through the various processing layers of the controller instances of some embodiments.

FIG. 17 illustrates another perspective on the operation of the control, virtualization, and NOS applications of some embodiments. The perspective provided in this figure is meant to emphasize that one or more controller instances can execute these applications in a distributed manner in parallel. Specifically, this figure replaces the control application 1605, the virtualization application 1610, and the NOS 1615, with a control layer 1705, a virtualization layer 1710, and a NOS layer 1715. Each of these layers represents one or more applications that can be executing in parallel on one or more controller instances. Collectively these three layers represent a control system that can be operated as a single controller instance, or can be operated in a distributed manner by several controller instances.

FIG. 17 illustrates another perspective on the operation of the control, virtualization, and NOS applications of some embodiments. The perspective provided in this figure is meant to emphasize that one or more controller instances can execute these applications in a distributed manner in parallel. Specifically, this figure replaces the control application 1605, the virtualization application 1610, and the NOS 1615, with a control layer 1705, a virtualization layer 1710, and a NOS layer 1715. Each of these layers represents one or more applications that can be executing in parallel on one or more controller instances. Collectively these three layers represent a control system that can be operated as a single controller instance, or can be operated in a distributed manner by several controller instances.

FIG. 17 is also meant to provide an example of logical datapath sets that are created by the control applications of some embodiments, and the mapping of the created logical datapath sets to the resources of the managed switches. In this example, the logical datapath sets are several logical switches 1770 that are specified by the control application layer 1705. A logical switch in some embodiments is a simulated/conceptual switch that is defined (e.g., by a user) to conceptually describe a set of switching behaviors for a switch. The control system of some embodiments (such as the system illustrated in FIG. 17) implements this logical switch across one or more physical switches, which as mentioned above may be hardware switches, software switches, or virtual switches defined on top of other switches.

Each logical switch has two logical planes 1730 and 1735 that can be used to express the input and output to the logical switch. In some embodiments, the logical plane 1730 is a logical control plane (denoted by "LCP" in the figure) that includes a collection of higher-level constructs that allow the control application layer and its user to specify one or more logical datapath sets within the logical control plane for the user. The second logical plane 1735 in some embodiments is the logical forwarding plane (denoted by "LFP" in the figure), which represents the logical datapath sets of the user in a format that can be processed by the virtualization application layer 1710. Because of these two logical planes 1730 and 1735, the logical switches appear as virtualization space analogs of the control and forwarding planes 1755 and 1760 that typically can be found in managed switches, as shown in FIG. 17.

This figure then illustrates that through the virtualization application layer 1710 and the NOS layer 1715, the logical switches 1770 can be implemented in three managed switches 1725. The number of logical switches 1770 may be less or more than three. That is, the number of logical switches 1770 in some embodiments does not have to match to the number of managed switches that implement the logical switches. To implement the logical switches 1770 in the three managed switches, the virtualization application layer 1710 converts the logical forwarding plane data of the logical switches into physical control plane data, and the NOS layer 1715 pushes this data to the managed switches 1725. As mentioned above, the pushed physical control plane data allows the managed switches to perform physical switching operations in both the physical and logical data processing domains.

IV. Control Application

As mentioned above, the control application of some embodiments converts control data records (also called data tuples below) to forwarding plane data records (e.g., logical forwarding plane data) by performing conversion operations. Specifically, in some embodiments, the control application populates the logical datapath tables (e.g., the logical forwarding tables) that are created by the virtualization application with logical datapath sets.

Figure 18:
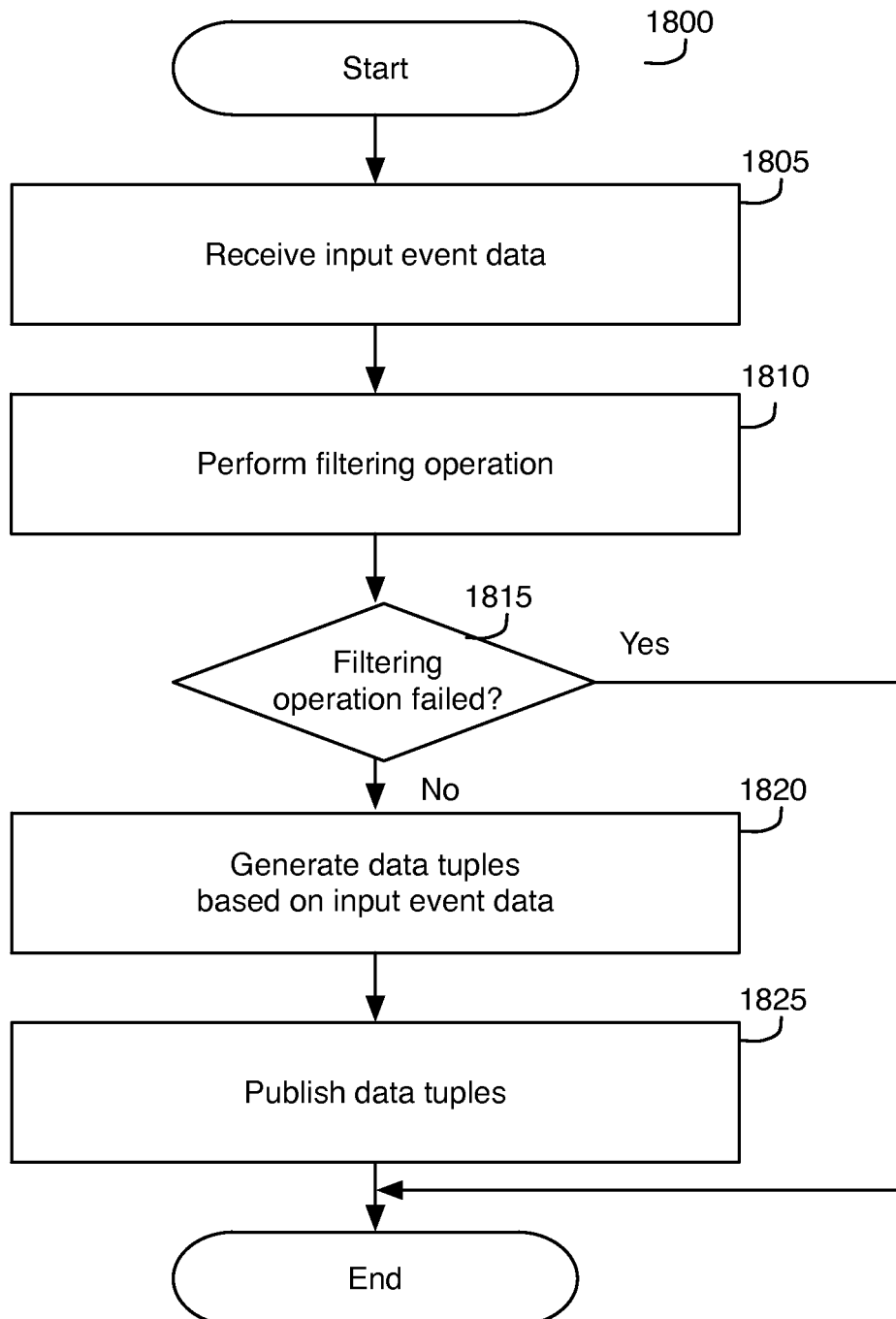
FIG. 18 illustrates a conceptual process that the control application of some embodiments performs to convert logical control plane data to logical forwarding plane data.

FIG. 18 illustrates an example of such conversion operations that an instance of a control application of some embodiments performs. This figure conceptually illustrates a process 1800 that the control application performs to generate logical forwarding plane data based on input event data that specifies the logical control plane data. As described above, the generated logical forwarding plane data is transmitted to the virtualization application, which subsequently generate physical control plane data from the logical forwarding plane data. The physical control plane data is propagated to the managed switching elements, which in turn will produce forwarding plane data (e.g., flow entries) for defining forwarding behaviors of the switches.

As shown in FIG. 18, the process 1800 initially receives (1805) data regarding an input event. The input event data may be logical data supplied by the user in some embodiments. As will be described further below, some embodiments provide the user with an interface that the user can use to specify input event data. An example of user-supplied data could be logical control plane data including access control list data for a logical switch that the user manages. The input event data may also be logical forwarding plane data that the control application generates in some embodiments from the logical control plane data. The input event data in some embodiments may also be physical forwarding plane data or physical control plane data received from the NIB. In some embodiments, the process 1800 receives the physical forwarding data from a NIB monitor that monitors the NIB to detect a change in the NIB that reflects a change in one or more managed switching elements.

At 1810, the process 1800 then performs a filtering operation to determine whether this instance of the control application is responsible for the input event data. As described above, several instances of the control application may operate in parallel to control multiple sets of logical datapaths in some embodiments. In these embodiments, each control application uses the filtering operation to filter out input data that does not relate to the control application's logical datapath set. To perform this filtering operation, the control application of some embodiments includes a filter module. This module in some embodiments is a standalone module, while in other embodiments it is implemented by a table mapping engine (e.g., implemented by the join operations performed by the table mapping engine) that maps records between input tables and output tables of the virtualization application, as further described below.

Next, at 1815, the process determines whether the filtering operation has failed. The filtering operation fails in some embodiments when the input event data does not fall within one of the logical datapath sets that are the responsibility of the control application. When the process determines (at 1815) that the filtering operation has failed the process ends. Otherwise, the process 1800 transitions to 1820.

At 1820, a converter of the virtualization application generates one or more sets of data tuples based on the received input event data. In some embodiments, the converter is a table mapping engine that performs a series of table mapping operations on the input event data to map the input event data to other data tuples. As mentioned above, this table mapping engine also performs the filtering operation in some embodiments. One example of such a table mapping engine is an nLog table-mapping engine which will be described bellow.

In some embodiments, the data tuples that the process 1800 generates may include data (e.g., logical forwarding plane data) that the process has to push down to the NIB. Accordingly, at 1825, the process publishes to the NIB any data tuples that it generated if such publication is necessary. After 1825, the process ends.

The control application in some embodiments performs its mapping operations by using the nLog table mapping engine, which, as described above, is a variation of the datalog table mapping technique. Datalog is used in the field of database management to map one set of tables to another set of tables. Datalog is not a suitable tool for performing table mapping operations in a control application of a network control system as its current implementations are often slow. Accordingly, the nLog engine of some embodiments is custom designed to operate quickly so that it can perform the real time mapping of the user specified inputs to the LDPS data records (also called LDPS data tuples below) to the data tuples of the managed switching elements. This custom design is based on several custom design choices. For instance, some embodiments compile the nLog table mapping engine from a set of high level declaratory rules that are expressed by an application developer (e.g., by a developer of a control application). In some of these embodiments, one custom design choice that is made for the nLog engine is to allow the application developer to use only the AND operator to express the declaratory rules. By preventing the developer from using other operators (such as ORs, XORs, etc.), these embodiments ensure that the resulting rules of the nLog engine are expressed in terms of AND operations that are faster to execute at run time.

Another custom design choice relates to the join operations performed by the nLog engine. Join operations are common database operations for creating association between records of different tables. In some embodiments, the nLog engine limits its join operations to inner join operations (also called as internal join operations) because performing outer join operations (also called as external join operations) can be time consuming and therefore impractical for real time operation of the engine.

Yet another custom design choice is to implement the nLog engine as a distributed table mapping engine that is executed by several different control applications. Some embodiments implement the nLog engine in a distributed manner by partitioning management of logical datapath sets. Each logical datapath set includes logical datapaths that are specified for a single user of the control system. Partitioning management of the logical datapath sets involves specifying for each particular logical datapath set only one controller instance as the instance responsible for specifying the NIB records associated with that particular logical datapath set. For instance, when the control system uses three switching elements to specify five logical datapath sets for five different users with two different controller instances, one controller instance can be the master for NIB records relating to two of the logical datapath sets while the other controller instance can be the master for the NIB records for the other three logical datapath sets. Partitioning management of logical datapath sets ensures that conflicting values for the same logical datapath sets are not written to the NIB by two different controller instances, and thereby alleviates the applications running on top of NOS from guarding against the writing of such conflicting values.

Partitioning management of the LDPS' also assigns in some embodiments the table mapping operations for each LDPS to the nLog engine of the controller instance responsible for the LDPS. The distribution of the nLog table mapping operations across several nLog instances reduces the load on each nLog instance and thereby increases the speed by which each nLog instance can complete its mapping operations. Also, this distribution reduces the memory size requirement on each machine that executes a controller instance. As further described below, some embodiments partition the nLog table mapping operations across the different instances by designating the first join operation that is performed by each nLog instance to be based on the LDPS parameter. This designation ensures that each nLog instance's join operations fail and terminate immediately when the instance has started a set of join operations that relate to a LDPS that is not managed by the nLog instance.

A more detailed example of the nLog mapping engine and the virtualization application is described in sub-sections A-E below. Sub-section A initially describes the software architecture of the control application of some embodiments. Sub-section B then describes further the parallel, distributed management of the LDPS. Sub-section C next describes one manner for designing the nLog mapping engine. Lastly, Sub-section D then describes the nLog engine's table mapping operations in response to an external event from the NIB or an internal event that is generated by the nLog engine.

A. Architecture

Figure 19:
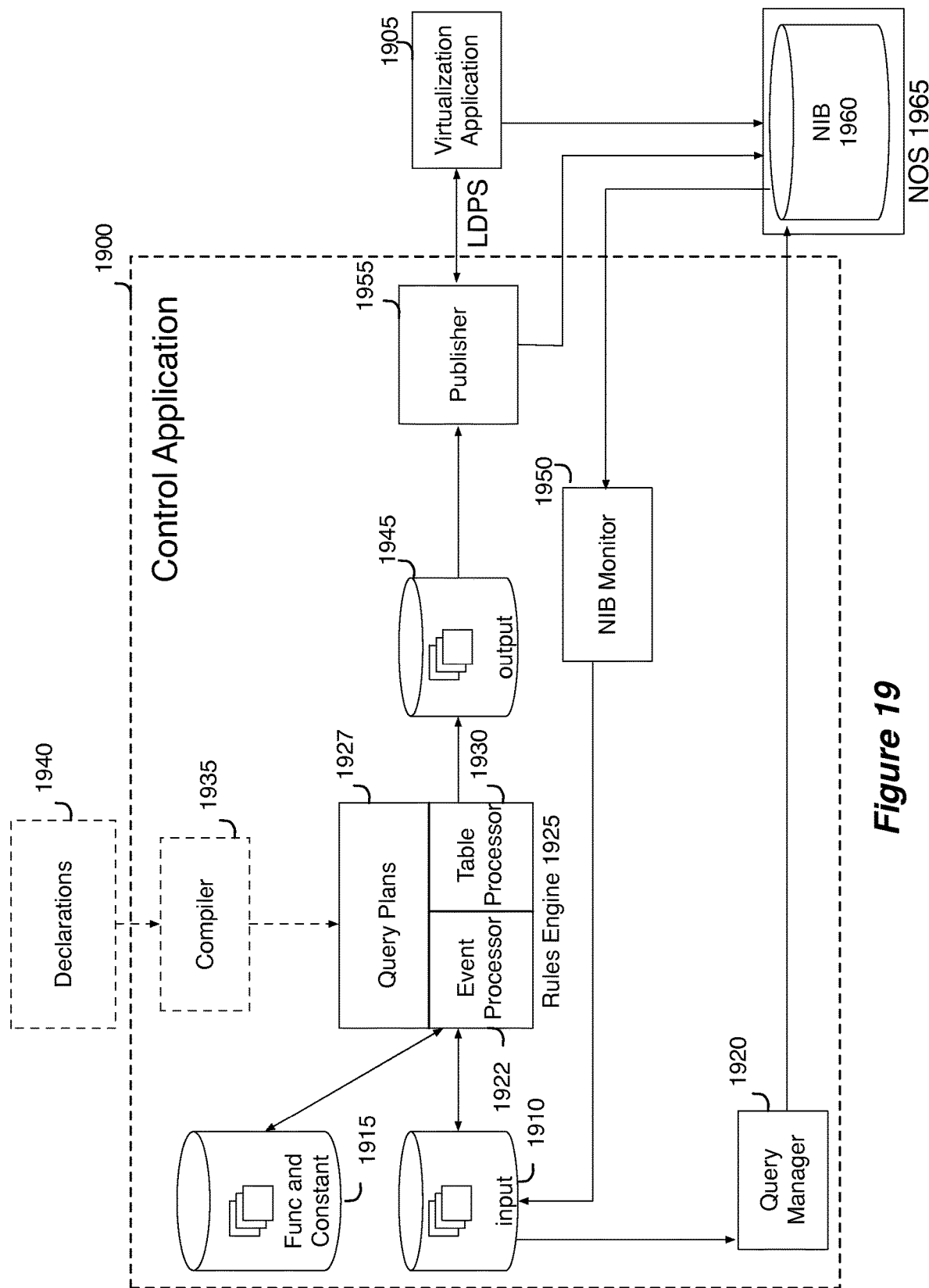
FIG. 19 illustrates a control application of some embodiments.

FIG. 19 illustrates a control application 1900 of some embodiments of the invention. This application 1900 uses an nLog table mapping engine to map input tables that contain input data tuples to LDPS data tuples. This application resides on top of a virtualization application 1905 that receives the LDPS data tuples from the control application 1900. The virtualization application 1905 maps the LDPS data tuples to data tuples for defining managed switching elements, attributes of the managed switching elements, and flow entries for the managed switching elements. The virtual application 1905 resides on top of a NOS 1965 that contains a NIB 1960 that stores the data tuples generated by the virtualization application 1905.

More specifically, the control application 1905 allows different users to define different logical datapath sets (LDPS), which specify the desired switching configurations of the users. The control application 1905 also reacts to changes in the NIB to modify the LDPS'. The virtualization application 1905 through its mapping operations converts each of the LDPS of each user into a set of data tuples to populate the NIB. The virtualization application 1905 then populates the NIB 1960 with the generated sets of data tuples. When the NOS 1965 subsequently propagates the NIB data tuples for a particular user to the switching element(s), the NOS completes the deployment of the user's switching configuration to one or more switching elements. In some embodiments, the control application is executed on the same machine with the control application and the NOS. However, the control application, the virtualization application, and the NOS do not have to run on the same machine in other embodiments. That is, one of these applications or each of these applications may run on a different computer.

As shown in FIG. 19, the control application 1900 includes a set of rule-engine input tables 1910, a set of function and constant tables 1915, a query manager 1920, a rule engine 1925, a set of rule-engine output tables 1945, a NIB monitor 1950, a publisher 1955, and a compiler 1935. The compiler 1935 is one component of the application that operates at a different instance in time than the application's other components. The compiler operates when a developer needs to specify the rules engine for a particular control application and/or virtualized environment, whereas the rest of the application's modules operate at run time when the application interfaces with the control application and the NOS to deploy and monitor logical datapath sets specified by one or more users.

In some embodiments, the compiler 1935 takes a relatively small set (e.g., few hundred lines) of declarative instructions 1940 that are specified in a declarative language and converts these into a large set (e.g., thousands of lines) of code that specify the operation of the rules engine 1925, which performs the application's table mapping as further described below. As such, the compiler greatly simplifies the control application developer's process of defining and updating the control application. This is because the compiler allows the developer to use a high level programming language that allows a compact definition of the control application's complex mapping operation and to subsequently update this mapping operation in response to any number of changes (e.g., changes in the logical networking functions supported by the control application, changes to desired behavior of the control application, etc.).

In some embodiments, the rule-engine (RE) input tables 1910 include tables with logical data and/or switching configurations (e.g., access control list configurations, private virtual network configurations, port security configurations, etc.) specified by the user and/or the control application. They also include in some embodiments tables that contain physical data (i.e., non-logical data) from the switching elements managed by the virtualized control system. In some embodiments, such physical data includes data regarding the managed switching elements (e.g., physical control plane data) and other data regarding network configuration employed by the virtualized control system to deploy the different LDPS' of the different users.

The RE input tables 1910 are partially populated by the LDPS data (e.g., logical control plane data) provided by the user. It also generates part of the LDPS data (e.g., logical forwarding plane data) and physical (i.e., non-logical) data (e.g., physical control plane data) by monitoring the NIB to identify changes in the managed switching element infrastructure that would require modification to the LDPS data and/or the physical data.

In addition to the RE input tables 1910, the control application 1900 includes other miscellaneous tables 1915 that the rules engine 1925 uses to gather inputs for its table mapping operations. These tables 1915 include constant tables that store defined values for constants that the rules engine 1925 needs to perform its table mapping operations. For instance, constant tables may include a constant "zero" that is defined as the value 0, a constant "dispatch_port no" as the value 4000, a constant "broadcast_MAC_addr" as the value 0xFF:FF:FF:FF:FF:FF. (A dispatch port in some embodiments is a port that specifies that the managed switch should reprocess the packet based on another flow entry. Examples of such dispatch ports are provided in the above-mentioned U.S. Patent Application entitled "Hierarchical Managed Switch Architecture," filed Jul. 6, 2011, with application Ser. No. 13/177,535.)

When the rules engine 1925 references constants, the corresponding value defined for the constants are actually retrieved and used. In addition, the values defined for constants in the constant table 1915 may be modified and/or updated. In this manner, the constant table 1915 provides the ability to modify the value defined for constants that the rules engine 1925 references without the need to rewrite or recompile code that specifies the operation of the rules engine 1925.

The tables 1915 further include function tables 1915 that store functions that the rules engine 1925 needs to use to calculate values needed to populate the output tables 1945. One example of such a function is a hash function that the rules engine uses to compute hash values for distributing DHT operations as well as load balancing traffic between lower level switches and higher level switches in a hierarchical switching architecture. U.S. Patent Application entitled "Method and Apparatus for Using a Network Information Base to Control a Plurality of Shared Network Infrastructure Switching Elements," and filed Jul. 6, 2011, with application Ser. No. 13/177,529, now issued as U.S. Pat. No. 8,743,889, describes the use of hash tables for distributing DHT operations, while the above-identified U.S.

Patent Application entitled "Hierarchical Managed Switch Architecture," filed Jul. 6, 2011, with application Ser. No. 13/177,535, describes the use of hash tables to load balance traffic in a hierarchical switching architecture. U.S. Patent Application entitled "Method and Apparatus for Using a Network Information Base to Control a Plurality of Shared Network Infrastructure Switching Elements," filed Jul. 6, 2011, with application Ser. No. 13/177,529 is incorporated herein by reference.

The rules engine 1925 performs table mapping operations that specify one manner for converting any logical datapath set within the logical control plane to a logical datapath set in the logical forwarding plane. Whenever one of the rule-engine (RE) input tables is modified, the rule engine performs a set of table mapping operations that may result in the modification of one or more data tuples in one or more RE output tables. The modification of the output table data tuples, in turn, through the virtualization application 1905, may cause the NIB to be modified in order to establish and/or modify the implementation of a particular user's LDPS in the managed switching element infrastructure.

As shown in FIG. 19, the rules engine 1925 includes an event processor 1922, several query plans 1927, and a table processor 1930. Each query plan is a set of join operations that are to be performed upon the occurrence of a modification to one of the RE input table. Such a modification is referred to below as an input table event. As further described below, each query plan is generated by the compiler 1935 from one declaratory rule in the set of declarations 1940. In some embodiments, the query plans are defined by using the nLog declaratory language.

In some embodiments, the compiler 1935 does not just statically generate query plans but rather dynamically generates query plans based on performance data it gathers. The complier 1935 in these embodiments generates an initial set of query plans and let the rules engine operate with the initial set of query plans. The control application gathers the performance data or receives performance feedbacks (e.g., from the rules engine). Based on this data, the compiler is modified so that the control application or a user of this application can have the modified compiler modify the query plans while the rules engine is not operating or during the operation of the rules engine.

For instance, the order of the join operations in a query plan may result in different execution times depending on the number of tables the rules engine has to select to perform each join operation. The compiler in these embodiments can be re-specified in order to re-order the join operations in a particular query plan when a certain order of the join operations in the particular query plan has resulted in a long execution time to perform the join operations.

The event processor 1922 of the rules engine 1925 detects the occurrence of each input table event. The event processor of different embodiments detects the occurrence of an input table event differently. In some embodiments, the event processor registers for callbacks with the RE input tables for notification of changes to the records of the RE input tables. In such embodiments, the event processor 1922 detects an input table event when it receives notification from a RE input table that one of its records has changed.

In response to a detected input table event, the event processor 1922 (1) selects the appropriate query plan for the detected table event, and (2) directs the table processor 1930 to execute the query plan. To execute the query plan, the table processor 1930 in some embodiments performs the join operations specified by the query plan to produce one or more records that represent one or more sets of data values from one or more input and miscellaneous tables 1910 and 1915. The table processor 1930 of some embodiments then (1) performs a select operation to select a subset of the data values from the record(s) produced by the join operations, and (2) writes the selected subset of data values in one or more RE output tables 1945.

In some embodiments, the RE output tables 1945 store both logical and physical network element data attributes. The tables 1945 are called RE output tables as they store the output of the table mapping operations of the rule engine 1925. In some embodiments, the RE output tables can be grouped in several different categories. For instance, in some embodiments, these tables can be RE input tables and/or control-application (CA) output tables. A table is a RE input table when a change in the table causes the rule engine to detect an input event that requires the execution of a query plan. A RE output table 1945 can also be a RE input table 1910 that generates an event that causes the rules engine to perform another query plan. Such an event is referred to as an internal input event, and it is to be contrasted with an external input event, which is an event that is caused by a RE input table modification made by the control application 1905 or the NIB monitor 1950.

Figure 20:
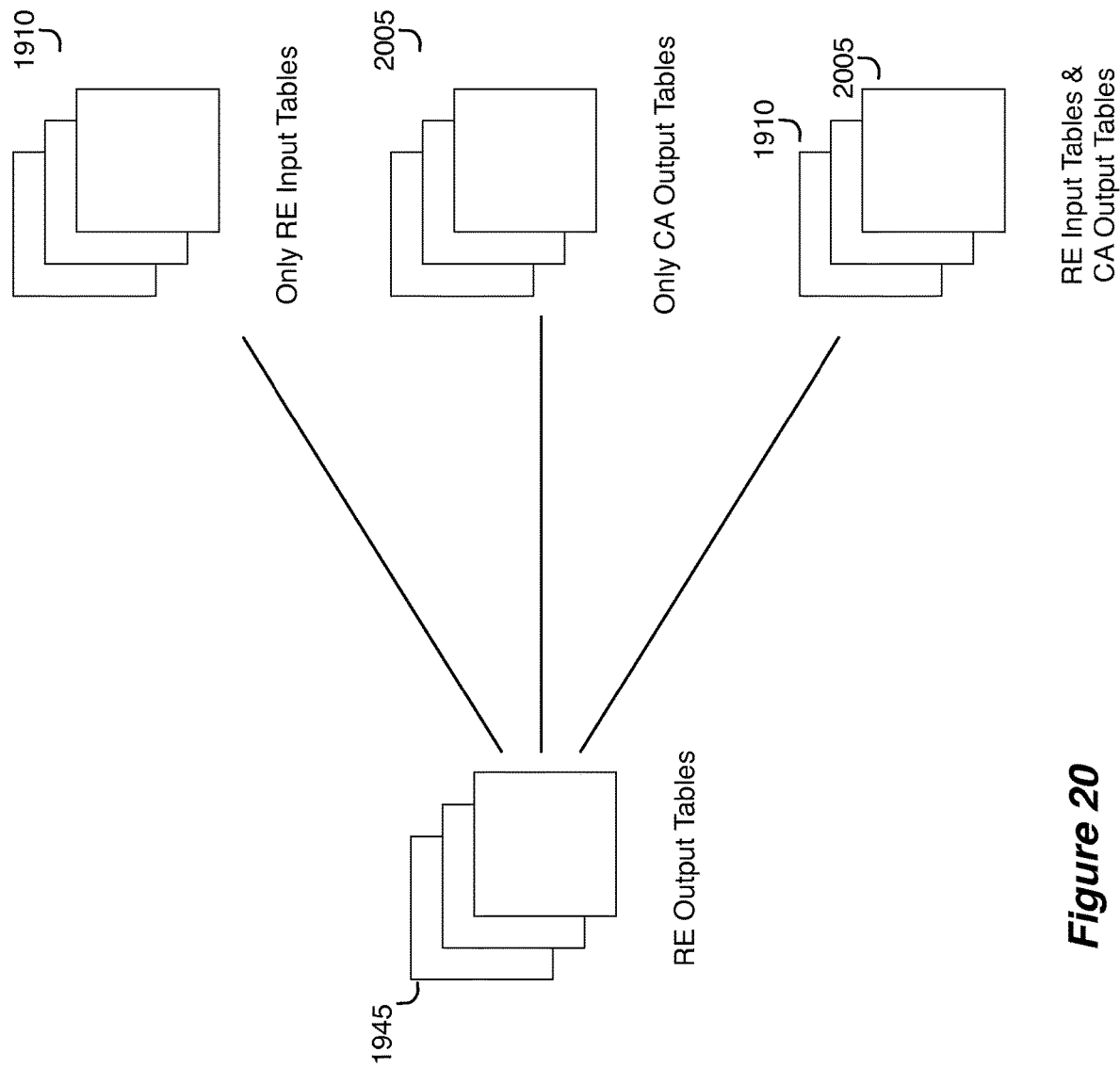
FIG. 20 illustrates input and output tables of some embodiments.

A table is a control-application output table when a change in the table causes the publisher 1955 to publish a change to the virtual application 1905 and/or to the NIB 1960, as further described below. As shown in FIG. 20, a table in the RE output tables 1945 can be a RE input table 1910, a CA output table 2005, or both a RE input table 1910 and a CA output table 2005.

The publisher 1955 detects changes to the CA output tables 2005 of the RE output tables 1945. The publisher of different embodiments detects the occurrence of a CA output table event differently. In some embodiments, the publisher registers for callbacks with the CA output tables for notification of changes to the records of the CA output tables. In such embodiments, the publisher 1955 detects an output table event when it receives notification from a CA output table that one of its records has changed.

In response to a detected output table event, the publisher 1955 takes some or all of modified data tuples in the modified CA output tables and propagates this modified data tuple(s) to the input tables (not shown) of the virtualization application 1905. In some embodiments, instead of the publisher 1955 pushing the data tuples to the virtualization application, the virtualization application 1905 pulls the data tuples from the CA output tables 1945 into the input tables of the virtualization application. Alternatively, in some embodiments, the publisher 2955 publishes changes to the modified CA output tables to the NIB, and the virtualization application 1905 retrieves these changes from the NIB and based on them, modifies its input tables. In some embodiments, the CA output tables 1945 of the control application 1900 and the input tables of the virtualization 1905 may be identical. In yet other embodiments, the control and virtualization applications use one set of tables, so that the CA output tables are essentially VA input tables.

Moreover, the publisher 1955 in some embodiments takes some or all of modified data tuples in the modified CA output tables and propagates this modified data tuple into the NIB 1960 through the APIs provided by the NOS 1965. Also, the publisher may push down logical data (e.g., logical control plane data, logical forwarding plane data, etc.) processed and maintained by the control application 1900 to the NIB 1960. This is because, in some embodiments, the NIB 1960 serves as a medium for all communications between the control application, the virtualization application, and the NOS of different controller instances as described below.

As the CA output tables store both logical and physical network element data attributes in some embodiments, the NIB 1960 in some embodiments stores both logical and physical network element attributes that are identical or derived by the virtualization application 1905 from the logical and physical network element data attributes in the output tables 1945. In other embodiments, however, the NIB only stores physical network element attributes that are identical or derived by the virtualization application 1905 from the physical network element data attributes in the output tables 1945.

The NIB monitor 1950 interfaces with the NIB 1960 to receive notifications regarding changes to the NIB. The NIB monitor of different embodiments detects the occurrence of a change in the NIB differently. In some embodiments, the NIB monitor registers for callbacks with the NIB for notification of changes to one or more records in the NIB. In such embodiments, the NIB monitor 1950 detects NIB change event when it receives notification from the NIB that one of its records has changed. In response to a detected NIB change event, the NIB monitor 1950 may modify one or more RE input tables 1910, which, in turn, may cause one or more RE input table event to occur that then initiates the execution of one or more query plans by the rules engine. In other words, the NIB monitor writes some or all of the information that it receives from the NIB into the input tables 1910, so that the state and configuration of the managed switching elements can be accounted for while generating the NIB data tuples through the mapping operations. Each time the managed switching configuration or underlying managed switching element state changes, the NIB monitor 1950 may update the input table records 1910 so that the generated NIB data tuples can be updated to reflect the modified switching configuration or underlying switching element state.

In some embodiments, the NIB monitor 1950 is a collection of input objects (or functions) associated with the RE input tables. Each input object in some embodiments is associated with one RE input table and is responsible for modifying its associated RE input table in response to a change in the NIB. Each input object in some embodiments registers with one or more NIB objects for callback notifications upon the occurrence of changes to the NIB object(s). Similarly, in some embodiments, the publisher 1955 is a collection of output objects (or functions) associated with the CA output tables. Each output object in some embodiments is associated with one CA output table and is responsible for propagating changes in its associated output table to the virtualization application 1905 and/or to the NIB. As such, in some embodiments, the NIB monitor is a conceptual representation of the input and output objects that register with the NIB for callbacks.

The query manager 1920 interfaces with the control application 1900 to receive queries regarding LDPS data. As shown in FIG. 19, the manager 1920 of some embodiments also interfaces with the NIB 1960 in order to query the NIB to provide the control application state information regarding the network elements in the LDPS' for the different user. In other embodiments, however, the query manager 1920 queries the output tables 1945 to obtain LDPS data for the control application.

B. Designing the nLog Table Mapping Engine

In some embodiments, the control application 1900 uses a variation of the datalog database language, called nLog, to create the table mapping engine that maps input tables containing logical datapath data and switching element attributes to the output tables. Like datalog, nLog provides a few declaratory rules and operators that allow a developer to specify different operations that are to be performed upon the occurrence of different events. In some embodiments, nLog provides a smaller subset of the operators that are provided by datalog in order to increase the operational speed of nLog. For instance, in some embodiments, nLog only allows the AND operator to be used in any of the declaratory rules.

The declaratory rules and operations that are specified through nLog are then compiled into a much larger set of rules by an nLog compiler. In some embodiments, this compiler translates each rule that is meant to respond to an event into several sets of database join operations. Collectively the larger set of rules forms the table mapping, rules engine that is referred to below as the nLog engine.

Figure 21:
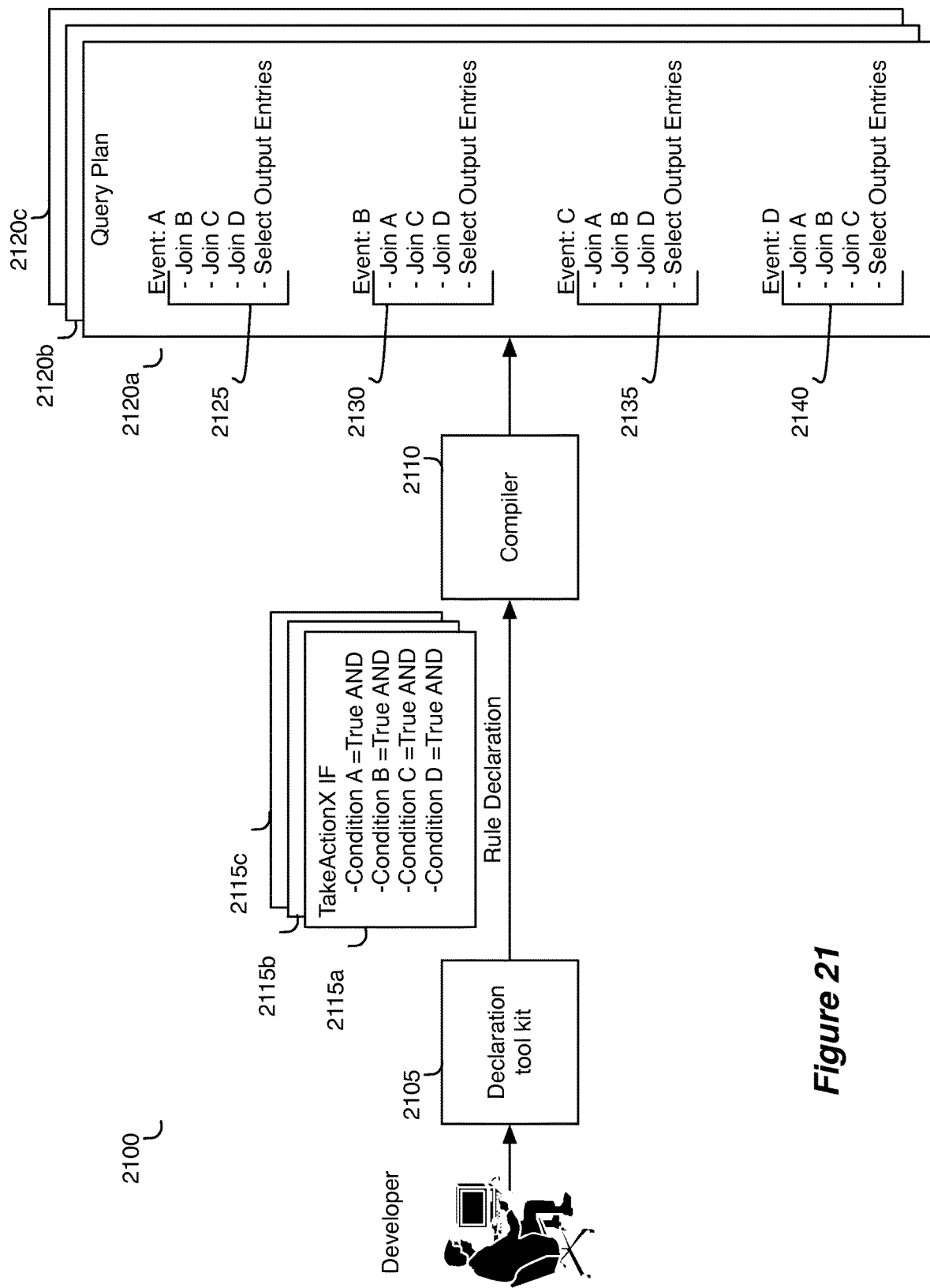
FIG. 21 illustrates a development process that some embodiments employ to develop the rules engine of the control application.

FIG. 21 illustrates a development process 2100 that some embodiments employ to develop the rules engine 1925 of the control application 1900. As shown in this figure, this process uses a declaration toolkit 2105 and a compiler 2110. The toolkit 2105 allows a developer (e.g., a developer of a control application 1430 that operates on top of the virtualization application 1905) to specify different sets of rules to perform different operations upon occurrence of different sets of conditions.

One example 2115 of such a rule is illustrated in FIG. 21. This example is a multi-conditional rule that specifies that an Action X has to be taken if four conditions A, B, C, and D are true. The expression of each condition as true in this example is not meant to convey that all embodiments express each condition for each rule as True or False. For some embodiments, this expression is meant to convey the concept of the existence of a condition, which may or may not be true. For example, in some such embodiments, the condition "A=True" might be expressed as "Is variable Z=A?" In other words, A in this example is the value of a parameter Z, and the condition is true when Z has a value A.

Irrespective of how the conditions are expressed, a multi-conditional rule in some embodiments specifies the taking of an action when certain conditions in the network are met. Examples of such actions include creation or deletion of new packet flow entries, creation or deletion of new network constructs, modification to use of existing network constructs, etc. In the control application 1900 these actions are often implemented by the rules engine 1925 by creating, deleting, or modifying records in the output tables, which are then propagated to the virtualization application 1905 by the publisher 1955.

As shown in FIG. 21, the multi-conditional rule 2115 uses only the AND operator to express the rule. In other words, each of the conditions A, B, C and D has to be true before the Action X is to be taken. In some embodiments, the declaration toolkit 2105 only allows the developers to only utilize the AND operator because excluding the other operators (such as ORs, XORs, etc.) that are allowed by datalog allows nLog to operate faster than datalog.

The compiler 2110 converts each rule specified by the declaration toolkit 2105 into a query plan 2120 of the rules engine. FIG. 21 illustrates the creation of three query plans 2120a-2120c for three rules 2115a-2115c. Each query plan includes one or more sets of join operations. Each set of join operations specifies one or more join operations that are to be performed upon the occurrence of a particular event in a particular RE input table, where the particular event might correspond to the addition, deletion or modification of an entry in the particular RE input table.

In some embodiments, the compiler 2110 converts each multi-conditional rule into several sets of join operations, with each set of join operations being specified for execution upon the detection of the occurrence of one of the conditions. Under this approach, the event for which the set of join operations is specified is one of the conditions of the multi-conditional rule. Given that the multi-conditional rule has multiple conditions, the compiler in these embodiments specifies multiple sets of join operations to address the occurrence of each of the conditions.

FIG. 21 illustrates this conversion of a multi-conditional rule into several sets of join operations. Specifically, it illustrates the conversion of the four-condition rule 2115 into the query plan 2120*a*, which has four sets of join operations. In this example, one join-operation set 2125 is to be performed when condition A occurs, one join-operation set 2130 is to be performed when condition B occurs, one join-operation set 2135 is to be performed when condition C occurs, and one join-operation set 2140 is to be performed when condition D occurs.

These four sets of operations collectively represent the query plan 2120*a* that the rules engine 1925 performs upon the occurrence of a RE input table event relating to any of the parameters A, B, C, or D. When the input table event relates to one of these parameters (e.g., parameter B) but one of the other parameters (e.g., parameters A, C, and D) is not true, then the set of join operations fails and no output table is modified. But, when the input table event relates to one of these parameters (e.g., parameter B) and all of the other parameters (e.g., parameters A, C, and D) are true, then the set of join operations does not fail and an output table is modified to perform the action X. In some embodiments, these join operations are internal join operations. In the example illustrated in FIG. 21, each set of join operations terminates with a select command that selects entries in the record(s) resulting from the set of join operations to output to one or more output tables.

To implement the nLog engine in a distributed manner, some embodiments partition management of logical datapath sets by assigning the management of each logical datapath set to one controller instance. This partition management of the LDPS is also referred to as serialization of management of the LDPS. The rules engine 1925 of some embodiments implements this partitioned management of the LDPS by having a join to the LDPS entry be the first join in each set of join operations that is not triggered by an event in a LDPS input table.

Figure 22:
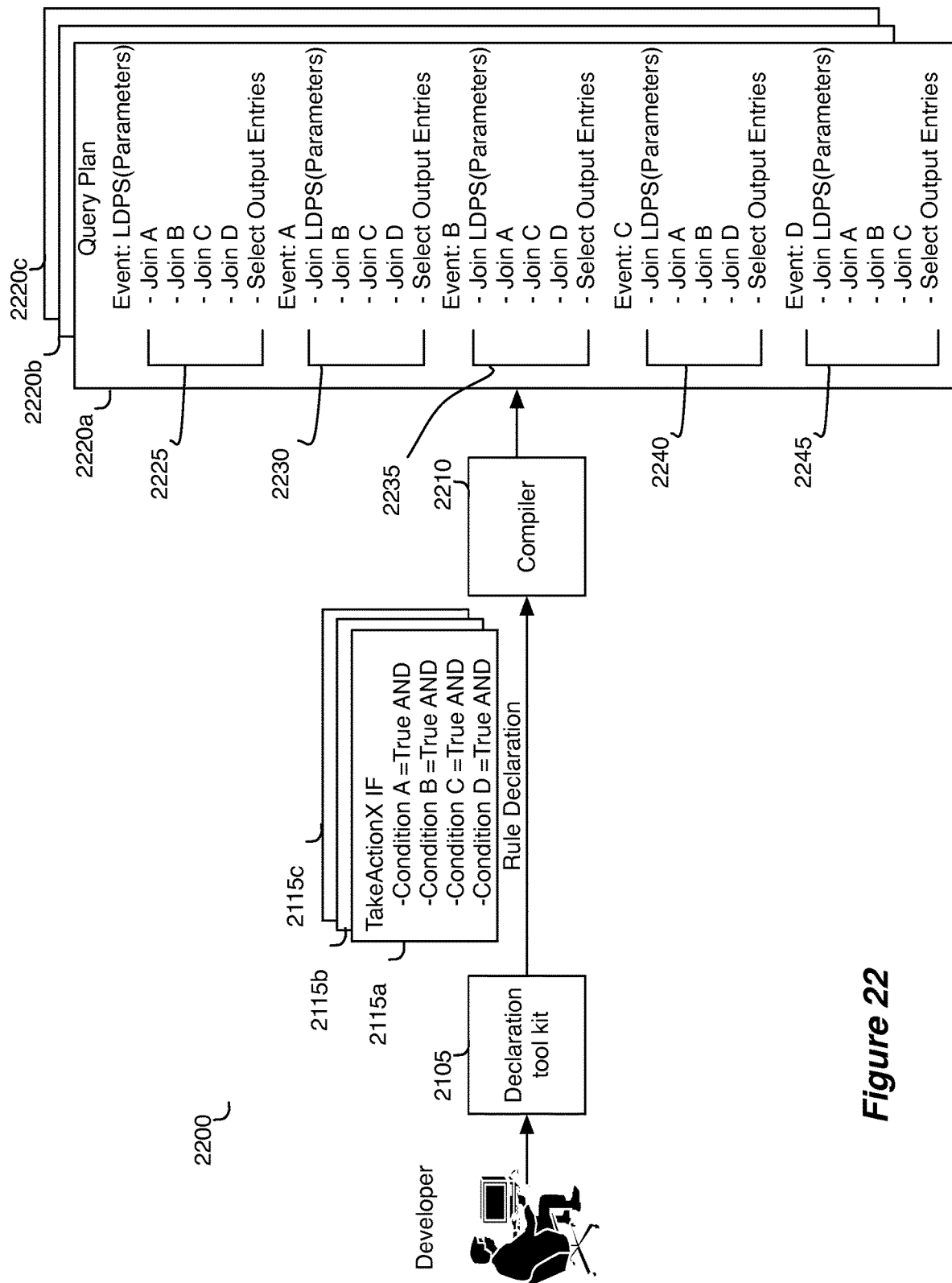
FIG. 22 illustrates that the rules engine of some embodiments implements partitioned management of logical datapath sets (LDPS').

FIG. 22 illustrates one such approach. Specifically, for the same four-condition rule 2115*a* illustrated in FIG. 21, it generates a different query plan 2220*a*. This query plan is part of three query plans 2220*a*-2220*c* that this figure shows the compiler 2210 generating for the three rules 2115*a*-2115*c* specified through the declaration toolkit 2105. Like the query plan 2120*a* that has four sets of join operations 2125, 2130, 2135 and 2140 for the four-condition rule 2115*a*, the query plan 2220*a* also has four sets of join operations 2230, 2235, 2240 and 2245 for this rule 2115*a*.

The four sets of join operations 2230, 2235, 2240 and 2245 are operational sets that are each to be performed upon the occurrence of one of the conditions A, B, C, and D. The first join operations in each of these four sets 2230, 2235, 2240 and 2245 is a join with the LDPS table managed by the control application instance. Accordingly, even when the input table event relates to one of these four parameters (e.g., parameter B) and all of the other parameters (e.g., parameters A, C, and D) are true, the set of join operations may fail if the event has occurred for a LDPS that is not managed by this control application instance. The set of join operations does not fail and an output table is modified to perform the desire action only when (1) the input table event relates to one of these four parameters (e.g., parameter B), all of the other parameters (e.g., parameters A, C, and D) are true, and (3) the event relates to a LDPS that is managed by this control application instance. Sub-section D below further describes how the insertion of the join operation to the LDPS table allows the control application to partition management of the LDPS'.

C. Table Mapping Operations Upon Occurrence of Event

Figure 23:
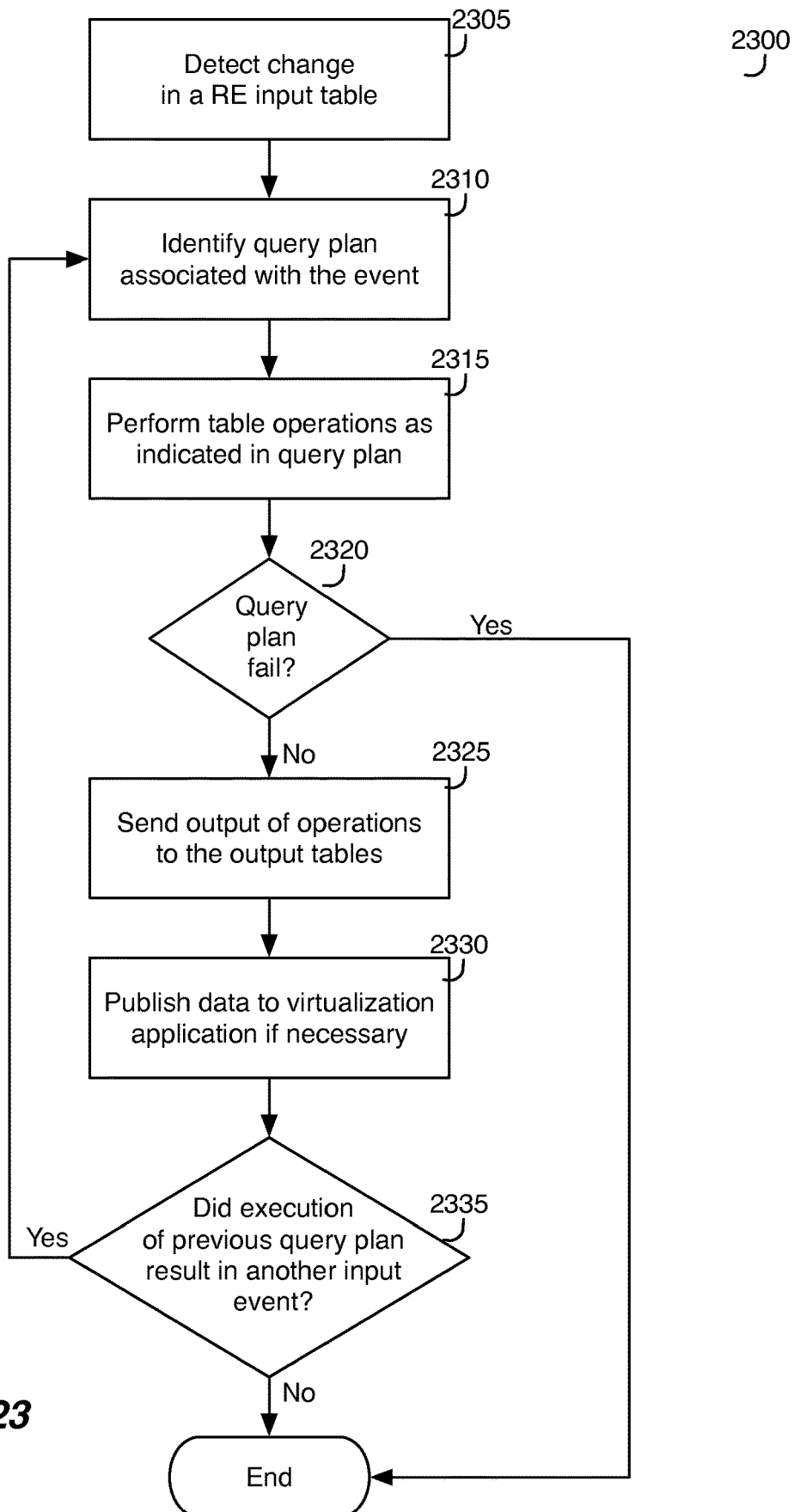
FIG. 23 illustrates a conceptual process that the control application of some embodiments performs each time a record in a RE input table changes.

FIG. 23 conceptually illustrates a process 2300 that the control application 1900 performs in some embodiments each time a record in a RE input table changes. This change may be a change made through the control application 1900. Alternatively, it may be a change that is made by the NIB monitor 1950 after it receives from the NIB a notification regarding a change in the NIB. The change to the RE input table record can entail the addition, deletion or modification of the record.

As shown in FIG. 23, the process 2300 initially detects (at 2305) a change in a RE input table 1910. In some embodiments, the event processor 1922 is the module that detects this change. Next, at 2310, the process 2300 identifies the query plan associated with the detected RE input table event. As mentioned above, each query plan in some embodiments specifies a set of join operations that are to be performed upon the occurrence of an input table event. In some embodiments, the event processor 1922 is also the module that performs this operation (i.e., is the module that identifies the query plan).

At 2315, the process 2300 executes the query plan for the detected input table event. In some embodiments, the event processor 1922 directs the table processor 1930 to execute the query plan. To execute a query plan that is specified in terms of a set of join operations, the table processor 1930 in some embodiments performs the set of join operations specified by the query plan to produce one or more records that represent one or more sets of data values from one or more input and miscellaneous tables 1910 and 1915.

Figure 24:
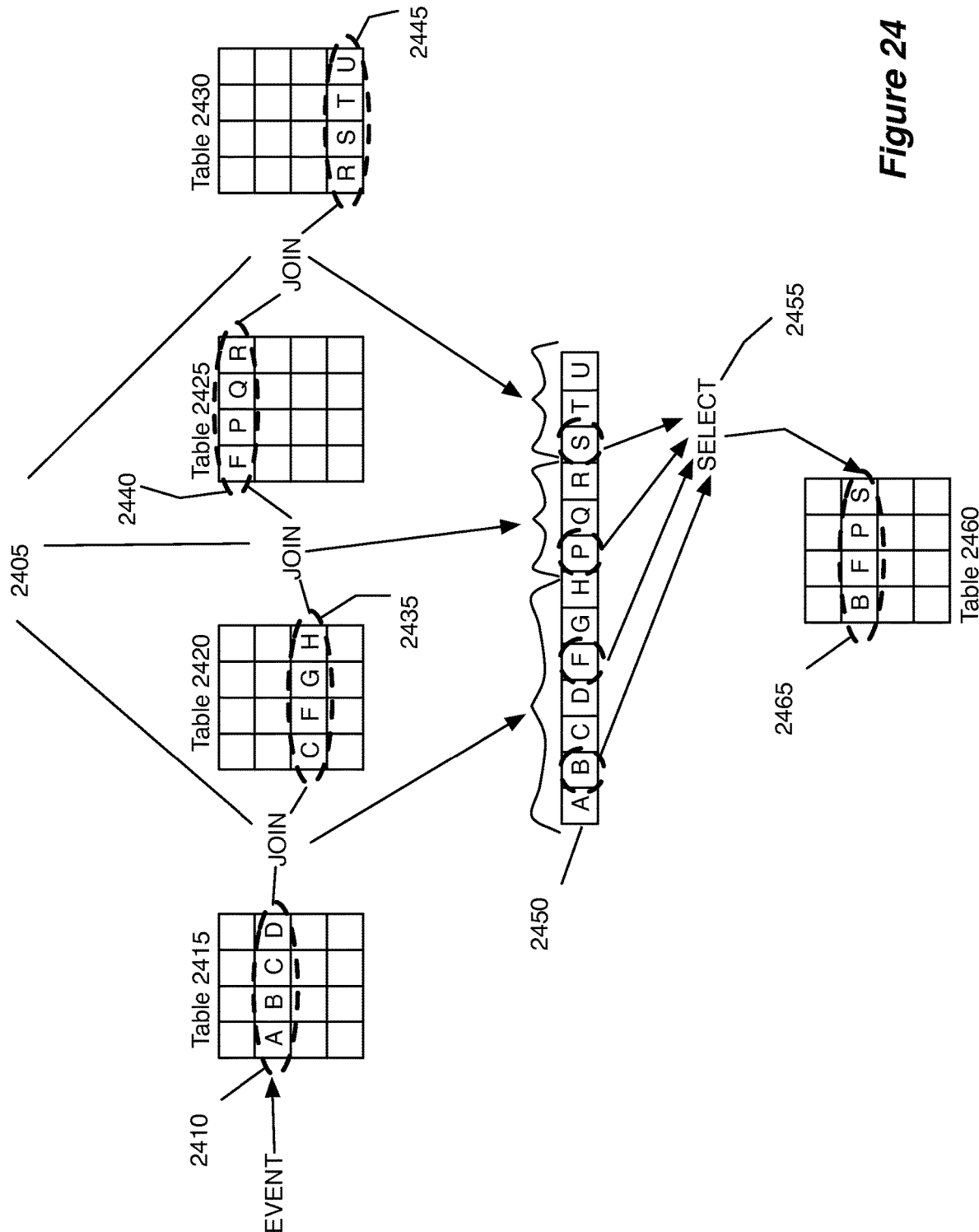
FIG. 24 illustrates an example of a set of join operations.

FIG. 24 illustrates an example of a set of join operations 2405. This set of join operations is performed when an event is detected with respect to record 2410 of an input table 2415. The join operations in this set specify that the modified record 2410 in table 2415 should be joined with the matching record(s) in table 2420, this joined record should then be joined with the matching record(s) in table 2425, and this resulting joined record should finally be joined with the matching record(s) in table 2430.

Two records in two tables "match" when values of a common key (e.g., a primary key and a foreign key) that the two tables share are the same, in some embodiments. In the example in FIG. 24, the records 2410 and 2435 in tables 2415 and 2420 match because the values C in these records match. Similarly, the records 2435 and 2440 in tables 2420 and 2425 match because the values F in these records match. Finally, the records 2440 and 2445 in tables 2425 and 2430 match because the values R in these records match. The joining of the records 2410, 2435, 2440, and 2445 results in the combined record 2450. In the example shown in FIG. 24, the result of a join operation between two tables (e.g., tables 2415 and 2420) is a single record (e.g., ABCDFHG). However, in some cases, the result of a join operation between two tables may be multiple records.

Even though in the example illustrated in FIG. 24 a record is produced as the result of the set of join operations, the set of join operations in some cases might result in a null record. For instance, as further described in sub-section D below, a null record results when the set of join operations terminates on the first join because the detected event relates to a LDPS not managed by a particular instance of the virtualization application. Accordingly, at 2320, the process determines whether the query plan has failed (e.g., whether the set of join operations resulted in a null record). If so, the process ends. In some embodiments, the operation 2320 is implicitly performed by the table processor when it terminates its operations upon the failure of one of the join operations.

When the process 2300 determines (at 2320) that the query plan has not failed, it stores (at 2325) the output resulting from the execution of the query plan in one or more of the output tables. In some embodiments, the table processor 1930 performs this operation by (1) performing a select operation to select a subset of the data values from the record(s) produced by the join operations, and (2) writing the selected subset of data values in one or more RE output tables 1945. FIG. 24 illustrates an example of this selection operation. Specifically, it illustrates the selection of values B, F, P and S from the combined record 2450 and the writing of these values into a record 2465 of an output table 2460.

As mentioned above, the RE output tables can be categorized in some embodiments as (1) a RE input table only, (2) a CA output table only, or (3) both a RE input table and a CA output table. When the execution of the query plan results in the modification of a CA output table, the process 2300 publishes (at 2330) the changes to this output table to the virtualization application. In some embodiments, the publisher 1955 detects changes to the CA output tables 2005 of the RE output tables 1945, and in response, it propagates the modified data tuple in the modified CA output table into the virtualization application.

At 2335, the process determines whether the execution of the query plan resulted in the modification of a RE input table. This operation is implicitly performed in some embodiments when the event processor 1922 determines that the output table that was modified previously at 2325 modified a RE input table. As mentioned above, a RE output table 1945 can also be a RE input table 1910 that generates an event that causes the rules engine to perform another query plan after it is modified by the rules engine. Such an event is referred to as an internal input event, and it is to be contrasted with an external input event, which is an event that is caused by a RE input table modification made by the control application 1905 or the NIB monitor 1950. When the process determines (at 2330) that an internal input event was created, it returns to 2310 to perform operations 2310-2335 for this new internal input event. The process terminates when it determines (at 2335) that the execution of the query plan did not result in an internal input event.

One of ordinary skill in the art will recognize that process 2300 is a conceptual representation of the operations used to map a change in one or more input tables to one or more output tables. The specific operations of process 2300 may not be performed in the exact order shown and described. The specific operations may not be performed in one continuous series of operations, and different specific operations may be performed in different embodiments. For instance, the process 2300 in some embodiments batches up a set of changes in RE input tables 1910 and identifies (at 2310) a query plan associated with the set of detected RE input table events. The process in these embodiments executes (at 2320) the query plan for the whole set of the RE input table events rather than for a single RE input table event. Batching up the RE input table events in some embodiments results in better performance of the table mapping operations. For example, batching the RE input table events improves performance because it reduces the number of instance that the process 2300 will produce additional RE input table events that would cause it to start another iteration of itself.

D. Parallel, Distributed Management of LDPS'

As mentioned above, some embodiments implement the nLog engine as a distributed table mapping engine that is executed by different control applications of different controller instances. To implement the nLog engine in a distributed manner, some embodiments partition the management of the logical datapath sets by specifying for each particular logical datapath set only one controller instance as the instance responsible for specifying the NIB records associated with that particular logical datapath set. Partitioning the management of the LDPS' also assigns in some embodiments the table mapping operations for each LDPS to the nLog engine of the controller instance responsible for the LDPS.

As described above by reference to FIG. 20, some embodiments partition the nLog table mapping operations across the different instances by designating the first join operation that is performed by each nLog instance to be based on the LDPS parameter. This designation ensures that each nLog instance's join operations fail and terminate immediately when the instance has started a set of join operations that relate to a LDPS that is not managed by the nLog instance.

Figure 25:
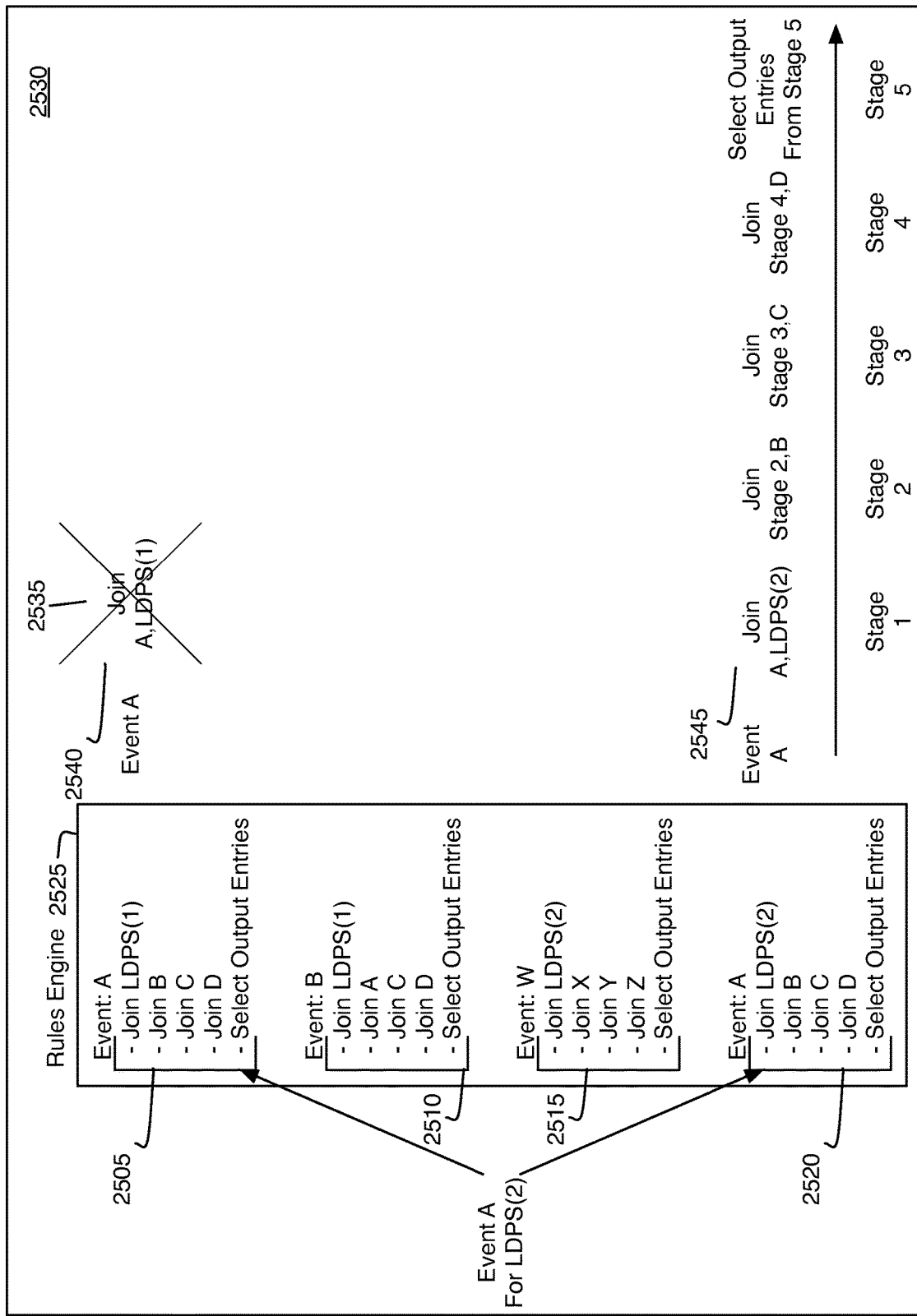
FIG. 25 illustrates an example of a set of join operations failing when they relate to a LDPS that does not relate to an input table event that has occurred.

FIG. 25 illustrates an example of a set of join operations failing when they relate to a LDPS that does not relate to an input table event that has occurred. Specifically, this figure illustrates four query plans 2505, 2510, 2515 and 2520 of a rules engine 2525 of a particular control application instance 2530. Two of these query plans 2510 and 2515 specify two sets of join operations that should be performed upon occurrence of input table events B and W respectively, while two of the query plans 2505 and 2520 specify two sets of join operations that should be performed upon occurrence of input table event A.

In the example illustrated in FIG. 25, the two query plans 2510 and 2515 are not executed because an input table event A has occurred for a LDPS 2 and these two plans are not associated with such an event. Instead, the two query plans 2505 and 2520 are executed because they are associated with the input table event A that has occurred. As shown in this figure, the occurrence of this event results in two sets of join operations being performed to execute the two query plans 2505 and 2520. The first set of join operations 2540 for the query plan 2505 fails because the query plan 2505 is specified for a LDPS 1, which is a LDPS not managed by the control application instance 2530. This set of join operations fails on the first join operation 2535 because it is a join with the LDPS table, which for the control application instance 2530 does not contain a record for the LDPS 1. In some embodiments, even though the first join operation 2535 has failed, the remaining join operations (not shown) of the query plan 2540 will still be performed and fail. In other embodiments, the remaining join operations of the query plan 2540 will not be performed as shown.

The second set of join operations 2545 does not fail, however, because it is for the LDPS 2, which is a LDPS managed by the control application instance 2530 and therefore has a record in the LDPS table of this application instance. This set of join operations has four stages that each performs one join operation. Also, as shown in FIG. 25, the set of join operations terminates with a selection operation that selects a portion of the combined record produced through the join operations.

Figure 26A:
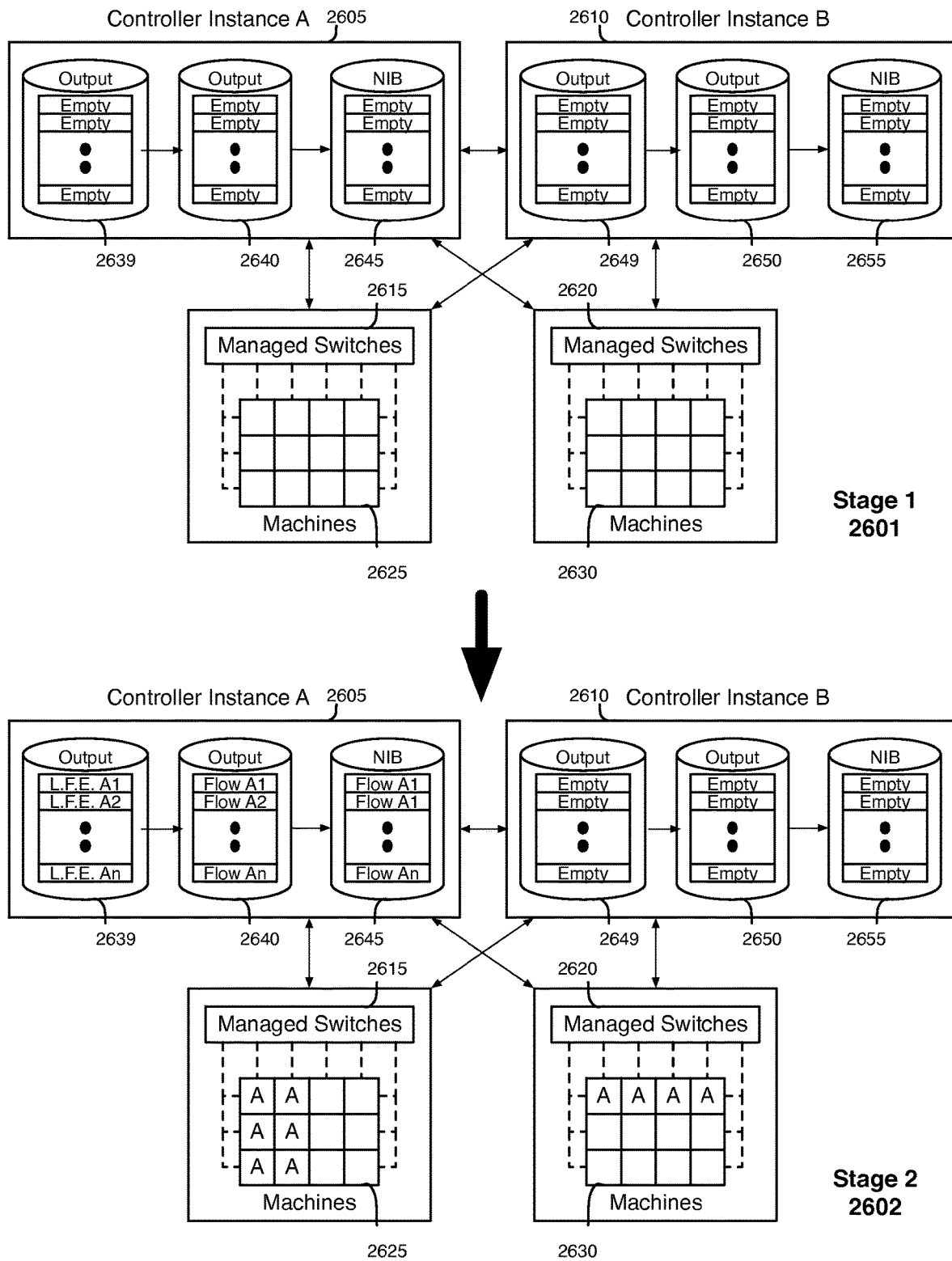
FIGS. 26A-26B illustrate an example of reducing workloads on nLog instances.
Figure 26B:
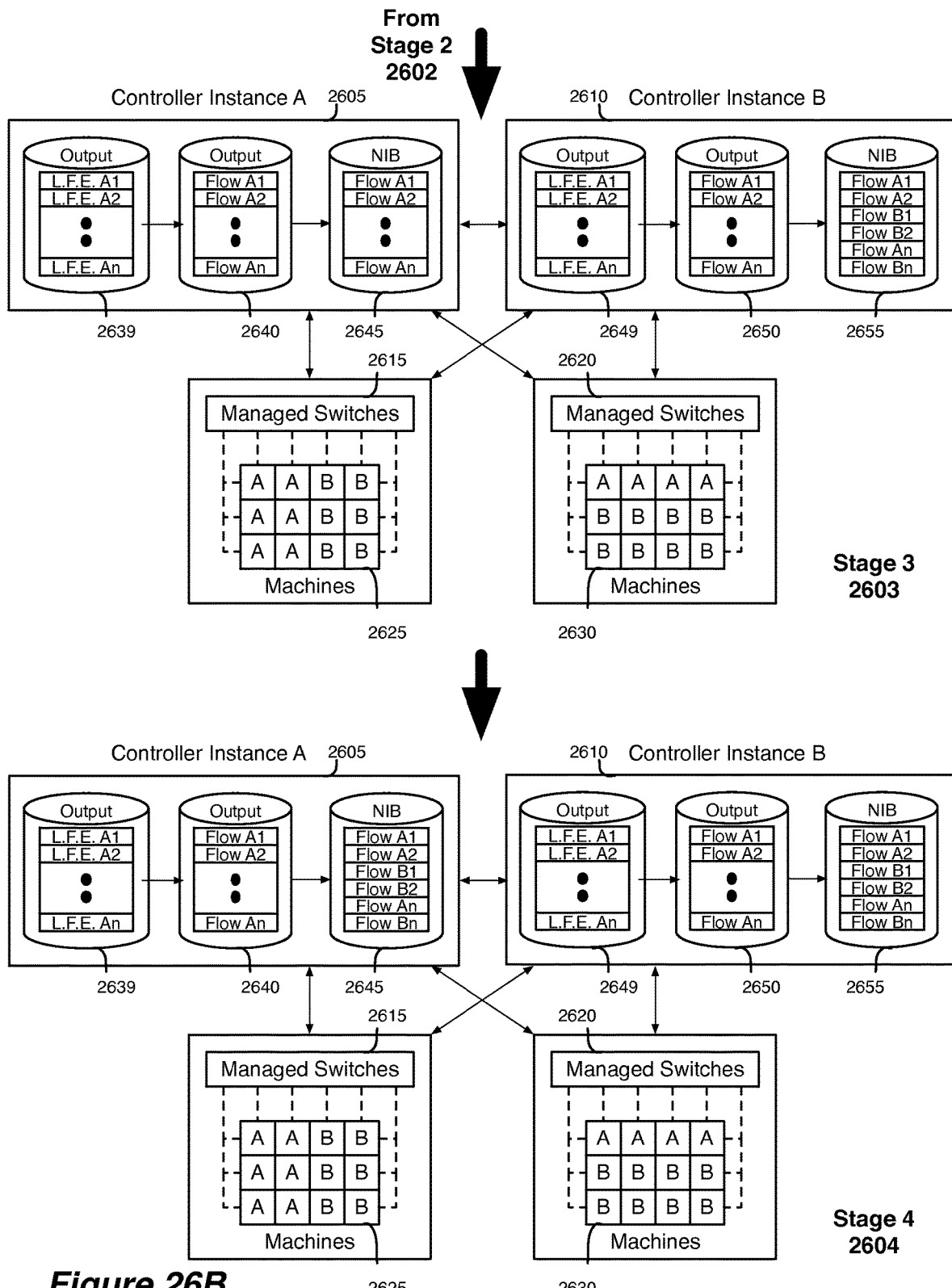

The distribution of the nLog table mapping operations across several nLog instances reduces the load on each nLog instance and thereby increases the speed by which each nLog instance can complete its mapping operations. FIGS. 26A-26B illustrate an example that describes this reduction in workload. Specifically, these figures illustrate an example where two controller instances 2605 and 2610 are responsible for the control application functionality of two different LDPS' A and B for different tenants A and B of a multi-tenant computing environment. The two controller instances manage two sets of managed switches 2615 and 2620. Each of the two sets of managed switches manages a set of machines 2625 or 2630, which may be host machines running on dedicated machines, or may be virtual machines running on shared machines.

In four stages, these figures illustrate the results of the table mapping operations that are performed by the control applications of these two different controller instances. The first stage 2601 shows that no machines have been deployed in the managed system for either tenant A or tenant B. The second stage 2602 shows the computing environment with several machines that have been deployed for tenant A in the two sets of machines 2625 and 2630. It also shows the CA output table 2639 of the control application of the controller instance 2605 with logical forwarding entries (shown as "L.F.E." in these figures) for the LDPS A that were specified by this instance's control application. In addition, the second stage 2602 shows output table 2640 of the virtualization application of the controller instance 2605 with flow entries for the LDPS A that were specified by this instance's virtualization application. The second stage further shows the NIB 2645 of the controller instance 2605 containing the flow entries for the LDPS A. At this stage, the NIB 2645 also contains LDPS data relating to LDPS A in some embodiments, but this data is not shown in FIGS. 26A-26B.

The third stage 2603 in FIG. 26B shows that the flow entries for the LDPS A have migrated to the NIB 2655 of the controller instance 2610. This migration occurs because of the NIB replication across the controller instances. Also, this replication causes LDPS data relating to LDPS A to be copied to the NIB 2655. The third stage 2680 further shows the computing environment with several machines that have been deployed for tenant B in the two sets of machines 2625 and 2630. It also shows the CA output table 2649 of the control application of the controller instance 2610 with logical forwarding entries for the LDPS B that were specified by this instance's control application. In addition, the third stage 2603 also shows the output table 2650 of the virtualization application of the controller instance 2610 with flow entries for the LDPS B that were specified by this instance's virtualization application. The third stage further shows the NIB 2655 of the controller instance 2610 containing the flow entries for the LDPS B. At this stage, the NIB 2655 also contains LDPS data relating to LDPS B in some embodiments, but this data is not shown in FIGS. 26A-26B.

The fourth stage 2604 shows that the flow entries for the LDPS B have migrated to the NIB 2645 of the controller instance 2605. This migration occurs because of the NIB replication across the controller instances. This replication also causes LDPS data relating to LDPS B to be copied to the NIB 2645. As shown at the stage 2604, the NIBS 2645 and 2655 have LDPS data relating to both LDPS A and LDPS B. However, the CA output tables of one controller instance do not store logical forwarding entries for the LDPS of another controller instance. That is, in this example, the CA output tables 2639 of controller instance A do not store the logical forwarding entries for the LDPS B and the CA output tables 2649 of controller instance B do not store the logical forwarding entries for the LDPS A. This depiction is meant to illustrate that some embodiments partition the storage of the logical state data across several controller instances. This allows these embodiments to keep the size of tables (e.g., the input or output tables) small in order to increase the speed by which each nLog instance can complete its mapping operations as described above. For a similar reason, in some embodiments, the input tables (not shown) of a controller instance only contains logical records that are for the LDPS's of another controller instance.

While the input and output tables of each controller instance in some embodiments only store or practically only store logical state data for only the LDPS' for which the controller instance is responsible, the NIB for each controller instance in some of these embodiments contains all or practically all of the logical state data (e.g., except some logical port statistics that are stored in the DHTs of controller instances that are not replicated across) for all LDPS of all controller instances. However, other embodiments will partition the logical state data for the LDPS's across the NIBs of different controller instances.

V. Use Cases

A. Logical Switch FIG. 27 conceptually illustrates a logical switch 2700 of some embodiments. Many of the logical switches illustrated in the figures through this application may be the same or similar to the logical switch 2700 as described below. The logical switch 2700 receives network data (e.g., packets) through a set of ingress ports, ports 1 through N. The logical switch 2700 then sends the network data out through a set of egress ports, ports 1 through N, according to the routing criteria specified in the forwarding tables 2705. As described above, a logical switch is mapped to one or more physical machines/switches.

The ingress ports 1-N, represent a set of ports through which the logical switch 2700 receives network data. The ingress ports may include different number of ingress ports in different embodiments. As shown, the ingress ports can receive network data that is external to the logical switch 2700, which is indicated as incoming packets. When the ingress ports 1-N receive network data, the logical switch 2700 uses the forwarding tables 2705 to find one or more egress ports to which to forward the network data.

The forwarding tables 2705 represent a set of forwarding tables for routing and modifying network data that the logical switch 2700 received through the ingress ports 1-N. In some embodiments, the forwarding tables 2705 include a set of records (e.g., flow entries) that instruct the logical switch 2700 to route and/or modify network data and send the network data to the egress ports based on defined routing criteria. Examples of routing criteria include source media access control (MAC) address, destination MAC, packet type, source Internet Protocol (IP) address, destination IP address, source port, destination port, and/or virtual local area network (VLAN) identifier, among other routing criteria. In some embodiments, the logical switch 2700 routes network data to a particular egress port according to the routing criteria.

In some embodiments, network data that switch 2700 receives and sends are in the form of packets. A packet includes a header and a payload in some embodiments. The header includes a set of fields that contains information used for routing the packet through a network. Switches may determine switching decisions based on the information contained in the header and may, in some cases, modify some or all of the header fields. Some embodiments determine switching decisions based on flow entries in the logical switches' forwarding tables.

The forwarding tables 2705 include an ingress ACL table 2710, L2 (i.e., a data link layer) forwarding table 2715, and an egress ACL table 2720 in some embodiments. In some embodiments, the logical switch 2700 performs logical forwarding lookups to determine to which egress port(s) that the logical switch 2700 should route a packet received through an ingress port using the forwarding tables 2705. Specifically, the logical forwarding lookups include a logical ingress ACL lookup for determining access control when the logical switch receives the packet using the ingress ACL table 2710. The logical forwarding lookups include a logical L2 lookup for determining to which egress port(s) to send the packet using the L2 forwarding table 2715. The logical forwarding lookups also include a logical egress ACL lookup for determining access control before the logical switch routes the packet out of the logical switch using the egress ACL table 2720. These logical lookups are performed based on the information in the header of a packet or the logical context tag of the packet in some of these embodiments. For example, flow entries defined to match against the information in the header or the logical context tag of the packet may be used to perform these logical forwarding lookups.

Figure 27:
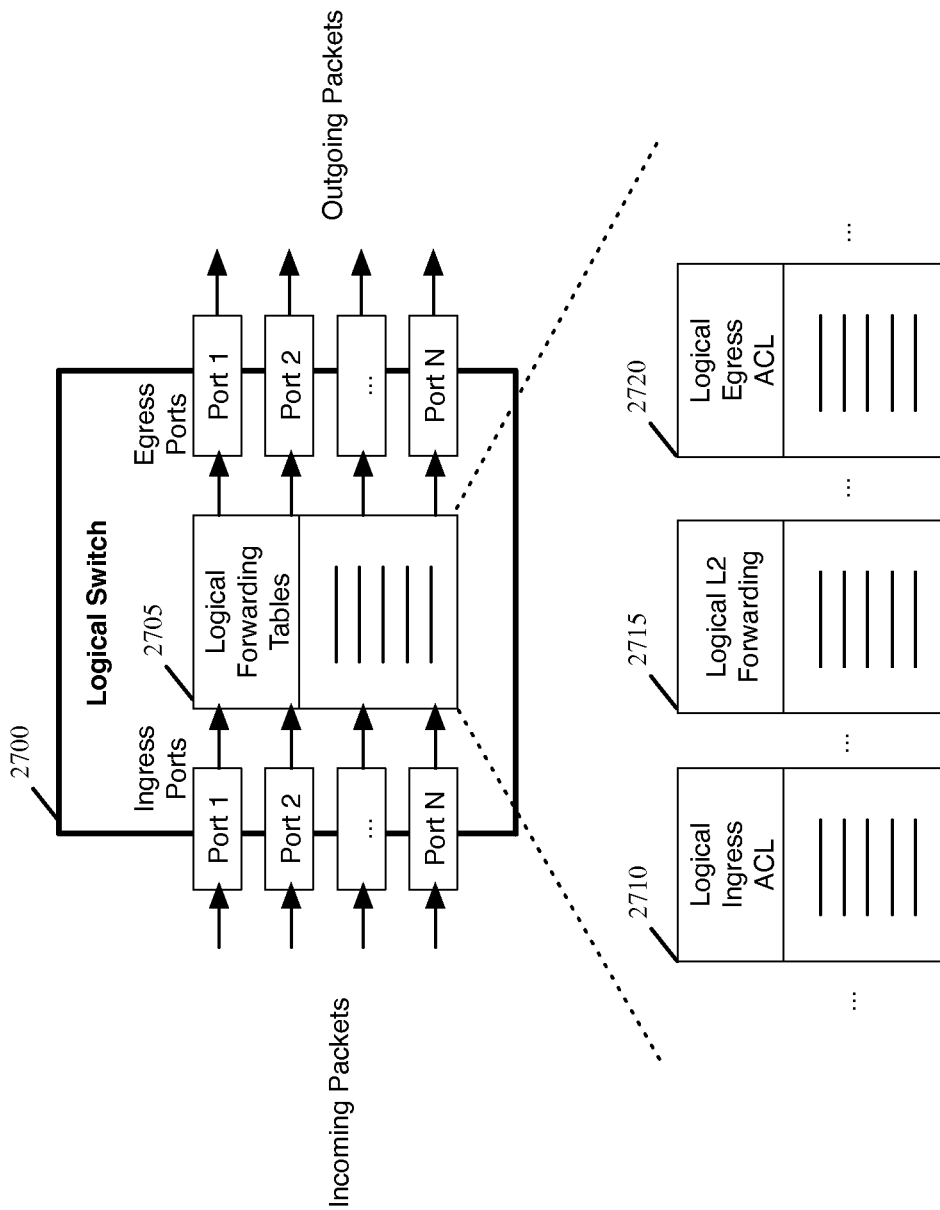
FIG. 27 conceptually illustrates a logical switch of some embodiments.

The egress ports 1-N conceptually represent a set of ports through which the logical switch 2700 sends network data out of the logical switch. The egress ports 1-N may include different number of egress ports in different embodiments. In some embodiments, some or all of the egress ports may overlap with some or all of the ingress ports. For instance, the egress ports 1-N are the same as the ingress ports 1-N as shown. As illustrated in FIG. 27, the egress ports 1-N receives network data from the ingress ports 1-N. When the egress ports 1-N receive network data based on the routing criteria specified in the forwarding tables 2705, the logical switch 2700 sends the network data out of the egress ports 1-N, which is indicated as outgoing packets.

B. Port Isolation

Figure 28:
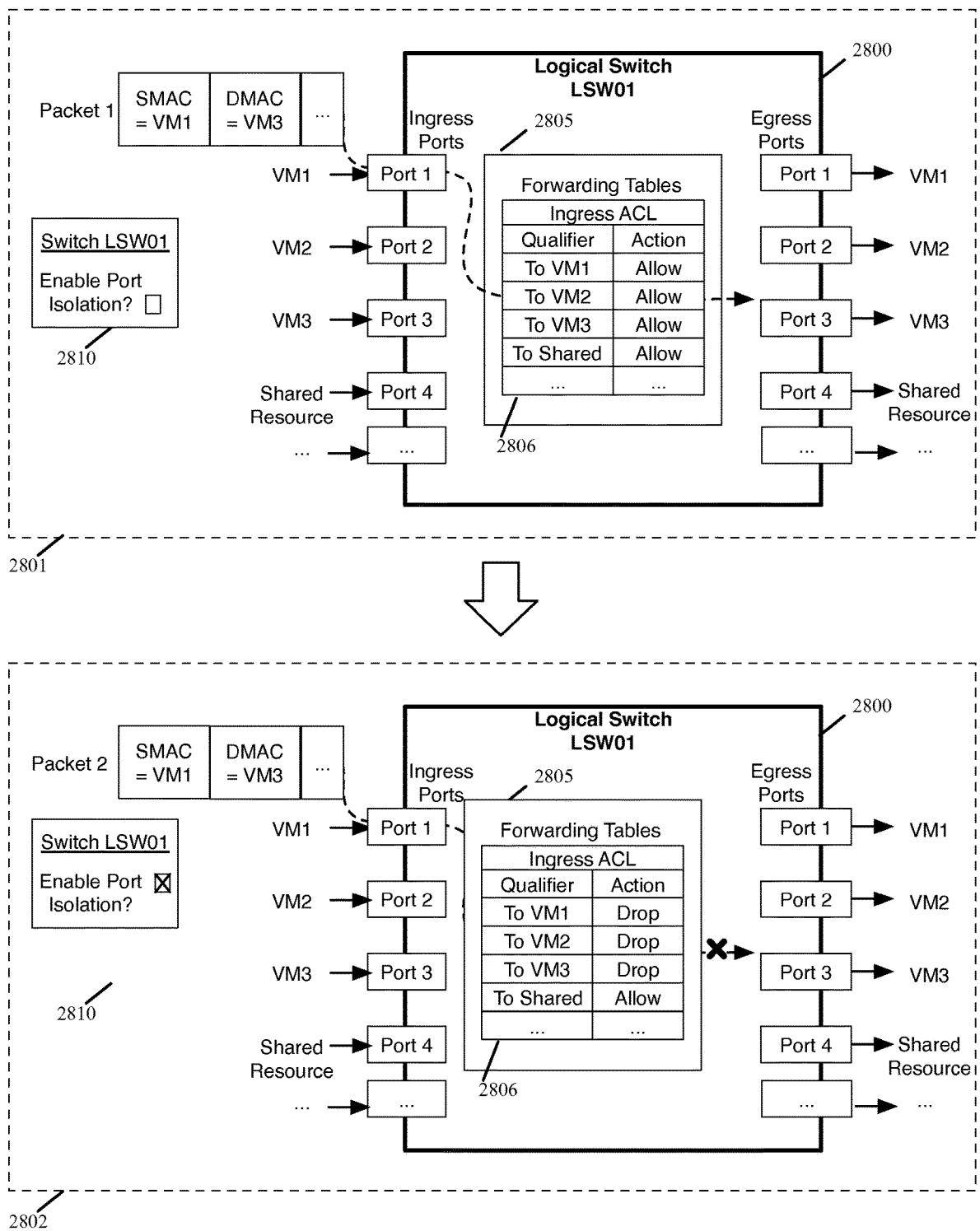
FIG. 28 conceptually illustrates an example of enabling port isolation for a logical switch of some embodiments.

FIG. 28 conceptually illustrates an example of enabling port isolation for a logical switch 2800 of some embodiments. Specifically, this figure illustrates the logical switch 2800 at two different stages 2801 and 2802 to show different forwarding behaviors of the logical switch 2800 before and after the logical switch 2800 is enabled for port isolation. Port isolation is a technique to apply to a logical switch in order to drop packets sent from one port to another port of the switch. That is, the switch enabled for port isolation is prevented from internally routing packets. The port isolation is often applied to implement private virtual local area network (PVLAN).

As shown, FIG. 28 illustrates that the logical switch 2800 includes logical ports 1-4 and other ports. These ports are ingress ports as well as egress ports in this example. The logical switch 2800 also includes forwarding tables 2805, which include an ingress ACL table 2806 among other forwarding tables. The logical switch 2800 is similar to the logical switch 2700 described above by reference to FIG. 27. That is, the logical switch 2800 receive network data (e.g., packets) through the ingress ports and routes the network data based on the flow entries specified in the forwarding tables 2805 to the egress ports, through which the logical switch 2800 sends out the network data. FIG. 28 also illustrates a user interface 2810. The user interface 2810 is provided by a control application in some embodiments. In some embodiments, the user interface 2810 is a graphical user interface (GUI). In some such embodiments, the user interface 2810 may also include a command-line interface. The GUI 2810 shows NIB states upon user's request to query the NIB. The GUI 2810 also receives user inputs which will be parsed and processed by a control application to generate logical datapaths.

A virtual machine (VM) 1 sends and receives network data to and from the logical switch 2800 through port 1. That is, port 1 is serving both as an ingress port and an egress port for VM 1. Likewise, VM2 and VM3 are virtual machines that use ports 2 and 3, respectively, to send and receive data to and from the logical switch 2800. A shared resource is a machine (e.g., a printer, a file server, etc.) that is used by other machines by exchanging network data through the logical switch 2800. The shared resource uses port 4 to send and receive the network data that is originated from or sent to other machines (e.g., VMs 1-3).

The logical switch 2800 performs logical ingress lookups using the ingress ACL table 2806 in order to control the network data (e.g., packets) coming through the ingress ports. For instance, the logical switch 2800 reads information stored in the header of a packet that is received through an ingress port, looks up the matching flow entry or entries in the ingress ACL table 2806, and determines an action to perform on the received packet. As described above, a logical switch may perform further logical lookups using other forwarding tables that are storing flow entries.

In the first stage 2801, the logical switch 2800 receives packet 1 from VM1 through port 1. Packet 1 includes in the packet header a source MAC address and a destination MAC address. The source MAC address (SMAC) field of the header includes the MAC address of VM1 to indicate the packet 1 is sent by the VM1. The destination MAC address (DMAC) field includes the MAC address of VM3 to indicate that packet 1 is sent to VM3. The logical switch 2800 performs an ingress lookup. The logical switch 2800 reads the header of packet 1, specifically the destination MAC address field, and sees that the packet is sent to VM3. The ingress ACL has an entry for packets that are sent to VM3. Accordingly, the logical switch 2800 performs the remaining logical lookups using other logical forwarding tables (not shown) to determine to which egress port the logical switch 2800 should send the packet. In this example, the results of the remaining logical lookups lead the packet to VM3 through port 3.

As shown in the stage 2801, the ingress ACL table 2806 allows packets sent from any VM to any other VM that are coupled to the logical switch 2800, pending the results of other logical lookups performed by the logical switch 2801. Specifically, the VMs can send packets to any VMs as well as to the shared resource. That is, the ingress ACL does not drop any packets sent to any ports. This is because the logical switch 2800 is not enabled for port isolation, as indicated by the GUI 2810.

In the second stage 2802, a user using the GUI 2810 of control application enables the logical switch 2800 for port isolation in this example. As will be described further below, the control application translates the user's input into a table, which the control application uses to generate logical datapath(s). The ingress ACL table 2806 is modified according to the user input. As shown, the ingress ACL table 2806 specifies that any packets from a VM to another VM that are coupled to the logical switch 2800 should be dropped. Specifically, the ingress ACL table 2806 specifies that packets sent from one VM of VMs 1-3 to another VM of VMs 1-3 should be dropped in this example. For instance, packets sent from VM1 to VM2 or VM3 will be dropped while packets sent from VM1 to VM1 itself would not be dropped. Accordingly, packet 2 that is received by the logical switch 2800 through port 1 is dropped as shown because the packet includes VM3's MAC address as the destination MAC address. The logical switch 2800 in some embodiments discards packet 2 and does not perform any more logical lookups for packet 2.

As shown in the stage 2802, the VMs are still able to send packets to the shared resource, pending the results of other logical lookups performed by the logical switch 2800. Also, the shared resource is still able to send packets to VMs coupled to the logical switch 2800. This is because the port isolation allows the VMs to send packets to the shared resource and the shared resource to respond back to the VMs in some embodiments.

Different embodiments implement port isolation differently using different combinations of the forwarding tables. For instance, FIG. 28 illustrates some embodiments in which the ingress ACL table 2806 is changed to enable the logical switch 2800 for port isolation. In other embodiments, another ACL table (not shown) that has a higher priority than the ingress ACL table 2806 is created or modified in order to enable the switch for port isolation. That is, the higher priority ACL table will specify that traffic from one VM of the logical switch 2800 to another VM of the switch should be dropped, while leaving the ingress ACL table 2806 unchanged from the stage 2801 to the stage 2802. In these embodiments, the logical switch 2800 looks up the higher priority ACL table first and determine that the packets from one VM to another VM of the switch should be dropped.

Figure 29A:
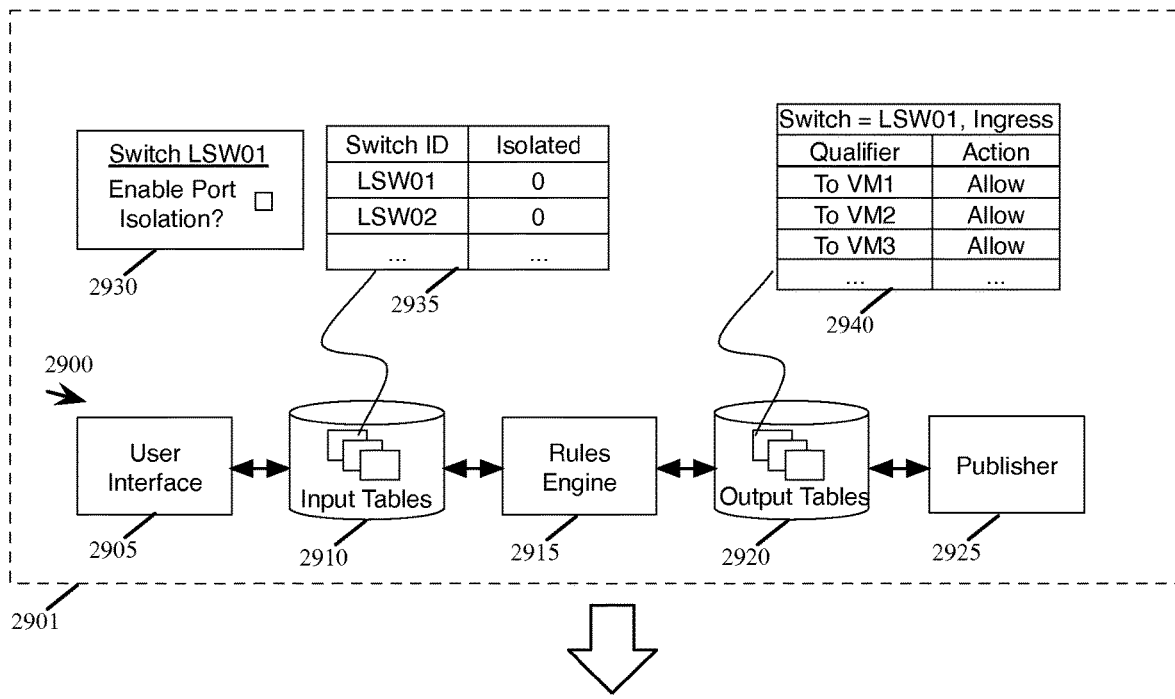
FIGS. 29A-29B conceptually illustrate an example of enabling port isolation for a logical switch by the control application of some embodiments.
Figure 29A:
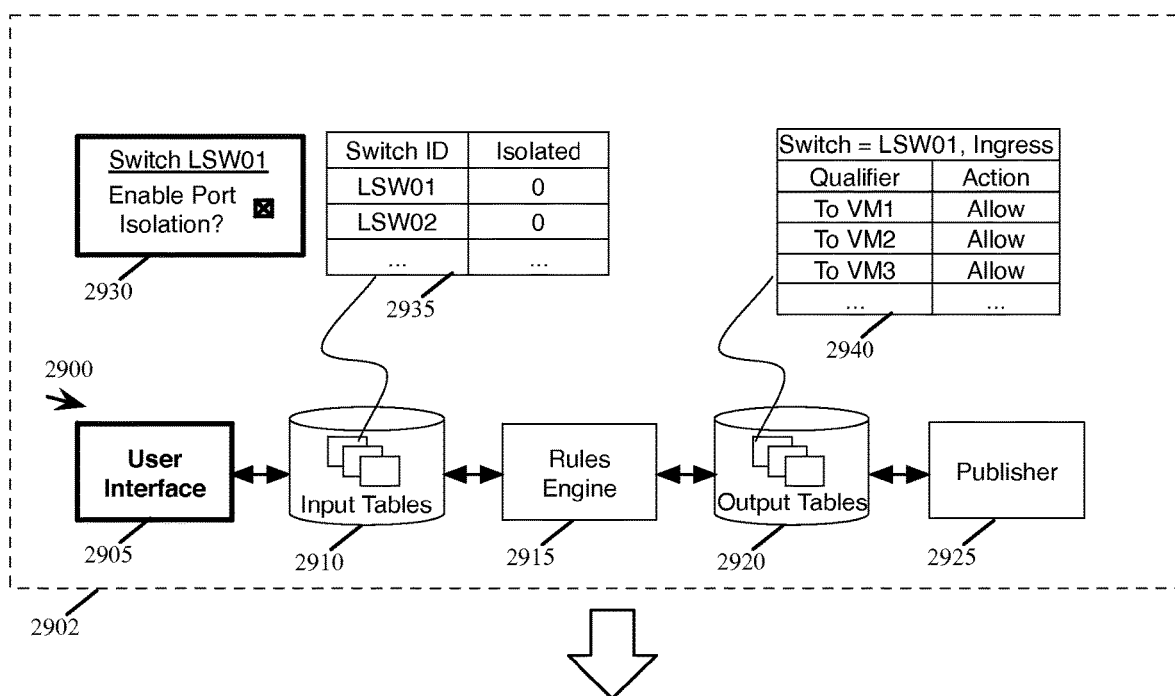
Figure 29B:
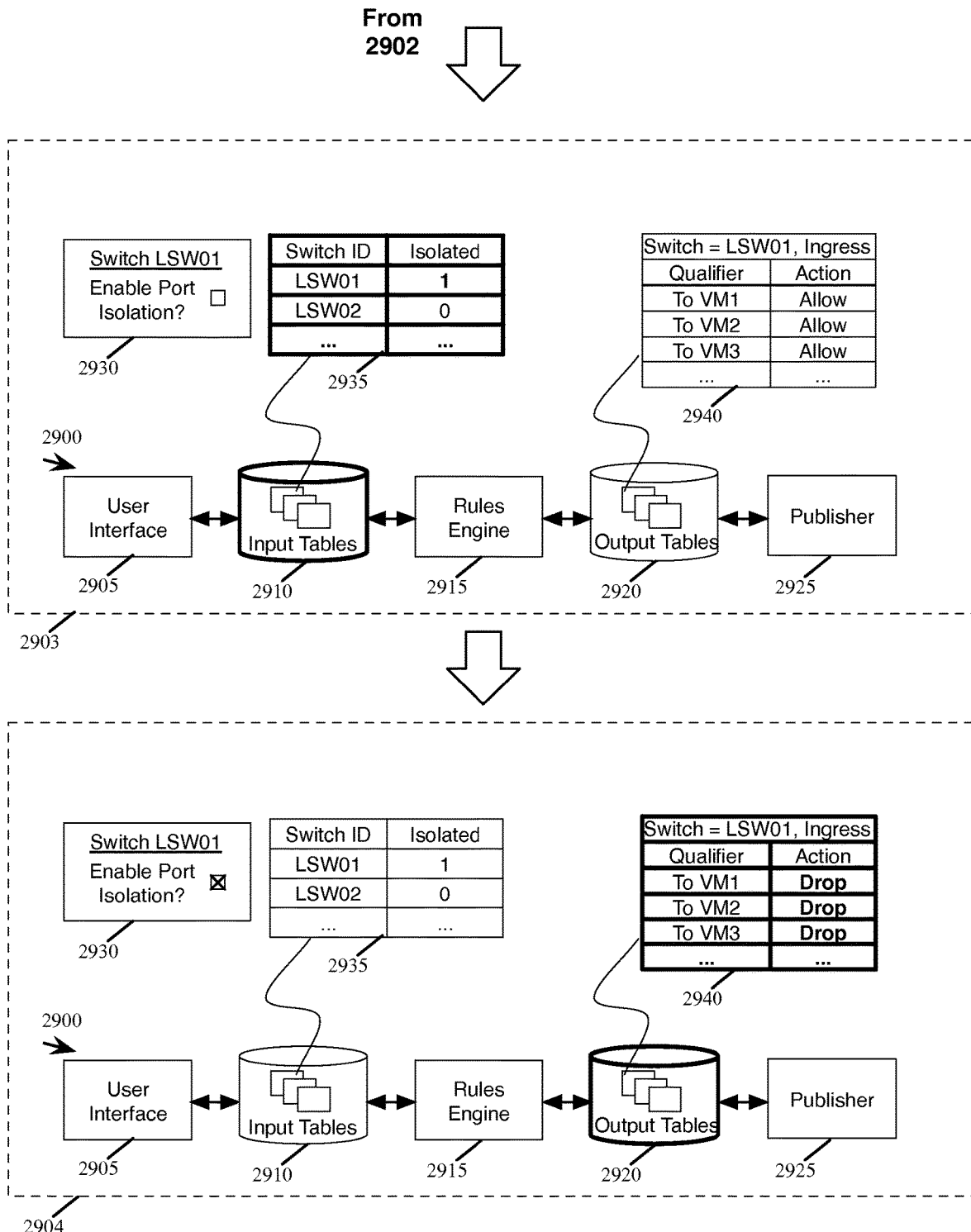

FIGS. 29A-29B conceptually illustrate an example of enabling port isolation for a logical switch by control application 2900 of some embodiments. FIGS. 29A-29B illustrate in four different stages 2901, 2902, 2903, and 2904 that the control application 2900 enables port isolation for the logical switch 2800 described above by reference to FIG. 28. As described above, a control application generates flow entries and/or logical datapaths based on inputs the control application receives from user or based on the network events the control application detects by monitoring a NIB. As shown, these figures illustrate that the control application 2900 includes a user interface 2905, RE input tables 2910, a rules engine 2915, RE output tables 2920, and a publisher 2925. The figures also illustrate a GUI 2930 and tables 2935 and 2940.

The user interface 2905 in some embodiments provides a user with a management tool with which the user can view and/or modify a logical network state. Different embodiments provide different management tools to the user. For instance, the user interface 2905 in some embodiments provides a graphical tool such as the GUI 2930. Instead of, or in conjunction with, a graphical tool, other embodiments may provide the user with a command-line tool or any other type of management tool. The user interface 2905 receives inputs from the user through the management tool and processes the received inputs to create, populate and/or modify one or more input tables 2910.

The GUI 2930 conceptually represents a management tool provided by the user interface 2905 to the user. In some embodiments, the GUI 2930 is provided as a web application and thus can be opened up with a web browser. With GUI 2930, the user can manage the logical network elements (e.g., a logical switch), e.g., by entering inputs and receiving responses from the control application. For instance, the user can query whether port isolation is enabled for a logical switch that the user is managing.

The RE input tables 2910 are similar to the RE input tables 1910 described above by reference to FIG. 19. As described above, a RE input table in some cases represents the state of the logical network that the user is managing. For instance, the RE input table 2935 is a table that stores port isolation information of the logical switches that the user is managing through the control application. The control application modifies RE input tables with user inputs that the control application receives through the management tool or with any network events that the control application detects by monitoring a NIB. After the control application 2900 modifies RE input tables, the control application 2900 uses the rules engine 2915 to process the modified RE input tables. It is to be noted that the input and output tables depicted and described in this Section (i.e., Section V) are conceptual representations of tables. The actual tables used in some embodiments of the invention may not look exactly like these conceptual representations.

The rules engine 2915 is similar to the rules engine 1925 described above by reference to FIG. 19. The rules engine 2915 of different embodiments performs different combinations of database operations on different sets of RE input tables to populate and/or modify different sets of output tables 2920. For instance, the rules engine 2915 modifies logical datapaths specified in the output table 2940 when the RE input table 2935 is changed to indicate that a logical switch is enabled for port isolation. The output table 2940 includes flow entries and/or logical datapaths that specify the actions for the logical switch to perform on the network data sent from one port to another of the logical switch. In addition to the input table 2935, the rules engine 2915 may use other input tables that store the data link layer addresses of the ports in the logical switch in order to modify the output table 2940.

The publisher 2925 is similar to the publisher 1955 described above by reference to FIG. 19, in that the publisher 2925 publishes or sends the modified output tables in the output tables 2920 to a virtualization application (not shown). As described above, a virtualization application will map the logical datapaths to physical datapaths to update the NIB.

In the first stage 2901, the logical switch 2800 is not enabled for port isolation. As shown, the GUI 2930 displays whether the logical switch 2800, which is identified by an identifier value "LSW01," is enabled for port isolation. The unchecked box in the GUI 2930 indicates that the logical switch 2800 is not enabled for port isolation. The RE input table 2935 has an entry for the logical switch 2800. The RE input table 2935 indicates that the logical switch 2800 is not enabled for port isolation. A number of different scenarios may provide explanations for the values in the entries of the RE input table 2935. In one scenario, the user may have disabled port isolation for the logical switch 2800 by entering appropriate inputs to the management tool provided by the control application. In another scenario, the user has not yet managed the logical switch 2800 since the switch's creation. In this scenario, the control application may populate the RE input table with default values. Or, the control application may leave the "isolated" column empty (i.e., no values) instead of zeros to indicate the logical switch has not been configured for port isolation. In yet another scenario, the RE input table 2935 may have been populated by the control application in response to a change in the NIB that is detected by the control application.

The output table 2940 indicates that the logical switch 2800 allows network data from any of the VMs that are coupled to the logical switch 2800 to another of such VMs. In some cases, the action column for each row of the logical switch 2800 may not contain any value when the logical switch 2800 has not been configured for port isolation.

In the second stage 2902, the user provides input to indicate that user wishes to enable the logical switch 2800 for port isolation. As shown, the user has checked the box in the GUI 2930. The user interface 2905 receives the user's input through the GUI 2930 and parses the input. The user interface 2905 selects one or more RE input tables 2910 as well as functions and constants (not shown) in order to populate and/or modify one or more entries of the selected RE input tables. The user interface 2905 uses the parsed information (e.g., a switch identifier, etc.) to select the input tables to populate and/or modify. As shown, the input table 2935 and the output table 2940 have not been changed. That is, the values in the entries in these tables have not been changed from the values that these tables had in the stage 2901.

In the third stage 2903 illustrated in FIG. 29B, the user interface 2905 has selected the input table 2935 using the information that the user interface 2905 received from the user through the management tool. The user interface 2905 selects the RE input table 2935 because the RE input table 2935 indicates whether a logical switch that the user is managing is enabled for port isolation. With the switch identifier value "LSW01", the user interface 2905 in this example finds an entry for the logical switch 2800 in the RE input table 2935. The user interface 2905 then populates or modifies the value for the logical switch 2800 in the table to indicate that the logical switch 2800 is enabled for port isolation. The output table 2940 has not been changed. Although FIGS. 29A-29B illustrate that a RE input table is updated by the user interface 2905 based on the inputs that the user interface 2905 receives from the user, it is possible that the RE input tables are populated and/or modified based on the changes in the NIB that are detected by the control application as described above.

In the fourth stage 2904 illustrate in FIG. 29B, the control application 2900 uses the rules engine 2915 to map the changes in the input tables that are stored in the RE input tables 2910 to the logical datapaths specified in the output tables stored in the output tables 2920. The rules engine 2915 performs table mapping operations that map the entries in the input tables to the logical datapaths to be specified in the output tables. In this example, the rules engine 2915 maps the entry for the logical switch 2800 in the input table 2935 into logical datapaths for the network data that the logical switch 2800 routes. Specifically, the output table 2940 is a logical ingress ACL table for the logical switch 2800 in this example. The populated and/or modified entry for the logical switch 2800 in the input table 2935 indicates that the logical switch 2800 is to be enabled for port isolation. Therefore, the rules engine 2915 modifies the output table 2940, by performing table mapping operations, such that the logical switch 2800 drops network data sent from one of the VMs that are coupled to the logical switch 2800 to another of such VMs.

FIGS. 29A-29B illustrate only one RE input table and one output table for the simplicity of description. However, the rules engine 2915 performs table mapping operations using several more RE input tables 2910 and function and constant tables (not shown) that are similar to function and constant tables 1915 described above by reference to FIG. 19. For instance, the rules engine 2915 can use a table that contains a list of logical ingress and egress ports that a logical switch may have, a table that contains a list of VMs that are coupled to a logical switch through ingress and egress ports of the logical switch, a table for data link layer addresses (e.g., MAC addresses, etc.) of the VMs coupled to the logical switch, etc. When the rules engine 2915 completes the table mapping operations to modify the output table 2940, the logical switch 2800 is enabled for port isolation as described above by reference to the stage 2802 of FIG. 28.

Moreover, output tables other than the output table 2940 may be used to enable the switch for port isolation. For instance, the rules engine 2915 may create and/or modify a higher priority ACL table (not shown) instead of modifying the output table 2940 (an ACL table) in some embodiments. This higher priority ACL table will specify that the traffic from one VM of the switch to another VM of the switch is to be dropped. In these embodiments, hen port isolation is disabled for the switch, this higher priority ACL table will be removed or will not be used so that the output table 2940 allow traffics between VMs.

C. Port Security

Figure 30:
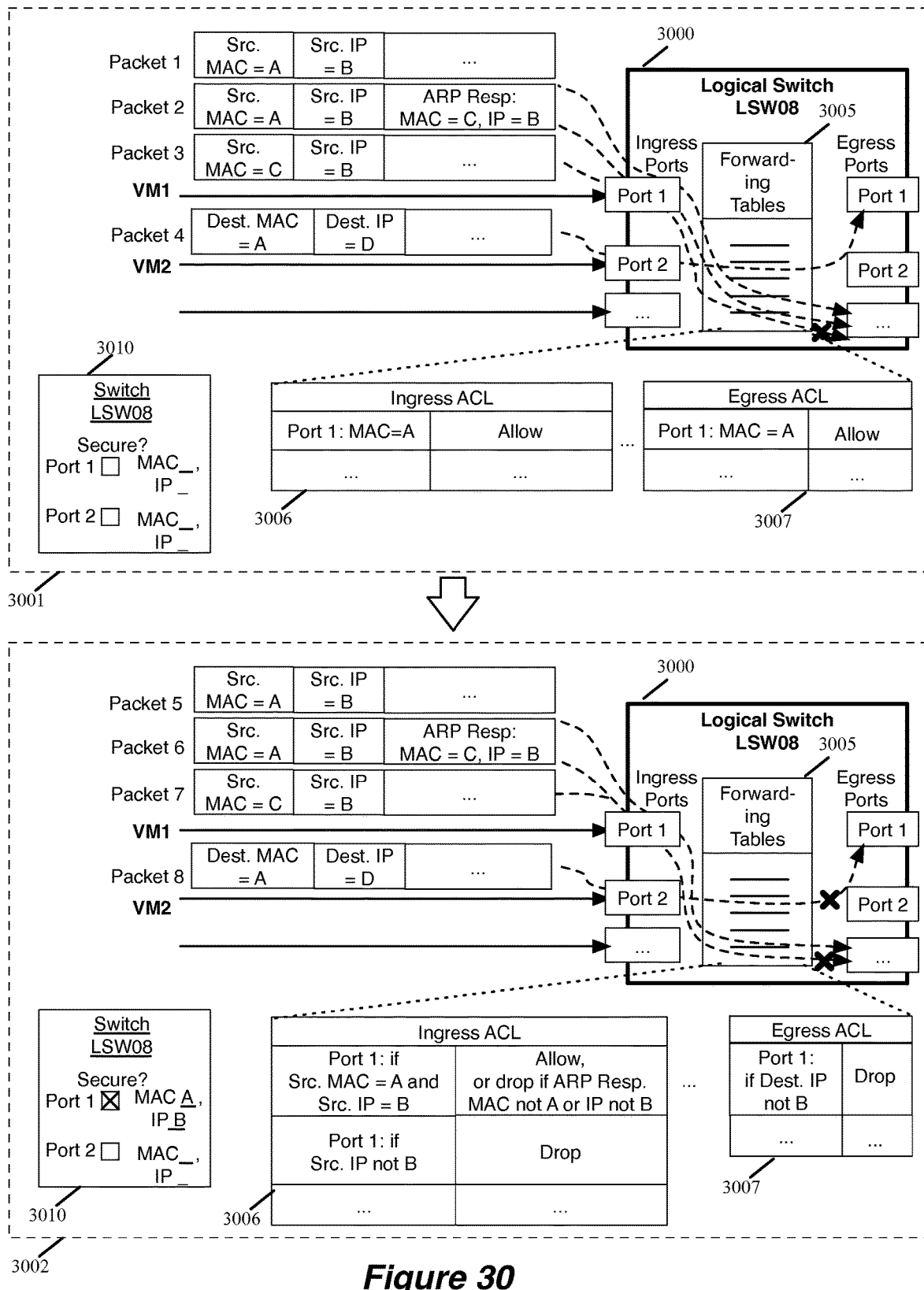
FIG. 30 conceptually illustrates an example of enabling port security for a logical port of a logical switch of some embodiments.

FIG. 30 conceptually illustrates an example of enabling port security for a logical port of a logical switch 3000 of some embodiments. Specifically, this figure illustrates the logical switch 3000 at two different stages 3001 and 3002 to show different forwarding behaviors of the logical switch 3000 before and after port 1 of the logical switch 3000 is enabled for port security. Port security in some embodiments is a technique to apply to a particular port of a switch such that the network data entering and existing the logical switch through the particular port have certain addresses that the switch has restricted the port to use. For instance, a switch may restrict a particular port to a certain MAC address and/or a certain IP address. That is, any network traffic coming in or going out through the particular port must have the restricted addresses as source or destination addresses. Port security may be enabled for ports of switches to prevent address spoofing.

As shown, FIG. 30 illustrates that the logical switch 3000 includes logical ports 1 and 2 and other ports. These ports are ingress ports as well as egress ports in this example. The logical switch 3000 also includes forwarding tables 3005, which include an ingress ACL table 3006 and an egress ACL table 3007 among other forwarding tables. The logical switch 3000 is similar to the logical switch 2700 described above by reference to FIG. 27. That is, the logical switch 3000 receive network data (e.g., packets) through the ingress ports and routes the network data based on the flow entries specified in the forwarding tables 3005 to the egress ports, through which the logical switch 3000 sends out the network data. FIG. 30 also illustrates a GUI 3010. The GUI 3010 is provided by a control application in some embodiments. The GUI 3010 displays NIB states upon user's request to query the NIB. The GUI 3010 also receives user inputs which will be parsed and processed by a control application to generate logical datapaths.

VM1 is a virtual machine that sends and receives network data to and from the logical switch 3000 through port 1. That is, port 1 of the logical switch 3000 is serving both as an ingress port and an egress port for VM1. VM1 has "A" as the virtual machine's MAC address. "A" represents a MAC address in the proper MAC address format (e.g., "01:23:45:67:89:ab"). This MAC address is a default MAC address assigned to VM1 when VM1 is created. In some embodiments, VM1's MAC address is virtual interface (VIF) addresses which may be the same or different than physical interface (PIF) address. An IP address is usually not assigned to a virtual machine but a MAC address is always assigned to a virtual machine when it is created in some embodiments. VM2 is a virtual machine that uses port 2 of the logical switch 3000 to send and receive data to and from the logical switch 3000.

The logical switch 3000 performs logical ingress lookups using the ingress ACL table 3006 in order to control the network data (e.g., packets) coming through the ingress ports. For instance, the logical switch 3000 reads information stored in the header of a packet that is received through an ingress port, looks up the matching flow entry or entries in the ingress ACL table 3006, and determines an action to perform on the received packet. As described above, a logical switch may perform further logical lookups using other forwarding tables that are storing flow entries.

In the first stage 3001, none of the logical ports of the logical switch 3000 is enabled for port security. As shown, the ingress ACL table 3006 shows that port 1 has a MAC address but does not impose an address restriction on packets that are coming in through port 1. The port 1's MAC address is a VIF address. The egress ACL table 3007 does not impose an address restriction on the packets going out of the switch 3000 through port 1. There may be other restrictions imposed by the ingress and egress ACLs 3006 and 3007 based on the VIF addresses of the ports which are not shown in this figure for simplicity.

In this example, the logical switch 3000 receives packets 1-3 from VM1 through port 1. Each of packets 1-3 includes in the packet header a source MAC address and a source IP address. Each of packets 1-3 may include other information (e.g., destination MAC and IP addresses, etc.) that the logical switch may use when performing logical lookups. For packet 1, the source MAC address field of the header includes a value "A" to indicate that the MAC address of the sender of packet 1 (i.e., VM1) is "A." Packet 1 also includes in the source IP address field of the header the IP address of VM1 a value "B" to indicate that the IP address of VM1 is "B." "B" represents an IP address in the proper IP address format (e.g., an IPv4 or IPv6 format, etc.). By putting "B" in packet 1 as a source IP address, VM1 indicates that the virtual machine's IP address is "B." However, VM1 may or may not have an IP address assigned to VM1.

Packet 2 includes in packet 2's header "A" and "B" as VM1's MAC and IP addresses, respectively. In addition, packet 2 includes an Address Resolution Protocol (ARP) response with "C" and "B" as VM1's MAC and IP addresses, respectively. "C" represents a MAC address in the proper MAC address format. VM1 is sending this ARP message in response to an ARP request that asks for information about a machine that has a certain IP address. As shown, the MAC addresses in the header of packet 2 and in the ARP response do not match. That is, VM1 did not use the virtual machine's MAC address (i.e., "A") in the ARP response. As shown in the stage 3001, the logical switch 3000 routes packets 1 and 2 from port 1 to the packets' respective egress ports because no address restriction has been imposed by the ingress ACL table 3006 and the egress ACL table 3007.

Packet 3 includes in packet 3's header "C" and "B" as VM1's MAC and IP addresses, respectively. The logical switch 3000 in some embodiments drops packets from port 1 if the packets do not have in their headers source MAC addresses that do not match to VM1 MAC address. The logical switch 3000 drops such packets regardless of whether the logical switch 3000 is enabled for port security. As such, the logical switch 3000 drops packet 3 because source MAC field of packet 3 does not have VM's MAC address "A" in the packet's source MAC address field.

In the stage 3001, the logical switch 3000 also receives packet 4 from VM4 through port 2. Packet 4 includes in packet 4's header "A" and "D" as the destination MAC and IP addresses, respectively. "D" represents an IP address in the proper IP address format. Packet 4 may include other information (e.g., source MAC and IP addresses, etc.) that the logical switch may use when performing logical lookups to route the packet. The logical switch 3000 routes packet 4 to port 1 in order to send packet 4 to VM1 through port 1. The logical switch 3000 routes packet 4 to VM1 through port 1 even though the destination IP address of packet 4 (i.e., "D") does not match to the IP address of VM 1 (i.e., "B"). This is because port 1 is not enabled for port security.

In the second stage 3002, a user using the GUI 3010 of control application enables port 1 of the logical switch 3000 for port security by checking the box in the GUI 3010 in this example. The user also sets "A" and "B" as the MAC and IP addresses to which a packet that is coming in or going out through port 1 is restricted. The ingress ACL table 3005 and the egress ACL table 3006 are modified according to the user input. As shown, the ingress ACL table 3006 specifies that the packets coming into the logical switch 3000 must have "A" and "B" as the sender's (i.e., VM1's) MAC and IP addresses, respectively, in the headers of the packets and in the ARP responses if any ARP responses are included in the packets. In other words, VM1 cannot use a MAC address or an IP address that is not the virtual machine's address.

In the stage 3002, the logical switch 3000 receives packets 5-7 from VM1 through port 1. Packets 5-7 are similar to packets 1-3, respectively, that the logical switch 3000 received from VM in the stage 3001. Packets 5-7 have the same source MAC and IP addresses as packets 1-3, respectively. As shown in the stage 3002, the logical switch 3000 routes packet 5 to another port according to the ingress ACL table 3006 which specifies that packets with "A" and "B" as the packets' source MAC and IP addresses are allowed to be sent to an egress port. However, the logical switch 3000 drops packets 6 and 7. The logical switch 3000 drops packet 6 because packet 6's APR response has "C" as a MAC address which is different than the MAC address to which a packet that is coming in through port 1 is restricted (i.e., "A"). The logical switch 3000 drops packet 6 even though the packet has source MAC and IP addresses in the header that match to the addresses to which a packet that is coming in through port 1 is restricted. The logical switch 3000 also drops packet 7 because packet 7 includes "C" as source MAC address in the header, which is different than VM1's MAC address "A."

In the stage 3002, the logical switch 3000 also receives packet 8 from VM4 through port 2. Packet 8 is similar to packet 4 that the logical switch 3000 received from VM4 through port 4 in the stage 3001. Packet 8 includes in packet 8's header "A" and "D" as the destination MAC and IP addresses, respectively. The logical switch 3000 routes packet 8 to port 1 in order to send packet 8 to VM1 through port 1. However, the egress ACL table 3007 specifies that the switch 3000 should drop a packet with a destination IP address that is different than the IP address to which a packet that is going out through port 1 is restricted (i.e., "B"). Accordingly, the logical switch 3000 drops packet 8 after the switch routes the packet to port 1 because packet 8 includes "D" as the packet's destination IP address which is different than "B."

Figures 31, 31A:
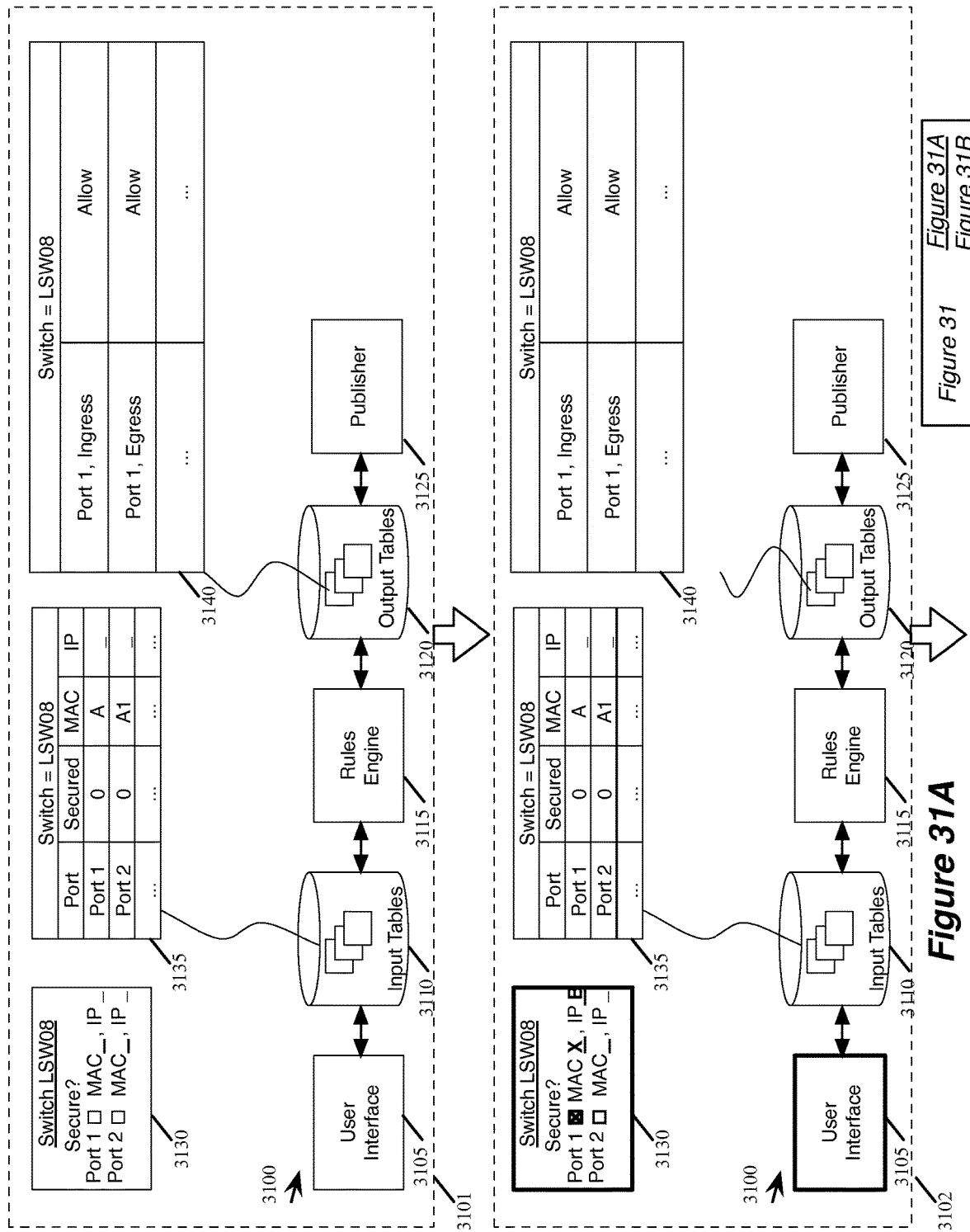
FIGS. 31A-31B conceptually illustrate an example of enabling port security for a port of a logical switch by control application of some embodiments.
Figure 31B:
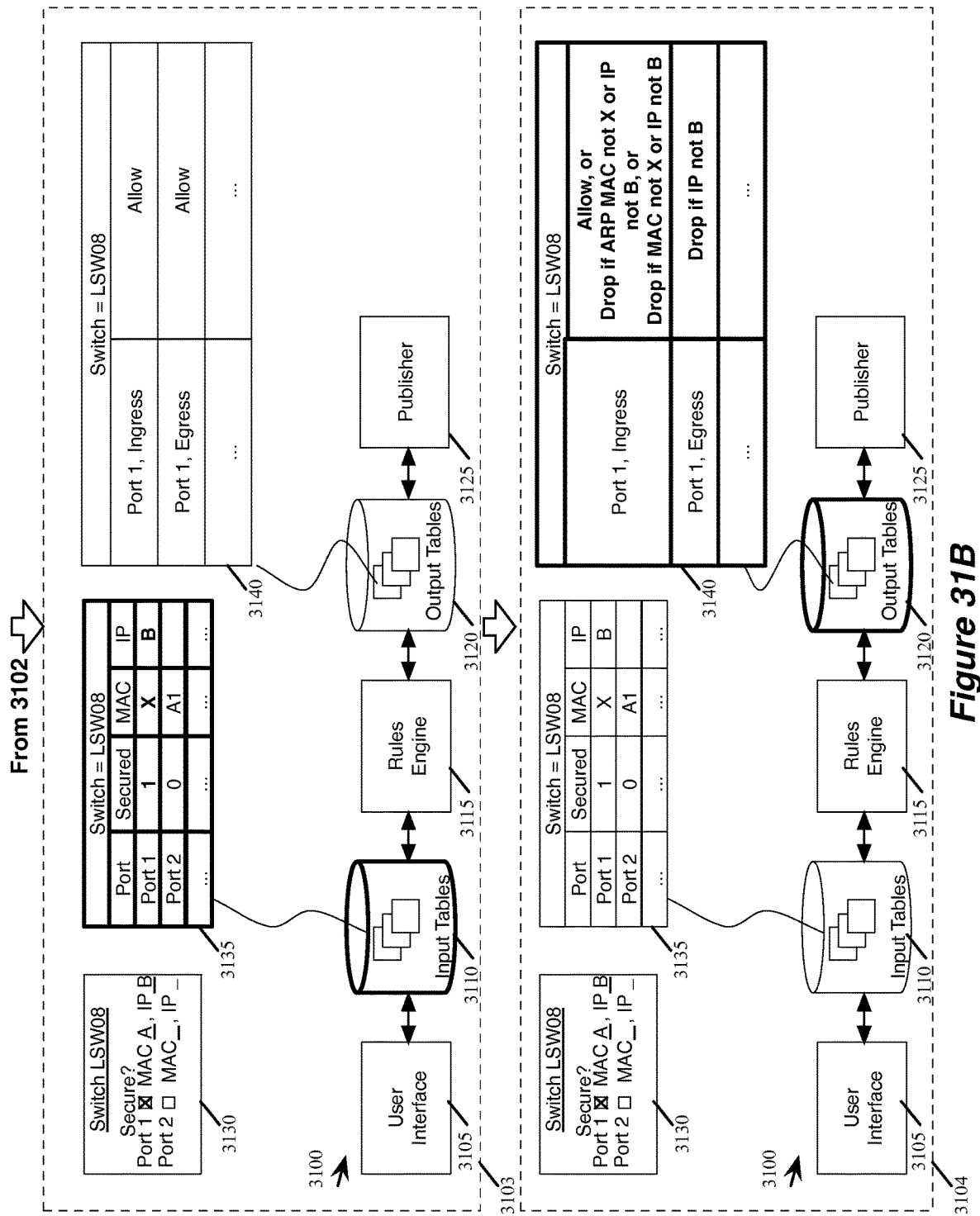

FIGS. 31A-31B conceptually illustrate an example of enabling port security for a port of a logical switch by control application 3100 of some embodiments. FIGS. 31A-31B illustrate in four different stages 3101, 3102, 3103, and 3104 that the control application 3100 enables port security for port 1 of the logical switch 3000 described above by reference to FIG. 30. As shown, these figures illustrate that the control application 3100 includes a user interface 3105, RE input tables 3110, rules engine 3115, RE output tables 3120, and a publisher 3125. The figures also illustrate a GUI 3130 and tables 3135 and 3140.

The user interface 3105 in some embodiments provides a user with a management tool with which the user can view and/or modify a logical network state. Different embodiments provide different management tools to the user. For instance, the user interface 3105 in some embodiments provides a graphical tool such as the GUI 3130. Instead of or in conjunction with a graphical tool, other embodiments may provide the user with a command-line tool or any other type of management tool. The user interface 3105 receives inputs from the user through the management tool and processes the received inputs to populate and/or modify one or more input tables 3110.

The GUI 3130 conceptually represents a management tool provided by the user interface 3105 to the user. In some embodiments, the GUI 3130 is provided as a web application and thus can be opened up with a web browser. With GUI 3130, the user can manage the logical network elements (e.g., a logical switch), e.g., by entering inputs and receiving responses from the control application. For instance, the user can query whether port security is enabled for ports of a logical switch that the user is managing.

The RE input tables 3110 are similar to RE input tables 1910 described above by reference to FIG. 19. As described above, a RE input table in some cases represents the state of the logical network that the user is managing. For instance, the RE input table 3135 is a table that stores port security information of the ports of a logical switch that the user is managing through the control application. The RE input table 3135 conceptually represent a table in this example. As described above, the RE input table may be a result of several table joins and selects performed on a set of RE input tables. The control application modifies one or more RE input tables with user inputs that the control application receives through the management tool or with any network events that the control application detects by monitoring a NIB. After the control application 3100 modifies RE input tables, the control application 3100 uses the rules engine 3115 to process the modified RE input tables.

The rules engine 3115 is similar to the rules engine 1925 described above by reference to FIG. 19. The rules engine 3115 of different embodiments performs different combinations of database operations on different sets of RE input tables to populate and/or modify different sets of output tables 3120. For instance, the rules engine 3115 modifies logical datapaths specified in the output table 3140 when the input table 3135 is changed to indicate that a port of a logical switch is enabled for port security. The output table 3140 includes flow entries and/or logical datapaths that specify the actions for the logical switch to perform on the network data sent from one port to another of the logical switch. The output table 3140 may be a result of several table joins and selects performed by the rules engine 3115 on a set of input tables as well as functions and constants. In addition to the input table 3135, the rules engine 3115 may use other input tables as well as functions and constants in order to modify the output table 3140. Other input tables may include tables that store the data link layer addresses (e.g., MAC addresses, etc.) of the ports of the logical switch and tables that store the network layer addresses (e.g., IP addresses, etc.) of the ports. Other input tables may also include tables that store VIF addresses and tables that store PIF addresses of the ports.

The publisher 3125 is similar to the publisher 1955 described above by reference to FIG. 19, in that the publisher 3125 publishes or sends the populated and/or modified output tables in the output tables 3120 to a virtualization application (not shown). As described above, a virtualization application will map the logical datapaths to physical datapaths to update the NIB.

In the first stage 3101, the ports of the logical switch 3000 are not enabled for port security. As shown, the GUI 3130 displays whether the ports of the logical switch 3000, which is identified by an identifier "LSW08," are enabled for port security. The unchecked boxes in the GUI 3130 indicate that ports 1 and 2 of the logical switch 3000 are not enabled for the port security. In some embodiments, the GUI 3130 allows the user to specify one or both of the MAC and IP addresses to which a particular port of the switch is to be restricted. In some such embodiments, the particular port of the switch is deemed enabled for port security when the MAC and IP addresses pair is specified for the port. In these embodiments, the control application 3100 determines that a port is not enabled for port security if the port does not have a MAC and/or IP address assigned. In other embodiments, the GUI 3130 may only allow the user to specify whether the particular port of the switch should be enabled for port security. However, to enable a port for port security, there must be a MAC address and/or IP address assigned to the port in some such embodiments. In these embodiments, instead of the user, the user interface 3105 or the rules engine 3115 specify the MAC and IP addresses to which to restrict this port. In some of these embodiments, the user interface 3105 or the rules engine 3115 uses the PIF MAC address and/or PIF IP address as the addresses to which to restrict the port.

The RE input table 3135 includes a list of the ports of the logical switch 3000. The input table 3135 indicates that the ports of the logical switch 3000 are not enabled for port security. A number of different scenarios may provide explanations for the values in the entries of the input table 3135. In one scenario, the user may have disabled port security for ports 1 and 2 of the logical switch 3000 by entering appropriate inputs to the management tool provided by the control application. In another scenario, the user has not yet managed the logical switch 3000 since the switch's creation. In this scenario, the control application may populate the RE input table with default values. Or, the control application may leave the "secured" column empty (i.e., no values) instead of zeros to indicate ports 1 and 2 of the logical switch 3000 have not been configured for port security. In yet another scenario, the RE input table 3135 may have been populated by the control application in response to a change in the NIB that is detected by the control application.

The RE input table 3135 also includes a list of MAC addresses and a list of IP addresses to which the ports of the logical switch 3000 are restricted when port security is enabled for the switch. As described above, these lists may be stored as one or more separate tables. The output table 3140 indicates that the logical switch 3000 allows packets that are coming in and/or going out of the switch 3000 through port 1 of the logical switch 3000 are not restricted to particular MAC and IP addresses. As shown in the first stage 3101, the RE input table 3135 lists the default MAC addresses "A" and "A1" for ports 1 and 2, respectively. "A" and "A1" are in the proper MAC address format. As described above, source MAC addresses of the packets from the ports 1 and 2 of the logical switch in some embodiments are restricted to these two MAC addresses regardless of whether this logical switch has been enabled for port security. That is, even if the logical switch is not enabled for port security, the switch will drop packets from ports 1 and 2 when these packets do not have "A" and "A1," respectively, as their source MAC addresses in these embodiments. In some cases, the action column and/or the MAC column for each row of the output table 3140 may not contain any value when ports 1 and 2 of the logical switch 3000 have not been configured for port security.

In the second stage 3102, the user provides input to indicate that user wishes to enable port 1 of the logical switch 3000 for port security. As shown, the user has checked a box next to "port 1" in the GUI 3130 and entered "X" and "B" as the MAC and IP addresses, respectively, to which to restrict port 1. "X" is in the proper MAC address format and "B" is in the proper IP address format. The user interface 3105 receives the user's inputs through the GUI 3130 and parses the inputs. The user interface 3105 selects one or more RE input tables 3110 in order to populate and/or modify one or more entries of the selected RE input tables. The user interface 3105 uses the parsed information (e.g., a switch identifier, etc.) to select the RE input tables to populate and/or modify. As shown, the RE input table 3135 and the output table 3140 have not been changed. That is, the values in the entries in these tables have not been changed from the values that these tables had in the stage 3101.

In the third stage 3103 illustrated in FIG. 31B, the user interface 3105 has selected the input table 3135 using the information that the user interface 3105 received from the user through the management tool. The user interface 3105 selects the RE input table 3135 because the RE input table 3135 indicates whether ports of the logical switch 3000 that the user is managing are enabled for port security. The user interface 3105 then populates and/or modifies the output table 3140 to indicate that port 1 of the logical switch 3000 is enabled for port security. Specifically, the user interface 3105 modifies the value of the "secured" column for port 1 to 1 from 0 to indicate that the port is enabled for port security. The user interface 3105 also populates the MAC and IP columns for port 1 with the MAC address "X" and the IP address "B" that the user has specified. Since the default MAC address for port 1 was "A" in the second stage 3102, the MAC address for port 1 is now changed to "X." Accordingly, the traffic coming through port 1 would be restricted to MAC address "X" and IP address "B." That is, the logical switch will drop the packets that have source MAC address different than port 1's MAC address "X," the packets that have source IP address different than "B," or the packets that have ARP messages with MAC and IP addresses that are different than "X" and "B." Even if a packet that has "A," which was the default MAC address for port 1, as source MAC address, the logical switch will drop the packet.

As described above, the user may not have an ability to specify the MAC and IP addresses to which to restrict a port of a logical switch in some embodiments. In these embodiments, the user interface 3105 may perform table joins and selects on several RE input tables to populate the MAC and IP columns for port 1 in the RE input table 3135. In other embodiments, the RE input table may not include the MAC and IP columns. In some such embodiments, the rules engine 3115 may perform table joins and selects on several output tables and populate the output table 3140 with logical datapaths that specify MAC and IP addresses to which the port is to be restricted.

In the third stage 3103, the output table 3140 has not been changed from what it was in the stage 3102. Although FIGS. 31A-31B illustrate that an RE input table is updated by the user interface 3105 based on the inputs that the user interface 3105 receives from the user, it is possible that the RE input tables are populated and/or modified based on the changes in the NIB that are fed back to the control application.

In the fourth stage 3104 illustrate in FIG. 31B, the control application 3100 uses the rules engine 3115 to map the changes in the RE input tables 3110 to the logical datapaths specified in the output tables 3120. The rules engine 3115 performs table mapping operations that map the entries in the RE input tables to the logical datapaths to be specified in the output tables. In this example, the rules engine 3115 maps the entry for port 1 of the logical switch 3000 in the RE input table 3135 into logical datapaths for the network data that the logical switch 3000 routes. Specifically, the output table 3140 includes logical datapaths for a logical ingress ACL table and a logical egress ACL table for the logical switch 3000. The modified and/or populated entry for port 1 of the logical switch 3000 in the RE input table 3135 indicates that port 1 of the logical switch 3000 is to be enabled for port security. Therefore, the rules engine 3115 modifies the output table 3140, by performing table mapping operations, such that the logical switch 3000 drops network data (e.g., packets) after the logical switch 3000 receives network data or before the logical switch 3000 sends out network data through port 1.

Specifically, the output table 3140 specifies that a packet should be dropped when the packet's source MAC address or source IP address does not match the MAC address ("X") or the IP address ("B") to which a packet that is coming through port 1 of the switch 3000 is restricted. The output table 3140 also specifies that a packet should be dropped when the packet's MAC address or IP address in any ARP response the packet contains does not match the MAC address or the IP address to which a packet that is coming through port 1 of the switch 3000 is restricted. The output table 3140 also specifies that a packet should be dropped when the packet's destination IP address does not match the IP address that a packet that is going out through port 1 of the switch 3000 is restricted.

FIGS. 31A-31B illustrate only one RE input table and one output table for the simplicity of description. However, the rules engine 3115 performs table mapping operations using several more RE input tables and function and constant tables (not shown) that are similar to function and constant tables 1915 described above by reference to FIG. 19. For instance, the rules engine 3115 can use a table that provides MAC addresses of logical ports, a table that provides VIF addresses of logical ports, a table that provides PIF addresses of logical ports, a table that provides a IP addresses of logical ports, etc. When the rules engine 3115 completes the table mapping operations to populate and/or modify the output table 3140, port 1 of the logical switch 3000 is enabled for port security as described above by reference to the stage 3002 of FIG. 30.

D. Quality of Service

Figure 32:
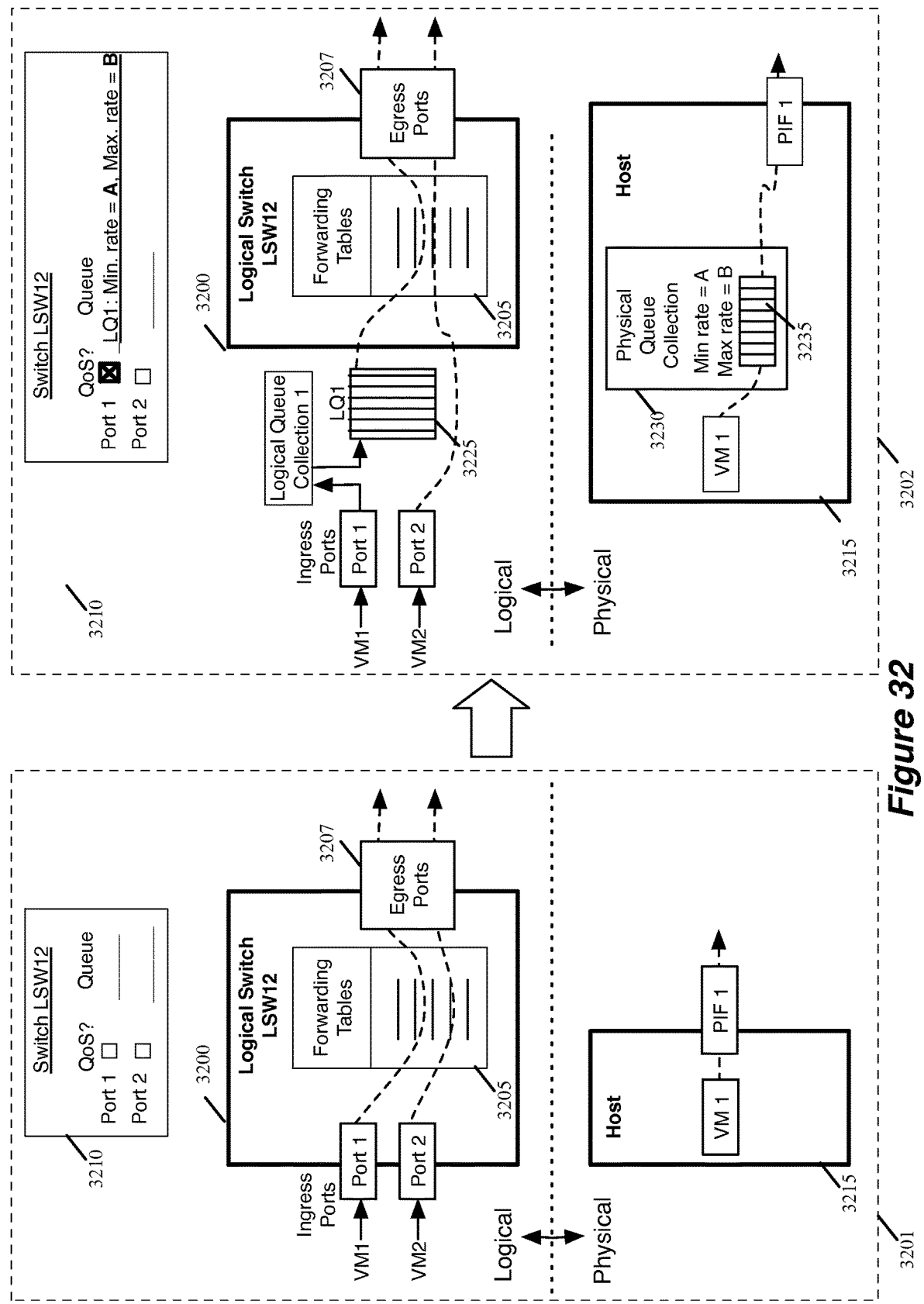
FIG. 32 conceptually illustrates an example of enabling Quality of Service (QoS) for a logical port of a logical switch of some embodiments.

FIG. 32 conceptually illustrates an example of enabling Quality of Service (QoS) for a logical port of a logical switch 3000 of some embodiments. Specifically, this figure illustrates the logical switch 3200 at two different stages 3201 and 3202 to show that, after port 1 of the logical switch is enabled for QoS, the logical switch 3200 queues network data that comes into the logical switch 3000 through port 1. The logical switch 3200 queues the network data in order to provide QoS to a machine that sends the network data to switch 3200 through port 1. QoS in some embodiments is a technique to apply to a particular port of a switch such that the switch can guarantee a certain level of performance to network data that a machine sends through the particular port. For instance, by enabling QoS for a particular port of a switch, the switch guarantees a minimum bitrate and/or a maximum bitrate to network data sent by a machine to the network through the switch.

As shown, FIG. 32 illustrates that the logical switch 3200 includes logical ports 1 and 2. These ports are ingress ports and some of them may be egress ports in this example. The logical switch 3200 also includes forwarding tables 3205. The logical switch 3200 is similar to the logical switch 2700 described above by reference to FIG. 27. That is, the logical switch 3200 receive network data (e.g., packets) through the ingress ports and routes the network data based on the flow entries specified in the forwarding tables 3205 to the egress ports 3207, through which the logical switch 3200 sends out the network data. FIG. 32 also illustrates a GUI 3210. The GUI 3210 is provided by a control application in some embodiments. The GUI 3210 displays NIB states upon user's request to query the NIB. The GUI 3210 also receives user inputs which will be parsed and processed by a control application to generate logical datapaths.

VM1 is a virtual machine that sends network data to the logical switch 3200 through port 1. That is, port 1 of the logical switch 3200 is serving as an ingress port for VM1. The logical switch 3200 performs logical ingress lookups using an ingress ACL table (not shown), which is one of forwarding tables 3205, in order to control the network data (e.g., packets) coming through the ingress ports. For instance, the logical switch 3200 reads information stored in the header of a packet that is received through an ingress port, looks up the matching flow entry or entries in the ingress ACL table, and determines an action to perform on the received packet. As described above, a logical switch may perform further logical lookups using other forwarding tables that are storing flow entries.

FIG. 32 also illustrates a host 3215. The host 3215 in this example is a server on which VM1 runs. The host 3215 in some embodiments includes a network interface (e.g., a network interface card (NIC) with an Ethernet port, etc.) through which one or more VMs hosted in the host 3215 send out packets. In this example, port 1 of the logical switch 3200 is mapped to the network interface (i.e., PIF 1) of the host 3215. That is, PIF 1 is a physical transport port to which the logical port 1 is mapped. When the packets are sent out through PIF 1, the packets may be sent to the intended destinations through a managed switching element (not shown). As mentioned above, managed switching elements in some embodiments can include standalone physical switching elements, software switching elements that operate within a computer, or another other type of virtual switching element. The software or virtual switching elements may operate on a dedicated computer, or on a computer that performs non-switching operations.

When a logical port is enabled for QoS, the logical port needs a logical queue to en-queue the packets that are going into the logical switch through the logical port. In some embodiments, the user assigns a logical queue to a logical port. A logical queue may be created based on the user inputs in some embodiments. For instance, the user may enter a queue creation request through a UI provided by the control application in some embodiments. The user may specify the minimum and maximum bitrates for the queue. When enabling a logical port for QoS, the user may then point the logical port to the logical queue. In some embodiments, multiple logical ports can share the same logical queue. By sharing the same logical queue, the machines that send data to the logical switch through these logical ports can share the minimum and maximum bitrates associated with the logical queue.

In some embodiments, the control application creates a logical queue collection for the logical port. The control application then has the logical queue collection point to the logical queue. The logical port and the logical queue collection have a one-to-one relationship. However, in some embodiments, several logical ports (and corresponding logical queue collections) can share one logical queue. That is, the traffic coming through these several logical ports together are guaranteed for some level of performance specified for the logical queue.

Once a logical port points to a logical queue (once the relationship between logical port, the logical queue collection, and the logical queue is established), physical queue collection and physical queue are created. In some embodiments, the logical queue collection and the logical queue are mapped to a physical queue collection and a physical queue, respectively. When the packets are coming into the logical switch through a logical port that points to a logical queue, the packets are actually queued in the physical queue to which the logical queue is mapped. That is, a logical queue is a logical concept that does not actually queue packets. Instead, a logical queue indicates that the logical port that is associated with the logical queue is enabled for QoS.

In the first stage 3201, neither of the logical ports 1 and 2 of the logical switch 3200 is enabled for QoS. The logical switch 3200 routes packets that are coming from VM1 and VM2 through ports 1 and 2 to the egress ports 3207 without guaranteeing certain performance level because logical ports 1 and 2 are not enabled for QoS. On the physical side, packets from VM1 are sent out through PIF 1. In this example, the packets sent out through PIF 1 are sent to a managed switching element (not shown) which may be one of the managed switching elements that physically implement the logical switch 3200.

In the second stage 3202, a user using the GUI 3210 of control application enables port 1 of the logical switch 3200 for QoS by specifying information in the box next to "port 1" in the GUI 3210 in this example. The user specifies "LQ1" as the ID of the logical queue to which to point port 1. The user also specifies "A" and "B" as the minimum and maximum bitrates, respectively, of the logical queue. "A" and "B" here represent bitrates, which are numerical values that quantify amount of data that the port allows to go through per unit of time (e.g., 1,024 bit/second, etc.).

The control application creates a logical queue according to the specified information. The control application also creates a logical queue collection that would be set between port 1 and the logical queue LQ1. The logical queue LQ1 queues the packets coming into the logical switch 3200 through port 1 in order to guarantee that the packets are routed at a bitrate between the minimum and the maximum bitrates. For instance, the logical queue LQ1 will hold some of the packets in the queue when the packets are coming into the logical queue LQ1 through port 1 at a higher bitrate than the maximum bitrate. The logical switch 3200 will send the packets to the egress ports 3207 at a bitrate that is lower than the maximum bitrate (but at a higher bitrate than the minimum bitrate). Conversely, when the packets coming through port 1 are routed at a bitrate above but close to the minimum bitrate, the logical queue LQ1 may prioritize the packets in the queue such that the logical switch 3200 routes these packets first over other packets in some embodiments.

On the physical side, the control application through a NOS creates a physical queue collection 3230 and a physical queue 3235 in the host 3215. The physical queue collection 3230 includes a physical queue 3235. The logical queue 3225 is mapped to the physical queue 3235 actual queuing takes place. That is, the packets coming through port 1 of the logical switch 3200 in this example are queued in the physical queue 3230. The physical queue 3230 in some embodiments is implemented as a storage such as memory. The packets from VM1 are queued in the physical queue before the packets are sent out through PIF 1. In this example, the NIC (not shown) with which PIF 1 is associated manages the physical queue 3235 to guarantee that the packets that are sent out through PIF 1 at a bitrate between the minimum and maximum bitrates.

FIGS. 33A-33D conceptually illustrate an example of enabling QoS for a port of a logical switch by control application 3300 of some embodiments. FIGS. 33A-33D illustrate in seven different stages 3301, 3302, 3303, 3304, 3305, 3306, and 3307 that the control application 3300 enables QoS for port 1 of the logical switch 3200 described above by reference to FIG. 32. These figures illustrate that enabling a logical port for QoS results in creation of network constructs. As described above, creation of a network construct is a network event that causes one or more input tables to be updated. The updates to the input tables in turn trigger a series of table joins and selects that results in a change in a NIB. As shown, these figures illustrate that the control application 3300 includes a user interface 3370, input tables 3310, rules engine 3315, output tables 3320, and a publisher 3325. The figures also illustrate a GUI 3330, tables 3335, 3336, 3340, 3345, and 3350, a virtualization application 3355, and a NOS 3360.

The user interface 3370 in some embodiments provides a user with a management tool with which the user can view and/or modify a logical network state. Different embodiments provide different management tools to the user. For instance, the user interface 3370 in some embodiments provides a graphical tool such as the GUI 3330. Instead of or in conjunction with a graphical tool, other embodiments may provide the user with a command-line tool or any other type of management tool. The user interface 3370 receives inputs from the user through the management tool and processes the received inputs to populate and/or modify one or more input tables 3310.

The GUI 3330 conceptually represents a management tool provided by the user interface 3370 to the user. In some embodiments, the GUI 3330 is provided as a web application and thus can be opened up with a web browser. With GUI 3330, the user can manage the logical network elements (e.g., a logical switch), e.g., by entering inputs and receiving responses from the control application. For instance, the user can query whether QoS is enabled for ports of a logical switch that the user is managing.

The RE input tables 3310 are similar to RE input tables 1910 described above by reference to FIG. 19. As described above, a RE input table in some cases represents the state of the logical network that the user is managing. For instance, the RE input table 3335 is a table that stores QoS information of the ports of a logical switch that the user is managing through the control application. The RE input table 3335 may be a result of several table and joins and selects performed on a set of input tables (not shown). The control application modifies input tables with user inputs that the control application receives through the management tool or with any network events that the control application detects by monitoring a NIB (e.g., using a query manager). After the control application 3300 modifies RE input tables, the control application 3300 uses the rules engine 3315 to process the modified RE input tables.

The rules engine 3315 is similar to the rules engine 1925 described above by reference to FIG. 19. The rules engine 3315 of different embodiments performs different combinations of database operations on different sets of RE input tables to populate and/or modify different sets of output tables 3320. For instance, the rules engine 3315 modifies the output table 3350 when the RE input table 3336 is changed to indicate that a logical queue is created. The output table 3350 in some embodiments includes entries that specify requests for the virtualization application 3355 through a NOS to create network constructs. For instance, the output table 3350 may specify that the virtualization application to create a physical queue collection and/or a physical queue. These entries in the input table 3335 will be processed by the virtualization application 3355 to generate and/or modify output tables and publish the generated and/or modified output tables to the NIB 3365. The output table 3350 may be a result of several table joins and selects performed by the rules engine 3315 on a set of input tables, functions, and constants. In some embodiments, the rules engine 3355 may generate and/or use other input tables in order to populate and/or modify the output table 3350. The generation and/or use of these other input tables will be described further below.

The publisher 3325 is similar to the publisher 1955 described above by reference to FIG. 19, in that the publisher 3325 publishes or sends the modified output tables in the output tables 3320 to the virtualization application 3355. As described above, a virtualization application will map the logical datapaths to physical datapaths to update the NIB.

In some embodiments, the control application 3300 also uses a query manager (not shown) that interfaces with the NIB 3365 to query the NIB to receive state information regarding the network elements or constructs. In other embodiments, the query manager queries the output tables 3320 to obtain LDPS data.

In the first stage 3301, the GUI 3330 displays QoS information of ports 1 and 2 of the logical switch 3200. The user interface 3370 displays this information on the GUI 3330 upon the user's request (not shown) in this example. The logical ports of the logical switch 3200 are not enabled for QoS. As shown, the GUI 3330 displays whether ports 1 and 2 of the logical switch 3200, which is identified by an identifier "LSW12," are enabled for QoS. The unchecked boxes in the GUI 3330 indicate that ports 1 and 2 of the logical switch 3000 are not enabled for QoS. In some embodiments, the GUI 3330 allows the user to specify a logical queue to which to point a logical port.

The input table 3335 includes a list of the ports of the logical switch 3200. The RE input table 3335 indicates that the ports of the logical switch 3200 are not enabled for QoS. A number of different scenarios may provide explanations for the values in the entries of the input table 3335. In one scenario, the user may have disabled QoS for ports 1 and 2 of the logical switch 3200 by entering appropriate inputs to the management tool provided by the control application. In another scenario, the user has not yet managed the logical switch 3200 since creation of the switch. In this scenario, the control application may populate the RE input table with default values. Or, the control application may leave the "QoS" column empty (i.e., no values) instead of zeros to indicate ports 1 and 2 of the logical switch 3200 have not been configured for QoS. In yet another scenario, the RE input table 3335 may have been populated by the control application in response to a change in the NIB that is detected by the control application.

The RE input table 3336 includes a list of logical queues and each logical queue's minimum and maximum bitrates. As described above, a logical port that points to a logical queue is guaranteed for a certain level of performance. That is, the packets coming through the logical port will be routed, for example, at a bitrate between the minimum and maximum bitrates specified for the logical queue. Also, in some embodiments, a logical queue is global. That is, different logical ports of different logical switches can point to the same logical queue and share the bitrates and other features specified for the logical queue. The RE input table 3340 associates a logical queue and a physical queue. The RE input table 3345 associates physical interfaces with physical queue collections. As described above, the output table 3350 includes entries that specify requests for the virtualization application 3355 to create network constructs. The action column is empty in the stage 3301 in this example.

In the second stage 3302, the user provides input to indicate that user wishes to enable port 1 of the logical switch 3200 for QoS. As shown, the user has checked a box next to "port 1" in the GUI 3330 and entered "LQ1" as the logical queue ID to which to point port 1. The user has also entered a command to create the logical queue with "A" and "B" as the minimum and maximum bitrates, respectively. The user interface 3370 receives the user's inputs through the GUI 3330 and parses the inputs. The user interface 3370 selects one or more input tables 3310 in order to populate and/or modify one or more entries of the selected RE input tables. The user interface 3370 uses the parsed information (e.g., a switch identifier, etc.) to select the RE input tables to populate and/or modify. As shown, the RE input tables 3335-3345 and the output table 3350 have not been changed. That is, the values in the entries in these tables have not been changed from the values that these tables had in the stage 3301.

Figures 33, 33A, 33B, 33C, 33D:
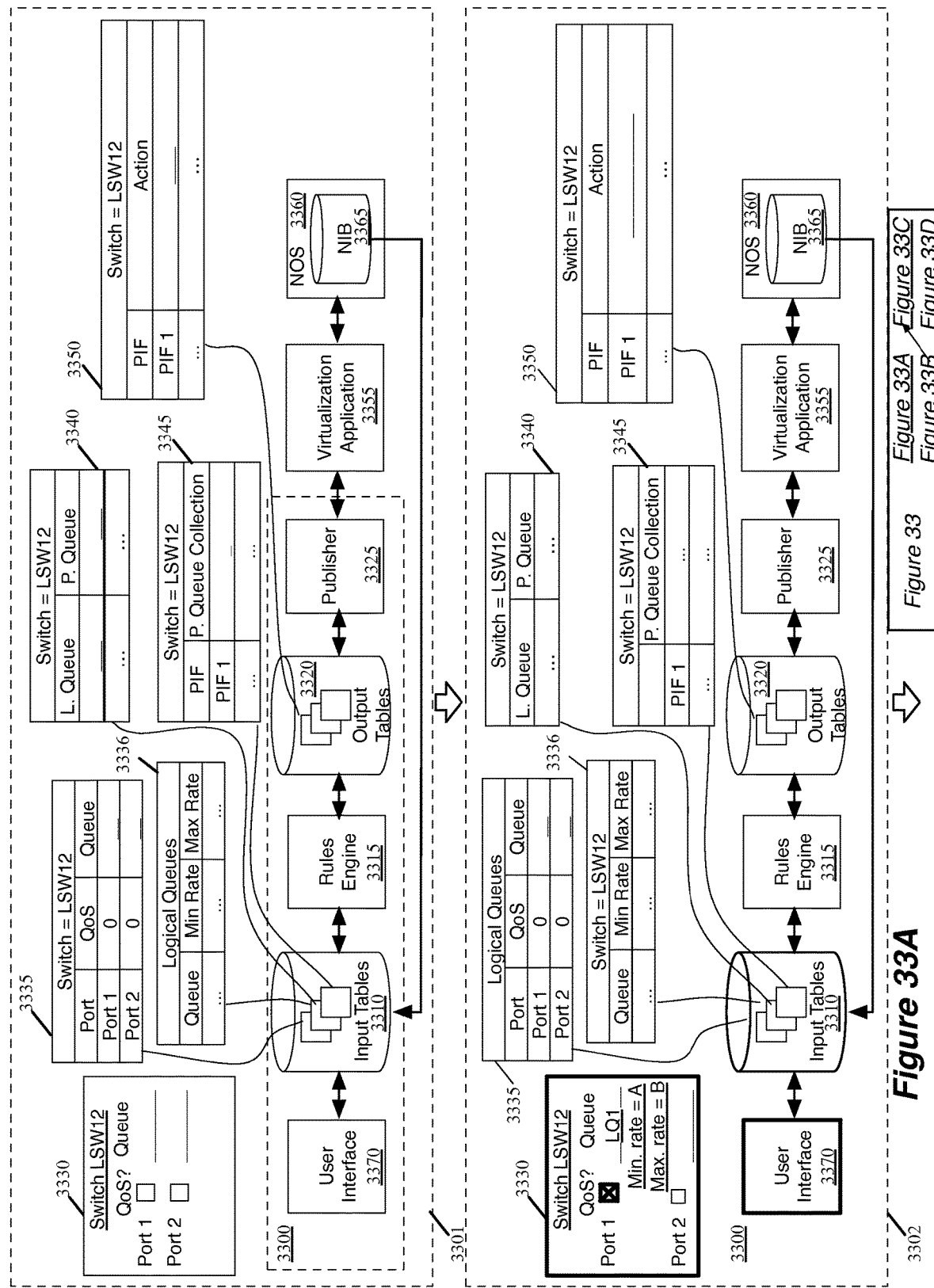
FIGS. 33A-33D conceptually illustrate an example of enabling QoS for a port of a logical switch by control application of some embodiments.
Figure 33B:
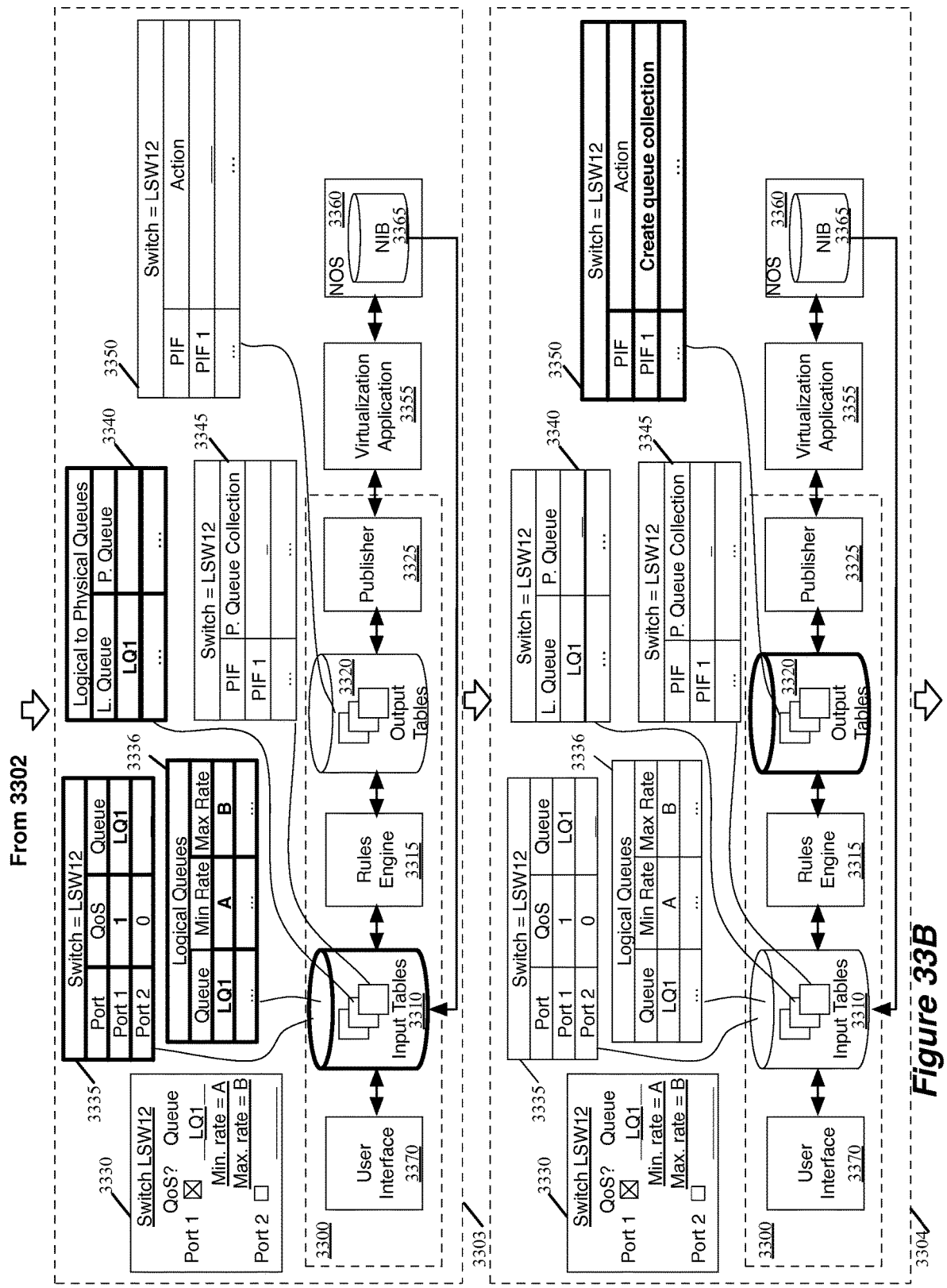
Figure 33C:
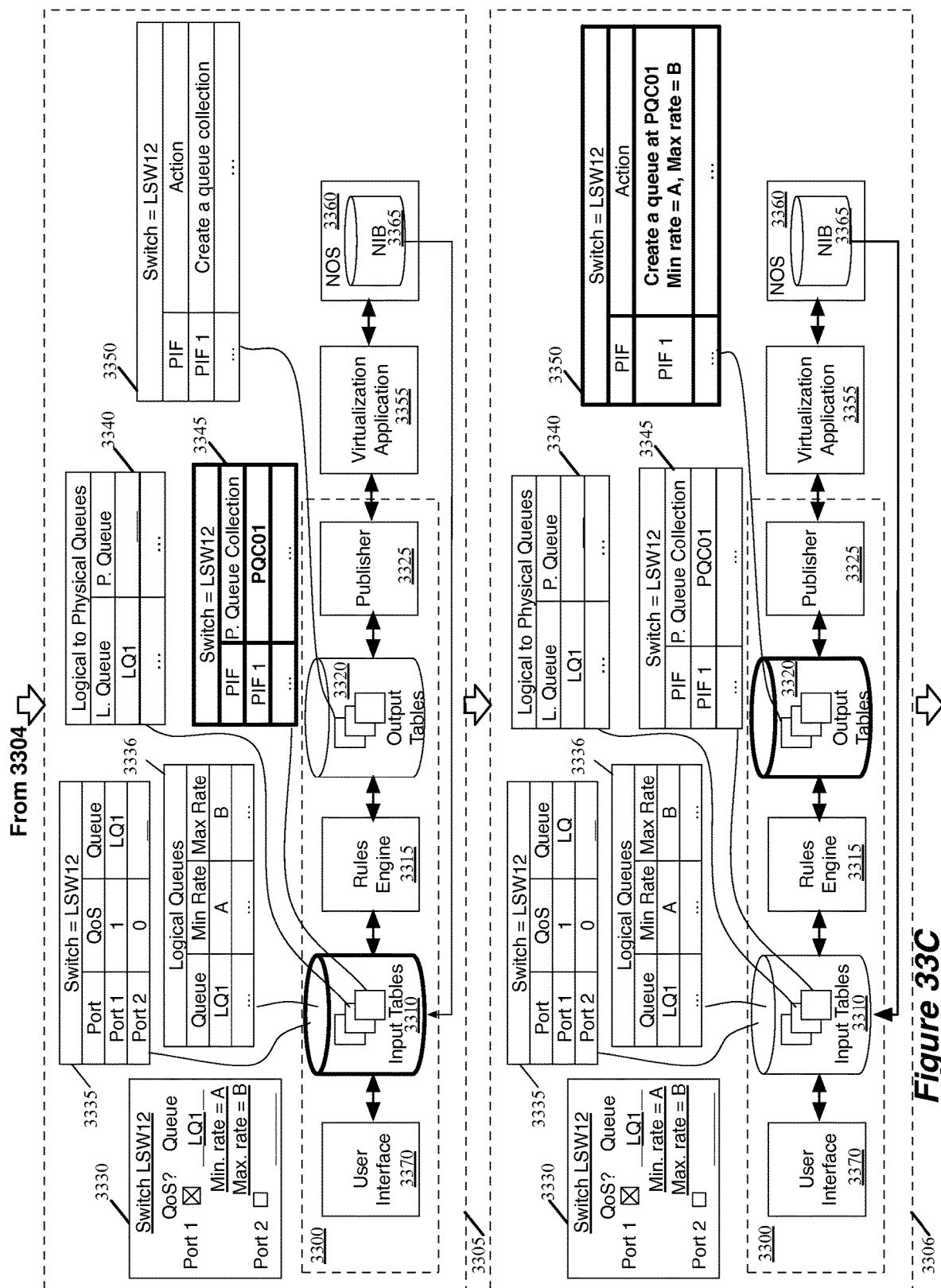
Figure 33D:
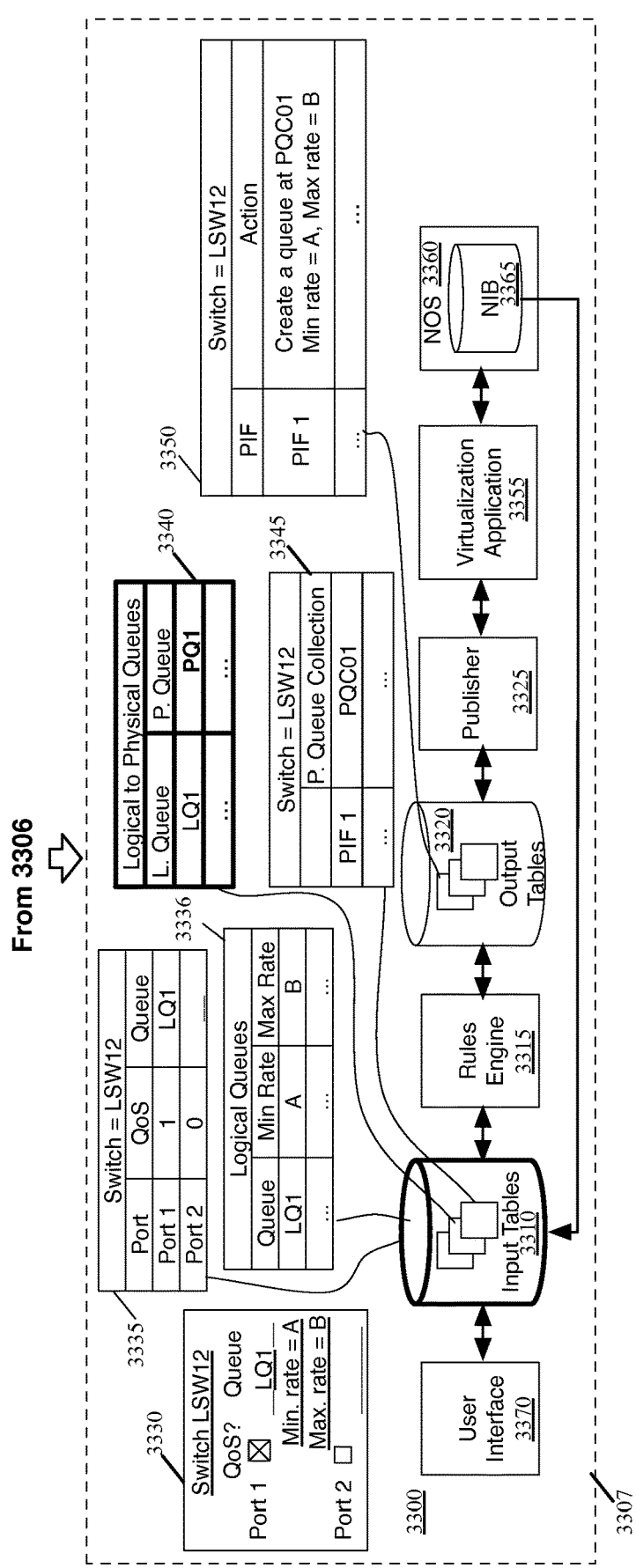

In the third stage 3303 illustrated in FIG. 33B, the user interface 3370 has selected the RE input table 3336 using the information that the user interface 3370 received from the user through the management tool. The user interface 3370 selects the RE table 3335 because the RE input table 3335 indicates whether ports of the logical switch 3200 that the user is managing are enabled for QoS. The user interface 3370 then populates and/or modifies the RE input table 3335 to indicate that port 1 of the logical switch 3200 is enabled for QoS. Specifically, the user interface 3370 in this example modifies the value of the "QoS" column for port 1 to 1 to indicate that the port is enabled for QoS. The user interface 3370 also selects the RE table 3336 because the RE input table 3336 includes information about all logical queues. The user interface 3370 then populates and/or modifies the RE input table 3336 to indicate that a logical queue with a queue ID "LQ1" is to be created. The user interface 3370 obtains the queue ID from another table by performing table mapping operations on other input tables, functions, and constants. The user interface 3370 also populates the bitrate columns for the logical queue with the minimum bitrate "A" and the maximum bitrate "B" that the user has specified. The user interface 3370 also selects the RE input table 3340 and populates the table with the queue ID of the logical queue. As described above, the RE input table 3340 associates logical queues with physical queues.

In the third stage 3303, the RE input table 3345 and the output table 3350 have not been changed from what the tables were in the stage 3302. Although FIGS. 33A-33D illustrate that a RE input table is updated by the user interface 3370 based on the RE inputs that the user interface 3370 receives from the user, it is possible that the RE input tables are populated and/or modified based on the changes in the NIB 3365 that are fed back to the control application 3300 (by, e.g., the query manager).

In the fourth stage 3304 illustrated in FIG. 33B, the control application 3300 uses the rules engine 3315 to map the changes in the RE input tables to the logical datapaths and/or the requests to create network constructs specified in the output tables. The rules engine 3315 performs table mapping operations that map the entries in the RE input tables to the logical datapaths or requests for creation of network constructs to be specified in the output tables. In this example, the rules engine 3315 generates a request to create a physical queue collection for the logical queue because PIF 1 that is associated with the logical queue LQ1 does not have a physical queue collection associated with the PIF. As described above, a physical queue collection and a physical queue need to be created to handle actual queuing of the packets that are queued in a logical queue. In order to create a physical queue, a physical queue collection should be created first. Accordingly, the rules engine 3315 modifies and/or populates the output table 3350, by performing table mapping operations, such that a physical queue collection is created for PIF 1.

The rules engine 3315 performs several table joins and selects to generate table entries with which to populate and/or modify output tables. The rules engine 3315 generates and/or uses a table that associates a logical port that is enabled for QoS with a logical queue collection, a table that associates a logical queue collection with a logical queue, a table that associates a logical port with a PIF, a table that associates a logical port with a managed switching element, etc. The rules engine 3315 generates the request to create a physical queue collection when all information necessary to create the queue collection is available in the RE input tables. That is, all necessary information must be present in the tables that are joined in order to successfully generate the request because any missing information would fail table joins operations.

The publisher 3325 then publishes the output table 3350 to the NIB 3365 of the NOS 3360 or to the virtualization application 3355. The virtualization application 3355 may perform a set of table mapping operations to generate and/or modify data to send to the NIB 3365. The NOS 3360 creates a physical queue collection and notifies of the result to the virtualization application 3355. The query manager in some embodiments receives the updated state of the network and creates and/or modifies input tables 3310 accordingly for the control application to process.

In the fifth stage 3305 illustrated in FIG. 33C, the control application 3300 updates the RE input table 3345 when the control application is notified (e.g., by the query manager) of the creation of a physical queue collection for PIF 1. As described above, the RE input table 3345 associates physical interfaces with physical queue collections. The control application 3300 selects the RE input table 3345 and populates the entry for PIF 1 with the identifier of the created physical queue collection. In the stage 3305, the RE input tables 3335, 3336 and 3340 and the output table 3350 have not been changed from what the tables were in the stage 3304. The control application 3300 also updates other RE input tables including a table that associates a PIF or a physical port with a physical queue collection, a table that associates a physical queue collection and physical queues in the physical queue collection, etc.

In the sixth stage 3306 illustrated in FIG. 33C, the control application 3300 uses the rules engine 3315 to map the changes in the RE input tables to the logical datapaths and/or the requests for creation of network constructs specified in the output tables. In this example, the rules engine 3315 detects the creation of the physical queue collection for PIF 1 and generates a request to create a physical queue at the created physical queue collection for PIF 1. The rules engine 3315 maps the entry to the request by performing several table joins and selects on the RE input tables 3310. The rules engine 3315 generates and/or uses several RE input tables to perform table joins and selects. For instance, the rules engine 3315 uses the RE input table 3336 so that the physical queue to be created will perform at a bitrate between the minimum and the maximum bitrates specified in the RE input able 3336. The rules engine 3315 may also use the RE table 3340 to get the ID for the logical queue for which the physical queue is being created. The rules engine 3315 also modifies and/or populates other output tables including a table that includes a request to create a unique queue identifier for a physical queue, a table that includes a request to assign a queue number to a physical queue for a physical port or a PIF, etc.

The publisher 3325 then publishes the output table 3350 to the NIB 3365 of the NOS 3360 or to the virtualization application 3355. The virtualization application 3355 may perform a set of table mapping operations to generate and/or modify data to send to the NIB 3365. The NOS 3360 creates a physical queue at the physical queue collection for PIF 1 and notifies of the result to the virtualization application 3355. The query manager in some embodiments receives the updated state of the network and creates and/or modifies input tables 3310 accordingly for the control application to process.

In the seventh stage 3307 illustrated in FIG. 33D, the control application 3300 updates the RE input table 3340 when the control application is notified of the creation of a physical queue. As described above, the RE input table 3340 associates logical queues and physical queues. The control application 3300 selects the RE input table 3340 and populates the entry for the physical queue that is to be associated with the logical queue being created. Other RE input tables that the control application may use and/or update include a table that associates physical ports and physical queue collections, a table that associates physical queue collections with physical queues, a table that contains all physical ports, a table that contains all PIFs, and etc.

With port 1 pointing to the logical queue that is mapped to the physical queue, the flow tables of the logical switch 3200 will specify that the traffic from port 1, which is now enabled for QoS, should be queued. The virtualization application 3355 and the NOS 3360 will implement and configure network constructs according to the logical flows specified in the logical flow tables.

VI. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 34:
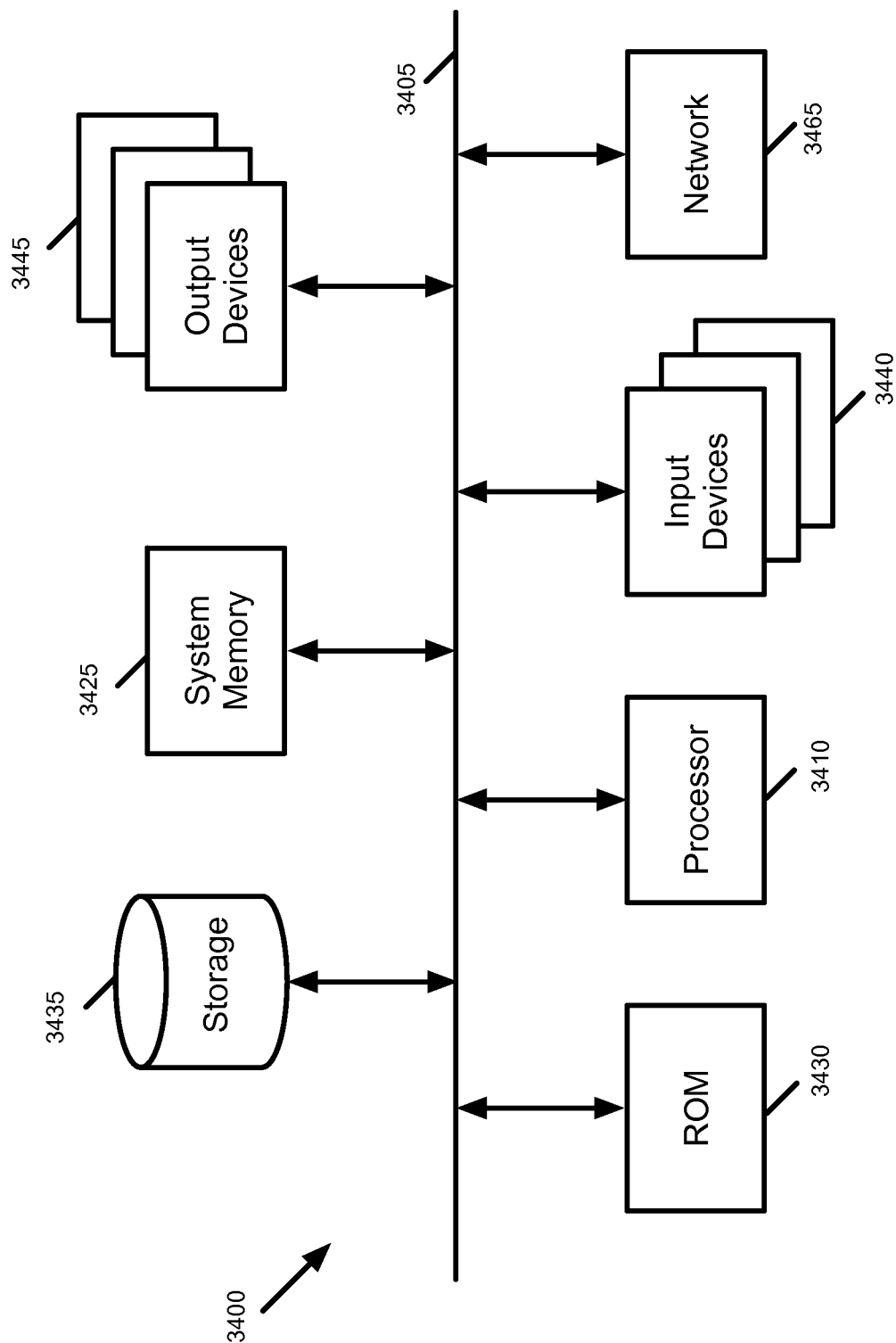
FIG. 34 conceptually illustrates an electronic system with which some embodiments of the invention are implemented.

FIG. 34 conceptually illustrates an electronic system 3400 with which some embodiments of the invention are implemented. The electronic system 3400 can be used to execute any of the control, virtualization, or operating system applications described above. The electronic system 3400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 3400 includes a bus 3405, processing unit(s) 3410, a system memory 3425, a read-only memory 3430, a permanent storage device 3435, input devices 3440, and output devices 3445.

The bus 3405 collectively represents all system, peripheral, and chipset buses that communicatively connect the numerous internal devices of the electronic system 3400. For instance, the bus 3405 communicatively connects the processing unit(s) 3410 with the read-only memory 3430, the system memory 3425, and the permanent storage device 3435.

From these various memory units, the processing unit(s) 3410 retrieve instructions to execute and data to process in order to execute the processes of the invention. The processing unit(s) may be a single processor or a multi-core processor in different embodiments.

The read-only-memory (ROM) 3430 stores static data and instructions that are needed by the processing unit(s) 3410 and other modules of the electronic system. The permanent storage device 3435, on the other hand, is a read-and-write memory device. This device is a non-volatile memory unit that stores instructions and data even when the electronic system 3400 is off. Some embodiments of the invention use a mass-storage device (such as a magnetic or optical disk and its corresponding disk drive) as the permanent storage device 3435.

Other embodiments use a removable storage device (such as a floppy disk, flash drive, etc.) as the permanent storage device. Like the permanent storage device 3435, the system memory 3425 is a read-and-write memory device. However, unlike storage device 3435, the system memory is a volatile read-and-write memory, such a random access memory. The system memory stores some of the instructions and data that the processor needs at runtime. In some embodiments, the invention's processes are stored in the system memory 3425, the permanent storage device 3435, and/or the read-only memory 3430. For example, the various memory units include instructions for processing multimedia clips in accordance with some embodiments. From these various memory units, the processing unit(s) 3410 retrieve instructions to execute and data to process in order to execute the processes of some embodiments.

The bus 3405 also connects to the input and output devices 3440 and 3445. The input devices enable the user to communicate information and select commands to the electronic system. The input devices 3440 include alphanumeric keyboards and pointing devices (also called "cursor control devices"). The output devices 3445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 34, bus 3405 also couples electronic system 3400 to a network 3465 through a network adapter (not shown). In this manner, the computer can be a part of a network of computers (such as a local area network ("LAN"), a wide area network ("WAN"), or an Intranet, or a network of networks, such as the Internet. Any or all components of electronic system 3400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIG. 23) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, several embodiments were described above in which a user provides logical datapath sets in terms of logical control plane data. In other embodiments, however, a user may provide logical datapath sets in terms of logical forwarding plane data. In addition, several embodiments were described above in which a controller instance provides physical control plane data to a switching element in order to manage the switching element. In other embodiments, however, the controller instance may provide the switching element with physical forwarding plane data. In such embodiments, the NIB would store physical forwarding plane data and the virtualization application would generate such data.

Furthermore, in several examples above, a user specifies one or more logic switches. In some embodiments, the user can provide physical switch configurations along with such logic switch configurations. Also, even though controller instances are described that in some embodiments are individually formed by several application layers that execute on one computing device, one of ordinary skill will realize that such instances are formed by dedicated computing devices or other machines in some embodiments that perform one or more layers of their operations.

Also, several examples described above show that a logical datapath set is associated with one user. One of the ordinary skill in the art will recognize that then a user may be associated with one or more sets of logical datapaths in some embodiments. That is, the relationship between a logical datapath set is not always a one-to-one relationship as a user may be associated with multiple logical datapath sets. Thus, one of ordinary skill in the art would understand that the invention is not to be limited by the foregoing illustrative details.

What is claimed is:

1. A method for implementing a logical switching element comprising a plurality of logical ports through which the logical switching element receives and sends a plurality of data packets, the method comprising:
    configuring a plurality of managed forwarding elements to implement the logical switching element;
    determining that port isolation has been enabled for the logical switching element; and
    providing a set of data directing the plurality of managed forwarding elements to drop a particular data packet in the plurality of data packets received through a first logical port when the particular data packet is addressed to a second logical port different than the first logical port to implement the port isolation.

2. The method of claim 1, wherein each data packet in the plurality of data packets comprises a source network address that is associated with a source device from which the data packet originated and a destination network address that is associated with a destination device to which the data packet is destined.

3. The method of claim 2, wherein
    the particular data packet is a first data packet, and the provided set of data does not direct the plurality of managed forwarding elements to drop a second data packet in the plurality of data packets received through the first logical port when the second data packet is addressed to a destination device that is a device shared by all devices that are associated with the logical ports of the logical switching element.

4. The method of claim 1, wherein the provided set of data is a set of high priority tables and the logical switching element processes data including the provided set of data according to a set of forwarding behaviors specified in the set of high priority tables over forwarding behaviors specified in tables other than the high priority tables.

5. The method of claim 4, wherein the set of high priority tables comprises information that directs the plurality of managed forwarding elements to drop data packets from a source device to a set of destination devices.

6. The method of claim 5, wherein the set of high priority tables do not include entries directing the plurality of managed forwarding elements (1) to allow a data packet destined for a device shared by all devices that are associated with the logical ports of the logical switching element and (2) to block a data packet destined for a device shared by all devices that are associated with the logical ports of the logical switching element.

7. The method of claim 4, wherein at least one table not included in the set of high priority tables is an access control list table.

8. The method of claim 1, wherein the provided set of data is an update to an access control list.

9. The method of claim 1, wherein determining that port isolation has been enabled for the logical switching element comprises detecting that a user input enabling port isolation has been received.

10. The method of claim 1, wherein
the particular data packet is a first data packet, and
a second data packet is addressed to the second logical port when a destination network address is associated with a destination device associated with the second logical port.

11. A non-transitory machine readable medium storing a program for execution by a set of processing units, the program for implementing a logical switching element comprising a plurality of logical ports through which the logical switching element receives and sends a plurality of data packets, the program comprising sets of instructions for:
configuring a plurality of managed forwarding elements to implement the logical switching element;
determining that port isolation has been enabled for the logical switching element; and
providing a set of data directing the plurality of managed forwarding elements to drop a particular data packet in the plurality of data packets received through a first logical port when the particular data packet is addressed to a second logical port different than the first logical port to implement the port isolation.

12. The non-transitory machine readable medium of claim 11, wherein each data packet in the plurality of data packets comprises a source network address that is associated with a source device from which the data packet originated and a destination network address that is associated with a destination device to which the data packet is destined.

13. The non-transitory machine readable medium of claim 12, wherein
the particular data packet is a first data packet, and
the provided set of data does not direct the plurality of managed forwarding elements to drop a second data packet in the plurality of data packets received through the first logical port when the second data packet is addressed to a destination device that is a device shared by all devices that are associated with the logical ports of the logical switching element.

14. The non-transitory machine readable medium of claim 11, wherein the provided set of data is a set of high priority tables and the logical switching element processes data including the provided set of data according to a set of forwarding behaviors specified in the set of high priority tables over forwarding behaviors specified in tables other than the high priority tables.

15. The non-transitory machine readable medium of claim 14, wherein the set of high priority tables comprises information that directs the plurality of managed forwarding elements to drop data packets from a source device to a set of destination devices.

16. The non-transitory machine readable medium of claim 15, wherein the set of high priority tables do not include entries directing the plurality of managed forwarding elements (1) to allow a data packet destined for a device shared by all devices that are associated with the logical ports of the logical switching element and (2) to block a data packet destined for a device shared by all devices that are associated with the logical ports of the logical switching element.

17. The non-transitory machine readable medium of claim 14, wherein at least one table not included in the set of high priority tables is an access control list table.

18. The non-transitory machine readable medium of claim 11, wherein the provided set of data is an update to an access control list.

19. The non-transitory machine readable medium of claim 11, wherein the set of instructions for determining that port isolation has been enabled for the logical switching element comprises a set of instructions for detecting that a user input enabling port isolation has been received.

20. The non-transitory machine readable medium of claim 11, wherein
the particular data packet is a first data packet, and
a second data packet is addressed to the second logical port when a destination network address is associated with a destination device associated with the second logical port.

* * * * *